(12) United States Patent
Marchildon et al.

(10) Patent No.: US 11,286,015 B2
(45) Date of Patent: Mar. 29, 2022

(54) ACCESSORY MOUNTING SYSTEM FOR A VEHICLE AND METHOD FOR USING THE SAME

(71) Applicant: KIMPEX INC., Drummondville (CA)

(72) Inventors: Louis-Frédéric Marchildon, Drummondville (CA); Patrick L'Hérault, St-Marjorique de Grantham (CA); Nicolas Bouchard-Fortin, Racine (CA)

(73) Assignee: Kimpex Inc., Drummondville (CA)

( * ) Notice: Subject to any disclaimer, the term of this patent is extended or adjusted under 35 U.S.C. 154(b) by 0 days.

(21) Appl. No.: 17/183,574

(22) Filed: Feb. 24, 2021

(65) Prior Publication Data

US 2021/0261067 A1    Aug. 26, 2021

Related U.S. Application Data

(60) Provisional application No. 62/980,704, filed on Feb. 24, 2020, provisional application No. 63/106,498, (Continued)

(51) Int. Cl.
  *B62J 9/27*  (2020.01)
  *B60R 9/00*  (2006.01)
  *B60R 11/00* (2006.01)

(52) U.S. Cl.
  CPC .... *B62J 9/27* (2020.02); *B60R 9/00* (2013.01); *B60R 11/00* (2013.01);
  (Continued)

(58) Field of Classification Search
  CPC ....... B62J 9/27; B62M 2027/028; B60R 9/06; B60R 9/065; B60R 9/08; B60R 2011/0052; B60R 2011/008; B60R 2011/0084
  (Continued)

(56) References Cited

U.S. PATENT DOCUMENTS 4,266,703 A * 5/1981 Litz ..................... B62J 9/27
                                                  224/443
4,325,531 A * 4/1982 Omholt ................ B62J 9/27
                                                  248/553
(Continued)

FOREIGN PATENT DOCUMENTS

CA       3006919 A1    10/2013
CA       2801872 C  * 10/2017 ............ B60P 7/0815
(Continued)

*Primary Examiner* — Justin M Larson
(74) *Attorney, Agent, or Firm* — F. Michael Sajovec; Williams Mullen

(57) ABSTRACT

An accessory mounting system for mounting an accessory on a vehicle is provided. The mounting system includes a stacking assembly having a support structure adapted to be coupled to the vehicle and which includes a first support segment and a second support segment respectively provided with interlocking sections adapted to slidably engage one another to selectively define a length of the support structure. The stacking assembly also includes a support segment latch adapted to selectively secure the first support segment and the second support segment together and block movement of the first support segment and of the second support segment along the longitudinal axis. The stacking assembly further includes a pair of mounting fixtures connected at opposite ends of the support structure, and to which the accessory is adapted to be coupled to in order to mount the accessory to the vehicle.

20 Claims, 45 Drawing Sheets

Related U.S. Application Data filed on Oct. 28, 2020, provisional application No. 63/106,554, filed on Oct. 28, 2020.

(52) U.S. Cl.
CPC . *B60R 2011/008* (2013.01); *B60R 2011/0059* (2013.01); *B60R 2011/0078* (2013.01)

(58) Field of Classification Search
USPC ....... 224/550, 551, 42.4; 410/143, 145, 148; 248/310; 220/630
See application file for complete search history.

(56) References Cited

U.S. PATENT DOCUMENTS

| | | | | |
|---|---|---|---|---|
| 4,588,114 A * | 5/1986 | Lebaron | ............... | B62J 9/00 224/435 |
| 4,974,765 A * | 12/1990 | Marchetto | ............... | B62J 9/25 224/275 |
| 5,094,576 A * | 3/1992 | Fredelius | ............... | F16B 7/10 410/145 |
| 5,649,657 A * | 7/1997 | Chuang | ............... | B62J 7/00 224/430 |
| 6,607,327 B1 * | 8/2003 | Ho | ............... | B62J 9/00 403/322.1 |
| 6,767,053 B1 * | 7/2004 | Crounse | ............... | B60N 2/22 297/215.12 |
| 8,202,029 B2 * | 6/2012 | Chou | ............... | B60P 7/15 410/143 |
| 8,365,969 B2 * | 2/2013 | Johnson | ............... | B62J 7/04 224/413 |
| 8,371,652 B2 * | 2/2013 | Revell | ............... | B62J 7/08 297/352 |
| 8,777,531 B2 | 7/2014 | Massicotte et al. | | |
| 8,875,830 B2 | 11/2014 | Massicotte et al. | | |
| 8,887,974 B2 * | 11/2014 | Lindloff | ............... | B62J 1/28 224/443 |
| 9,505,335 B2 | 11/2016 | Massicotte et al. | | |
| 9,511,704 B2 | 12/2016 | Massicotte et al. | | |
| 9,604,685 B2 * | 3/2017 | Schanz | ............... | B62J 9/20 |
| 9,650,096 B2 * | 5/2017 | Visenzi | ............... | B62J 9/30 |
| 9,751,592 B2 | 9/2017 | Labbe et al. | | |
| 10,391,949 B2 * | 8/2019 | Labbe | ............... | B60K 15/06 |
| 10,513,299 B2 * | 12/2019 | MacMorran | ............... | B62J 9/24 |
| 10,744,953 B2 * | 8/2020 | Labbe | ............... | B65D 43/16 |
| 10,787,216 B2 * | 9/2020 | Visenzi | ............... | B62J 9/27 |
| 10,850,806 B2 * | 12/2020 | Labbe | ............... | B60R 9/06 |
| 2005/0274758 A1 * | 12/2005 | Jefferson | ............... | B62J 1/167 224/425 |
| 2006/0138185 A1 * | 6/2006 | Lien | ............... | B62J 7/00 224/427 |
| 2008/0272165 A1 * | 11/2008 | McMillan | ............... | B60R 9/00 224/408 |
| 2010/0219193 A1 * | 9/2010 | Becklin | ............... | B65D 21/0224 220/630 |
| 2010/0243691 A1 * | 9/2010 | Salisbury | ............... | F16C 29/045 224/413 |
| 2011/0139843 A1 * | 6/2011 | Thomas | ............... | B62J 9/23 224/413 |
| 2017/0327185 A1 | 11/2017 | Labbe et al. | | |
| 2019/0300099 A1 * | 10/2019 | Thomas | ............... | B62K 27/006 |
| 2020/0055559 A1 * | 2/2020 | Alagourie | ............... | B62J 11/00 |
| 2020/0055631 A1 * | 2/2020 | Combs | ............... | B65D 25/06 |
| 2020/0339040 A1 * | 10/2020 | Labbe | ............... | B60K 15/0406 |
| 2021/0039749 A1 * | 2/2021 | Labbe | ............... | B60R 9/06 |
| 2021/0188185 A1 * | 6/2021 | Hedlund | ............... | B60R 9/065 |
| 2021/0261063 A1 * | 8/2021 | Marchildon | ............... | B62J 9/23 |
| 2021/0261214 A1 * | 8/2021 | Marchildon | ............... | B62J 9/24 |
| 2021/0291920 A1 * | 9/2021 | Chuang | ............... | B62J 7/00 |

FOREIGN PATENT DOCUMENTS

| | | | | |
|---|---|---|---|---|
| CA | 2801872 C | | 10/2017 | |
| CA | 2803529 C | * | 3/2018 | ............... B60P 7/08 |
| CA | 2803529 C | | 3/2018 | |
| CA | 2869026 A1 | | 8/2018 | |
| CA | 2869026 C | * | 8/2018 | ............... B60R 9/06 |
| CA | 2993869 C | | 8/2019 | |

* cited by examiner

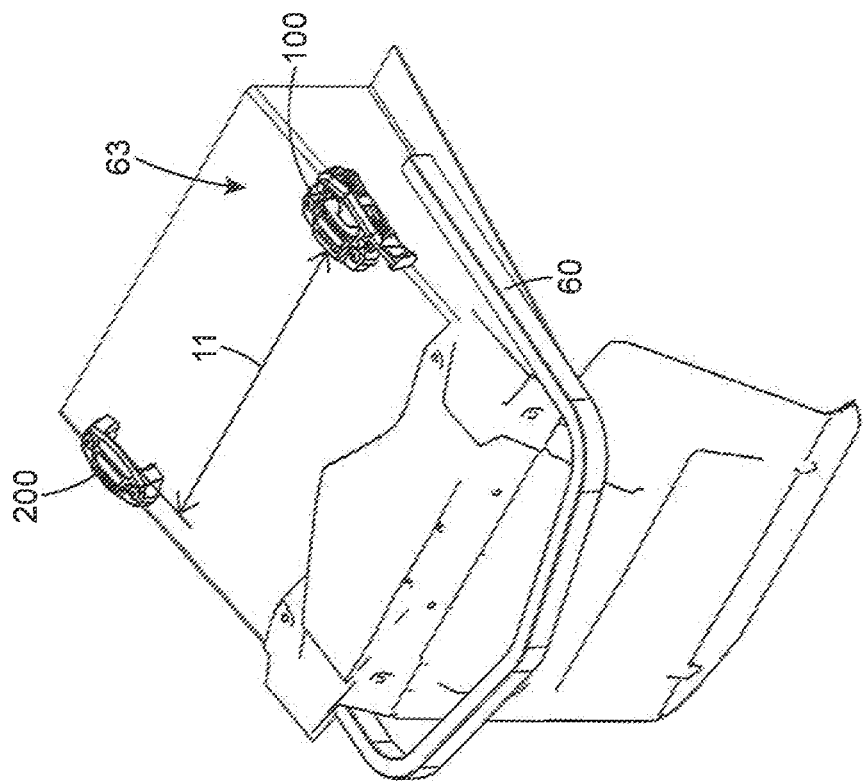
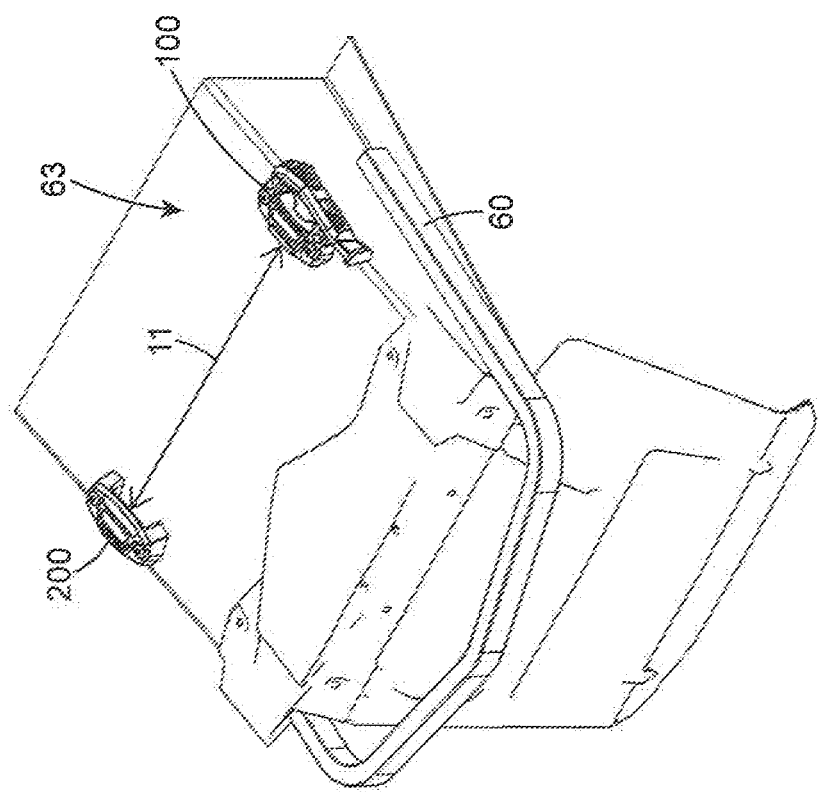
FIG. 3B
FIG. 3A

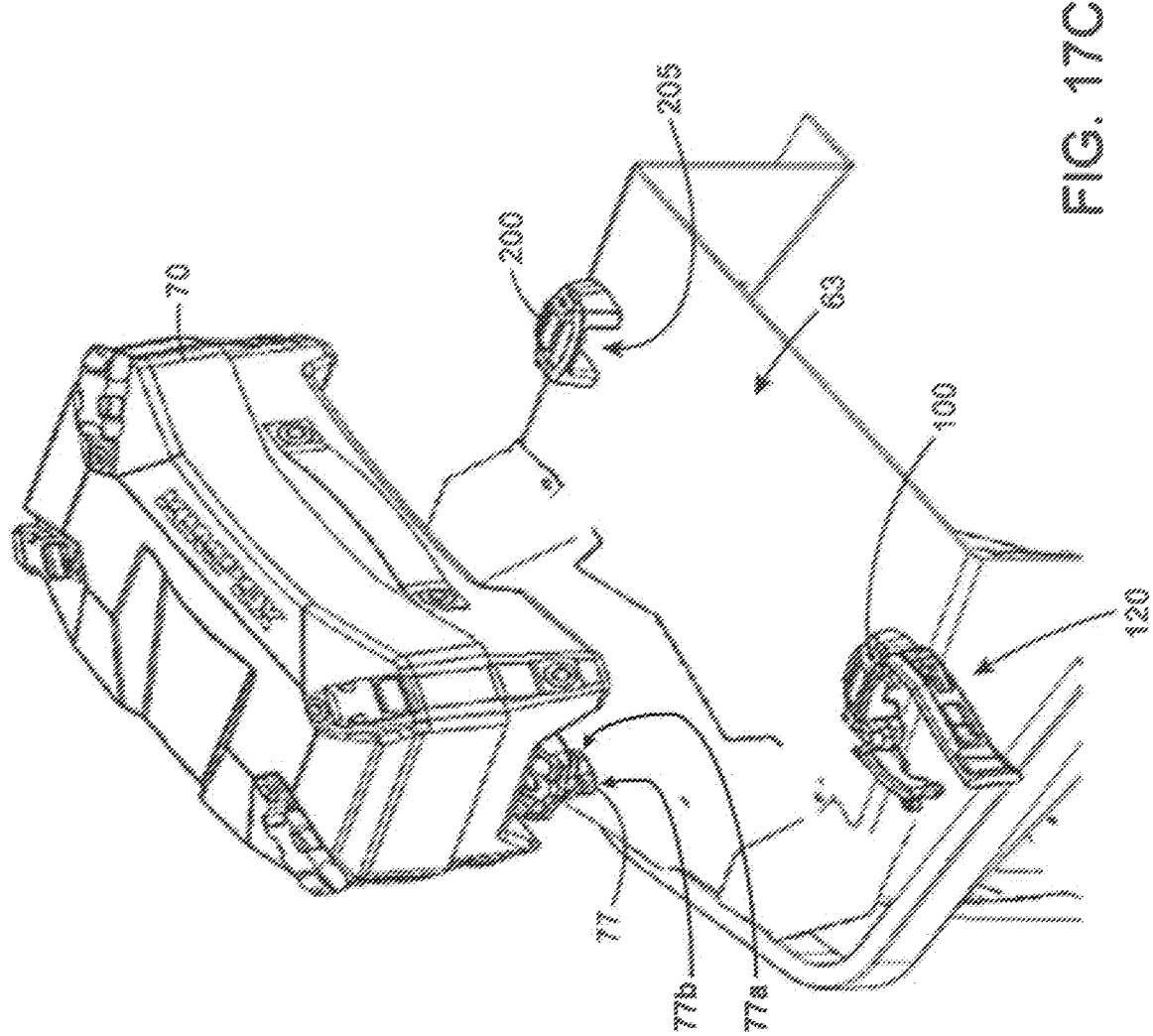

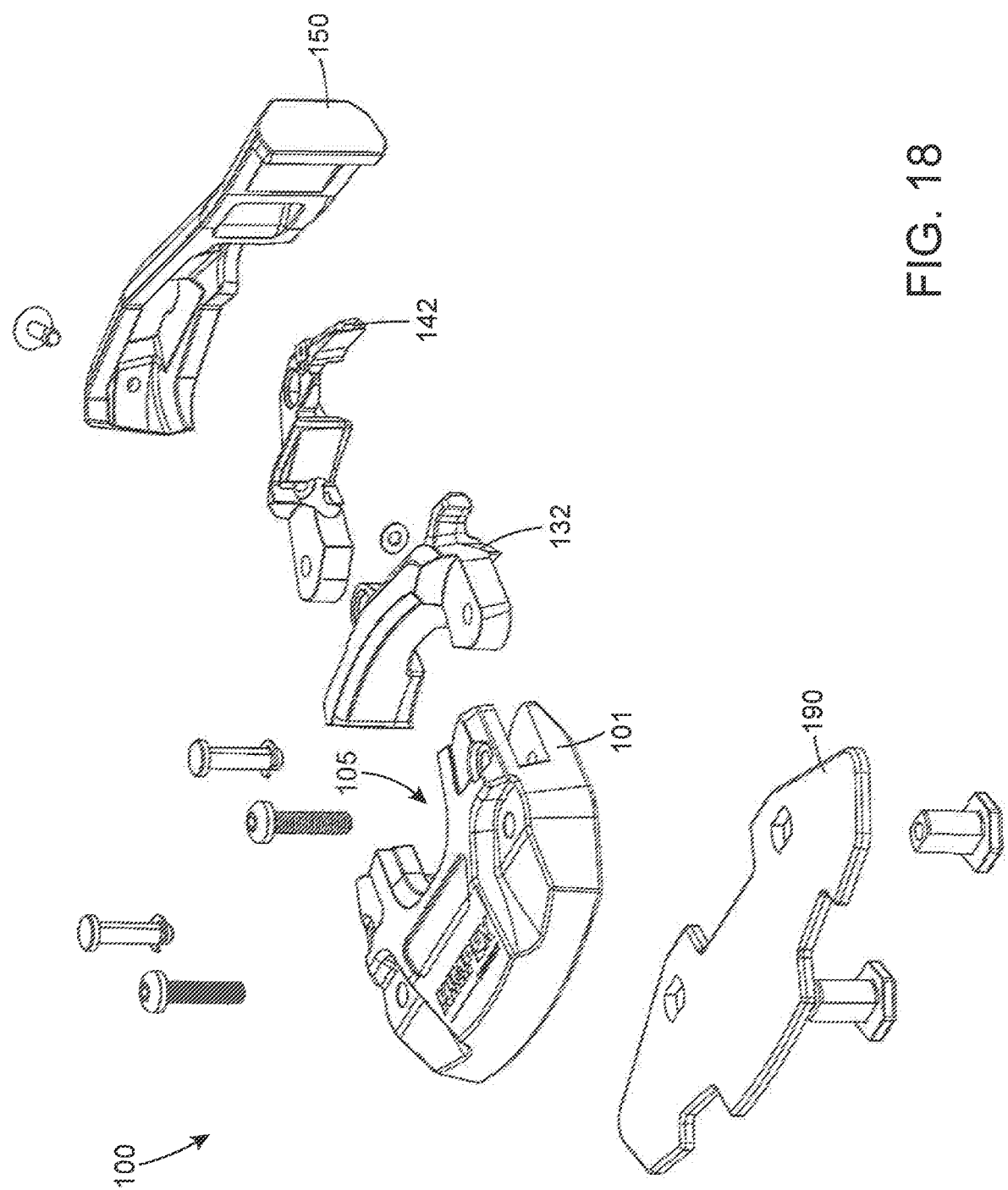

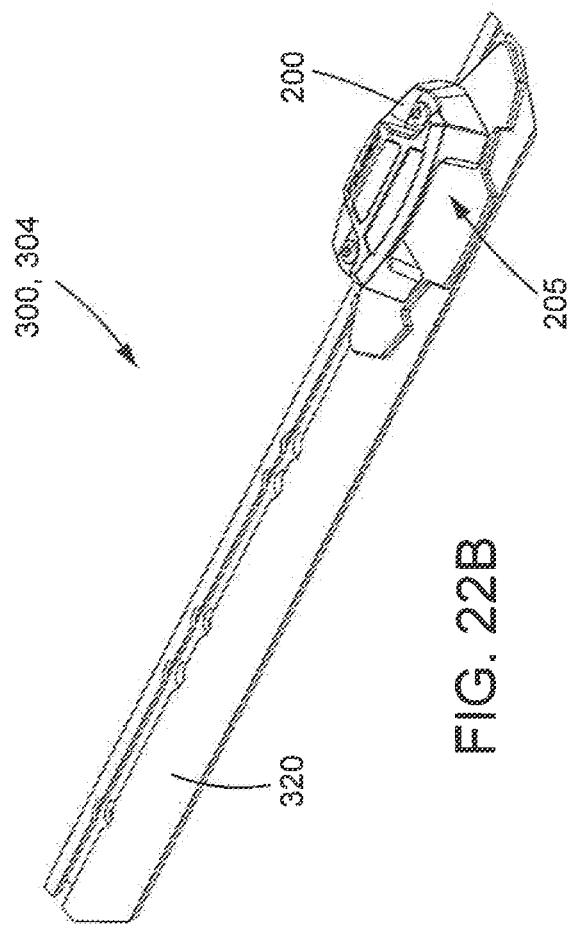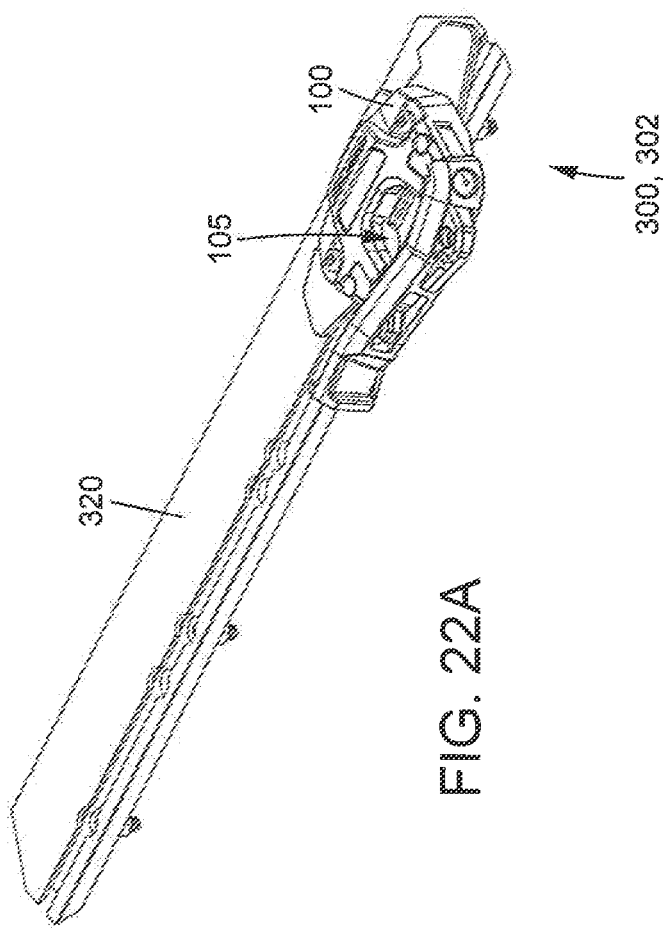
FIG. 22B
FIG. 22A

ACCESSORY MOUNTING SYSTEM FOR A VEHICLE AND METHOD FOR USING THE SAME

CROSS-REFERENCE TO RELATED APPLICATIONS

This application claims priority under 35USC § 119(e) of U.S. Provisional Application No. 62/980,704, filed Feb. 24, 2020, entitled "ACCESSORY MOUNTING SYSTEM FOR A VEHICLE AND METHOD FOR USING THE SAME", and of U.S. Provisional Application No. 63/106,498, filed on Oct. 28, 2020, entitled "SLIDE RAIL ASSEMBLY FOR AN OFF-ROAD VEHICLE AND METHOD OF USING SAME", and of U.S. Provisional Application No. 63/106,554, filed on Oct. 28, 2020, entitled "ACCESSORY BASE ASSEMBLY FOR AN OFF-ROAD VEHICLE AND METHOD OF USING SAME", the entirety of which are hereby incorporated by reference.

TECHNICAL FIELD

The technical field generally relates to apparatuses, systems and methods for mounting an accessory to a vehicle.

BACKGROUND

Vehicles are assembled and sold with a standard equipment package. However, an owner of the vehicle may wish to add one or more accessories to the vehicle, such as additional storage units, fuel tanks, racks, seats, etc., after the vehicle has been manufactured. Such an accessory may be referred to as an aftermarket accessory. It is desirable to securely attach said accessory to a vehicle surface in a safe and efficient manner.

Despite ongoing developments in the field of accessory mounting systems, there is still room for further improvements. More particularly, improvements related to some characteristics of accessory mounting systems, such as "universality" (i.e. being adaptable to fit with multiple accessories from different manufacturers), "reliability" (i.e. being configured to prevent unintended release of the accessory), and "anti-theft security" (i.e. being configured to prevent unauthorized release of the accessory), are desirable. In addition, improving such characteristics in a cost effective manner has proven to be challenging, and thus continued improvements in this area remain desirable.

SUMMARY

The present technology generally relates to an accessory mounting system configured to be installed on a vehicle surface, the accessory mounting system includes a first accessory mounting fixture having a locking assembly, and a second accessory mounting fixture.

Therefore, the present technology relates to a first accessory mounting fixture, a second accessory mounting fixture, an accessory mounting system comprising said first and second accessory mounting fixtures, and a method of using the same for mounting an accessory on a vehicle.

The first fixture has a body configured to connect to the vehicle surface, a locking assembly being connected thereto and having two hingedly connected parts which, once closed around a portion of the accessory, are kept in closed state thanks to a complementary locking feature neutralizing and/or counteracting an opening force applied to it, therefore preventing inadvertent release of the accessory. An additional, or alternative, resilient member removably connected to both hingedly connected parts biases the locking assembly by maintaining a closing force to it. The hingedly connected parts can be further adapted to receive a locking device to prevent theft of the accessory.

The second fixture has a body being configured to connect to the vehicle surface and having an opening configured to receive a portion of the accessory, and is disposed spaced from the first fixture.

The accessory has a first and a second protruding portions configured to be received by the first and second fixtures. The accessory is engaged in both first and second fixtures by performing a translation, prior to closing the locking assembly of the first fixture to secure it in place.

According to an aspect, there is provided an accessory mounting fixture for a vehicle. The accessory mounting fixture includes a fixture body connectable to a vehicle surface and having a substantially U-shape defining a frontal opening adapted for receiving an accessory portion. The mounting fixture also includes a locking assembly operatively connected to the fixture body and adapted to selectively secure the accessory portion within the frontal opening. The locking assembly includes a first lock member which has a proximal end pivotally connected to the fixture body on a first side of the frontal opening and a distal end. The first closure member is operable between a closed position where the first lock member extends across the frontal opening and the distal end thereof engages the fixture body on a second side of the frontal opening for confining the accessory portion within the frontal opening, and an open configuration. The locking assembly also has a second lock member having a proximal end pivotally connected to the fixture body on the second side of the frontal opening and a distal end. The second closure member is operable between a closed position where the second lock member at least partially covers the first lock member, and an open configuration. When the first and second lock members are in the closed position the accessory portion is at least partially secured within the frontal opening.

According to a possible embodiment, the locking assembly further comprises a resilient member coupled to the second lock member and adapted to engage the first lock member when positioning the second lock member in the closed position, wherein engagement of the first lock member by the resilient member biases at least one of the first and second lock members in their respective closed positions.

According to a possible embodiment, the first lock member comprises a tab protruding outwardly therefrom, and the resilient member comprises a tab-receiving opening defined through a thickness thereof, the tab-receiving opening being shaped and sized to receive the tab therein, and wherein positioning the tab through the tab-receiving opening biases the second lock member in the closed position.

According to a possible embodiment, the resilient member is stretchable and adapted to be stretched for positioning the tab-receiving opening over the tab in order to have the tab extend through the tab-receiving opening.

According to a possible embodiment, the tab is hook-shaped to prevent disengagement of the resilient member therefrom when the tab extends through the tab-receiving opening.

According to a possible embodiment, positioning the second lock member in the closed position prevents moving the first lock member in the open position.

According to a possible embodiment, one of the first and second lock members comprises a locking recess, and wherein the other one of the first and second lock members comprises a locking protrusion, the locking protrusion being complementarily-shaped relative to the locking recess and configured to engage the locking recess when positioning the first and second lock members in the closed position.

According to a possible embodiment, the locking protrusion comprises a protrusion surface, and the recess comprises a recess surface, and wherein when the first and second lock members are in the closed position, the recess surface is adapted to abut against the protrusion surface when opening the first lock member, thereby blocking movement of the first lock member.

According to a possible embodiment, positioning the first lock member in the closed position defines a generally hexagonal-shaped loop confining the accessory portion.

According to a possible embodiment, the fixture body further comprises a slot defined in a bottom surface thereof and communicating with the frontal opening, the slot being adapted to receive a first end of the accessory portion therein for positioning the first end between the fixture body and the vehicle surface.

According to a possible embodiment, the first lock member comprises a secondary slot defined in a bottom portion thereof and adapted to receive a second end if the accessory portion therein for positioning the second end between the first lock member and the vehicle surface.

According to a possible embodiment, the first lock member comprises a first locking aperture, and the second lock member comprises a second locking aperture, and wherein positioning the first and second lock members in the closed position aligns the first and second locking apertures to enable a locking device to extend through the apertures and selectively secure the first and second lock to one another.

According to a possible embodiment, the locking device is a padlock.

According to a possible embodiment, the vehicle is a snowmobile.

According to another aspect, there is provided an accessory mounting system for mounting an accessory on a vehicle. The accessory mounting system includes a first fixture comprising the accessory mounting fixture as defined above for connecting a first portion of the accessory to the vehicle. The accessory mounting system further includes a second fixture having a body connectable to a vehicle surface opposite the first fixture, the second fixture being adapted to receive a second portion of the accessory for connecting the second portion to the vehicle.

According to a possible embodiment, the second fixture has a passage defined between the body and the vehicle surface configured to receive the second portion of the accessory.

According to a possible embodiment, the first fixture and the second fixture are alignec with one another across the vehicle surface.

According to a possible embodiment, the second fixture comprises the accessory mounting fixture as defined in any one of claims 1 to 14.

According to another aspect, a method for mounting an accessory on a vehicle surface using the accessory mounting system defined above is provided. The accessory has a body with a first end provided with a first protruding portion and a second end provided with a second protruding portion, and the method includes the steps of engaging the first protruding portion with the first fixture; engaging the second protruding portion with the second fixture; and operating the locking assembly for securing the first protruding portion to the first fixture.

According to a possible embodiment, the steps of engaging the first protruding portion with the first fixture and engaging the second protruding portion with the second fixture are performed simultaneously.

According to a possible embodiment, the step of operating the locking assembly comprises the steps of: positioning the first lock member in the closed position; and positioning the second lock member in the closed position.

According to another aspect, there is provided an accessory mounting fixture for mounting an accessory to a vehicle, the accessory mounting fixture includes a fixture body connectable to the vehicle and having a substantially U-shape defining a frontal opening adapted for receiving an accessory portion; and a locking assembly operatively connected to the fixture body and comprising a first lock member pivotally connected to the fixture body on a first side of the frontal opening, and a second lock member pivotally connected to the fixture body on a second side of the frontal opening, the first and second lock members being operable to selectively secure the accessory portion within the frontal opening, where the locking assembly is operable to secure the first and second lock members in the closed position in order to secure the accessory portion within the frontal opening.

According to another aspect, there is provided an accessory mounting system for mounting an accessory on a vehicle. The accessory mounting system includes a mounting assembly which includes an elongated rail removably connectable to the vehicle, the elongated rail being provided with an elongated slot extending therealong and opening on a top surface of the elongated rail. The mounting assembly also includes a connector having a head portion adapted to be slidably mounted within the slot of the elongated rail, and a shank portion extending from the head and vertically above the top surface of the elongated rail, and a mounting fixture connectable to the connector and adapted to selectively have a portion of the accessory be connected thereto, the mounting fixture being connected to the connector in a manner such that moving the connector along the slot correspondingly displaces the mounting fixture along the elongated rail to adjust the position of the accessory on the vehicle.

According to a possible embodiment, the top surface of the elongated rail at least partially overhangs the slot to limit vertical movement of the connector when within the slot.

According to a possible embodiment, the slot has an inverted T-shape.

According to a possible embodiment, the slot comprises parallelly extending sidewalls, and wherein the head portion of the connector is adapted to engage the sidewalls to prevent rotation of the connector within the slot.

According to a possible embodiment, the elongated rail is connected to the vehicle via fasteners extending through a bottom surface of the slot.

According to a possible embodiment, the shank portion comprises a male connector, and wherein the mounting fixture comprises a female connector configured to be coupled to the male connector.

According to a possible embodiment, the shank portion comprises a female connector, and wherein the mounting fixture comprises a male connector configured to be coupled to the female connector.

According to a possible embodiment, the male connector comprises one or more fasteners extending through the mounting fixture and adapted to engage the shank portion, and wherein the fasteners are selectively operable to secure the position of the connector along the slot.

According to a possible embodiment, the elongated rail comprises an interior portion having an interior edge shaped and adapted to conform to a portion of the vehicle to which the elongated rail is connected.

According to a possible embodiment, the interior edge is tapered such that the top surface extends further than a bottom surface along the interior edge.

According to a possible embodiment, the interior portion comprises a second slot extending therealong and opening on a bottom surface of the elongated rail.

According to a possible embodiment, the bottom surface at least partially overhangs the second slot.

According to a possible embodiment, the second slot has a T-shape.

According to a possible embodiment, the elongated rail comprises an exterior portion comprising the slot, and wherein the slot and the second slot are laterally adjacent to one another.

According to a possible embodiment, the slot and second slot are parallel to one another.

According to a possible embodiment, the mounting fixture comprises a locking assembly operable to selectively secure the portion of the accessory thereto, therefore securing the accessory to the vehicle.

According to a possible embodiment, the mounting assembly comprises a plurality of connectors slidably mounted within the slot and a plurality of mounting fixtures connectable to respective connectors.

According to a possible embodiment, the mounting assembly is a first mounting assembly, and the accessory mounting system comprises a second mounting assembly which includes a second elongated rail removably connectable to the vehicle, a second connector slidably mounted along the elongated rail, and a second mounting fixture connectable to the second connector and adapted to selectively have a second portion of the accessory be connected thereto, the second mounting fixture being connected to the second connector in a manner such that moving the connector along the second elongated rail correspondingly displaces the second mounting fixture to adjust the position of the accessory on the vehicle.

According to a possible embodiment, the second elongated rail is substantially identical to the elongated rail.

According to a possible embodiment, the first and second elongated rails are adapted to be installed opposite and parallel to one another on the vehicle.

According to another aspect, an accessory mounting system for mounting an accessory on a vehicle is provided. The accessory mounting system includes a stacking assembly which includes a support structure adapted to be coupled to the vehicle, the support structure having a length extending along a longitudinal axis. The support structure includes a first support segment having a first fixture end and a first interlocking section extending from the first fixture end; and a second support segment having a second fixture end and a second interlocking section extending from the second fixture end, the first and second interlocking sections being adapted to slidably engage one another to selectively define the length of the support structure and position the first fixture end opposite the second fixture end. The accessory mounting system further includes a support segment latch adapted to selectively secure the first support segment and the second support segment together and block movement of the first support segment and of the second support segment along the longitudinal axis, a first mounting fixture connectable to the first fixture end, a second mounting fixture connectable to the second fixture end, the accessory being selectively connectable to the first and second mounting fixtures for connecting the accessory to the support structure, wherein adjusting the length of the support structure correspondingly adjusts the distance between the first and second mounting fixtures.

According to a possible embodiment, the first and second interlocking sections are adapted to block a rotational movement of the first and second support segments about the longidutinal axis when slidably engaged with one another.

According to a possible embodiment, the first and second interlocking sections are adapted to block a rotational movement of the first and second support segments about a transversal axis extending perpendicularly relative to the longidutinal axis when slidably engaged with one another.

According to a possible embodiment, the first and second interlocking sections are adapted to restrict movement of the first and second support segments to an axial movement along the longidutinal axis when slidably engaged with one another.

According to a possible embodiment, the accessory is a second accessory, and wherein the support structure is adapted to be mounted on a first accessory coupled to the vehicle to position the first and second accessories in a stacked configuration.

According to a possible embodiment, the first interlocking section comprises a first interlocking member and a second interlocking member, the second interlocking section comprises a third interlocking member and a fourth interlocking member, and wherein engaging the first and second interlocking sections together comprises positioning the first interlocking member below the fourth interlocking member and positioning the second interlocking member over the third interlocking member.

According to a possible embodiment, the first and third interlocking members are adapted to be positioned in a first plane when the first and second interlocking sections are slidably engaged with one another, and wherein the second and fourth interlocking members are adapted to be positioned in a second plane when the first and second interlocking sections are slidably engaged with one another.

According to a possible embodiment, the first and second planes are parallel to one another.

According to a possible embodiment, the support segment latch comprises a latch body fastenable to a pair of interlocking members positioned in one of the first and second planes.

According to a possible embodiment, at least one of the second and fourth interlocking members comprises a key slot, and wherein the support segment latch comprises a key portion extending downwardly from the latch body, the key portion being shaped and adapted to engage the key slot in a manner positioning the latch body perpendicularly across the second and fourth interlocking members.

According to a possible embodiment, at least one of the first and third interlocking members comprises a guide slot extending longitudinally along the corresponding interlocking member and being adapted to align with the key slot, and wherein the key portion is adapted to extend through the key slot and engage the guide slot for guiding the axial movement of the first and second support segments along the longitudinal axis.

According to a possible embodiment, the first and second interlocking members are spaced from one another and define a first slit therebetween, the third and fourth interlocking members are spaced from one another and define a second slit therebetween, and wherein the first and second slits are aligned when the first and second interlocking sections are slidably engaged with one another.

According to a possible embodiment, the first and second mounting fixtures are integrally formed as part of the first and second support segments, respectively.

According to a possible embodiment, the first support segment is structurally identical to the second support segment.

According to a possible embodiment, the stacking assembly further comprises a support connector coupled between the support structure and the vehicle, the support connector being adapted to position the support structure in a raised configuration for positioning one or more accessories beneath the support structure.

According to a possible embodiment, the support connector comprises a connector plate connectable to the support structure, and one or more connector struts extending downwardly from the connector plate, and wherein the support structure is raised by a distance corresponding to a length of the connector struts.

According to a possible embodiment, the accessory mounting system further includes a plurality of stacking assemblies connectable to one another in a stacked configuration, wherein the connector struts of one stacking assembly engages the support structure of another stacking assembly positioned below.

According to another aspect, a method of mounting at least a first accessory and a second accessory to a vehicle using the mounting system defined above is provided. The method includes the steps of coupling the first accessory to a vehicle surface; adjusting the length of the support structure based on a width of at least one of the first and second accessories; coupling the support structure to at least one of the first accessory and the vehicle surface to position the support structure at least partially above the first accessory; and connecting the second accessory to the support structure via the first and second mounting fixtures.

According to a possible embodiment, adjusting the length of the support structure comprises displacing at least one of the first and second support segments along the longitudinal axis of the support structure.

According to a possible embodiment, the method further includes the step of securing the support segment latch following the step of adjusting the length of the support structure.

BRIEF DESCRIPTION OF THE DRAWINGS

FIGS. 3A and 3B are top perspective view of a pair of mounting fixtures connected to a vehicle surface in spaced apart relation, according to possible embodiments.

FIGS. 17A to 17H are schematic representations of a method for connecting an accessory to a vehicle using the accessory mounting system, according to an embodiment.

FIGS. 18 to 20 show an alternative embodiment of the first mounting fixture.

FIGS. 22a and 22b are perspective views of a first mounting assembly (FIG. 22a) and a second mounting assembly (FIG. 22b) according to possible embodiments, showing mounting fixtures connected to an elongated rail.

DETAILED DESCRIPTION

As will be explained below in relation to various embodiments, the present disclosure relates to apparatuses, systems and methods for mounting an accessory to a vehicle. More particularly, the present disclosure describes a mounting system for mounting an accessory to a vehicle, such as a powersport vehicle. For example, the mounting system can be connected to an ATV, UTV, snowmobile, watercraft, motorcycle, or any other suitable vehicle. As will be described further below, the mounting system includes a pair of mounting fixtures connected to the vehicle in a spaced apart relation. Each mounting fixture is adapted to receive a corresponding portion of the accessory, with at least one of the mounting fixtures having a locking assembly operable to lock the accessory in place, thereby securing the accessory within the other one of the mounting fixtures, and therefore to the vehicle. The present disclosure also describes various embodiments of the mounting fixtures, and corresponding methods for connecting and securing an accessory to the mounting fixtures and to the vehicle.

Figure 1:
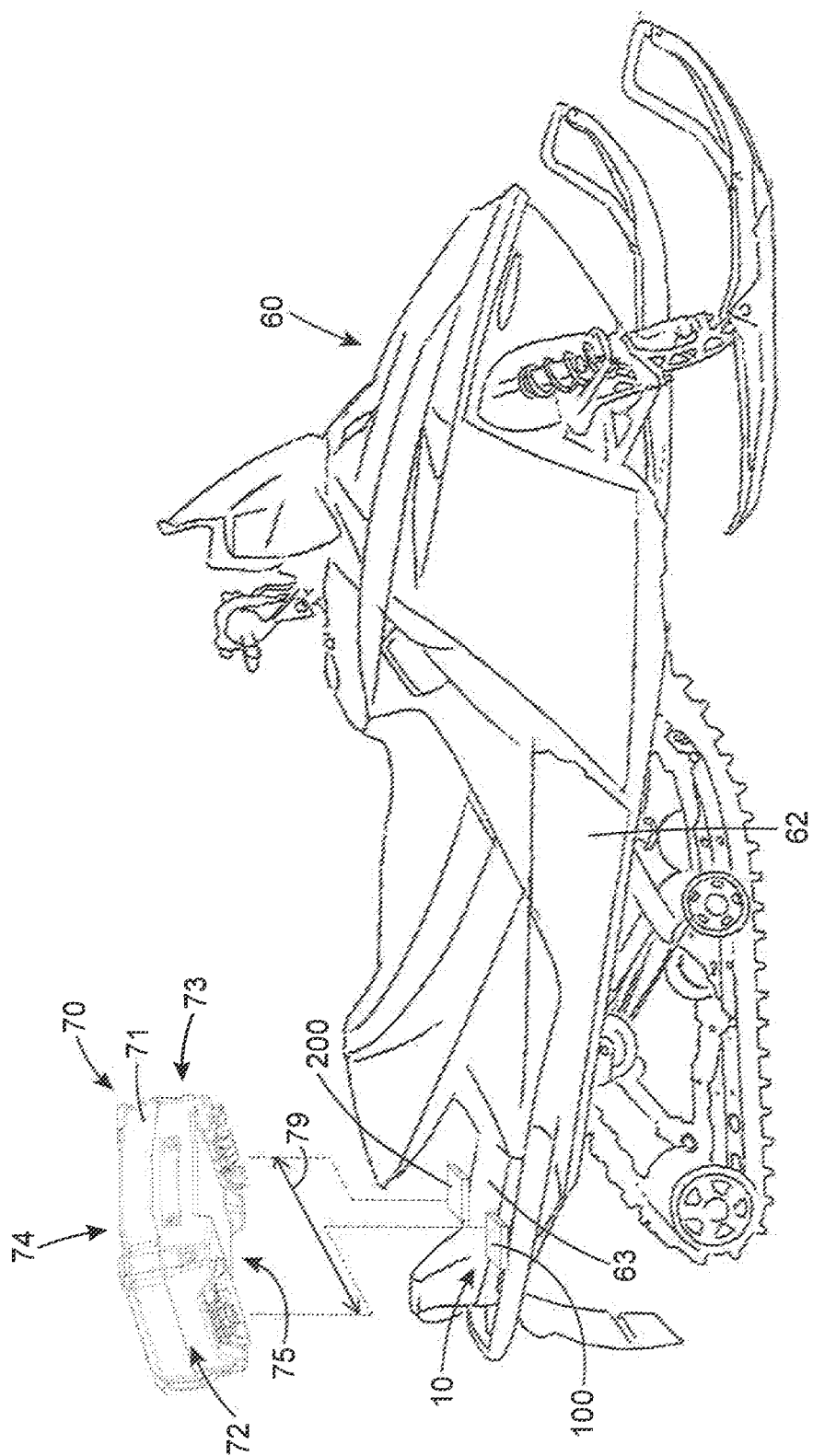
FIG. 1 is a perspective view of a vehicle provided with an accessory mounting system adapted to mount an accessory to the vehicle, according to an embodiment.
Figure 2:
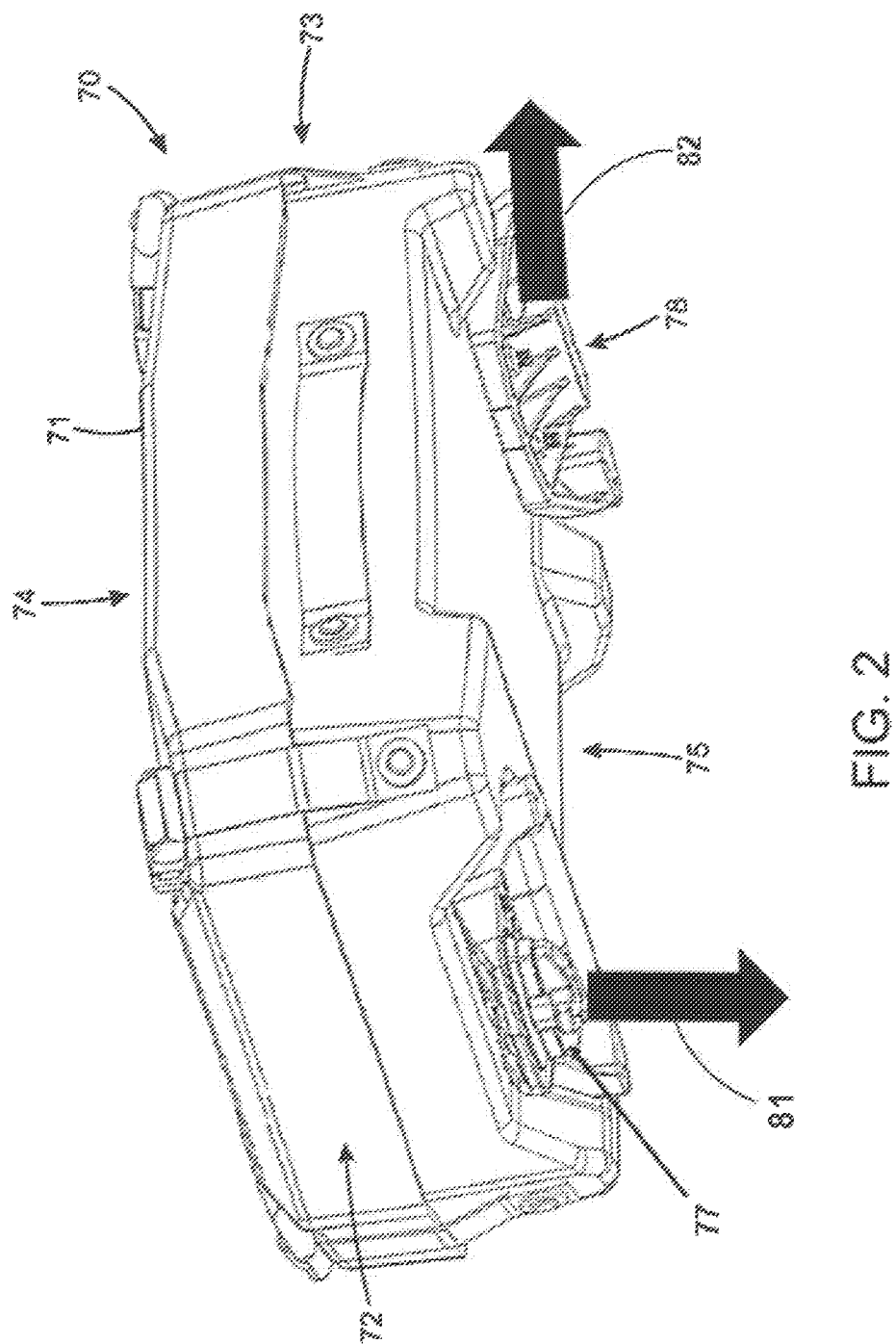
FIG. 2 is a perspective view of an accessory, according to an embodiment, showing protruding portions adapted to engage the accessory mounting system.
Figure 4:
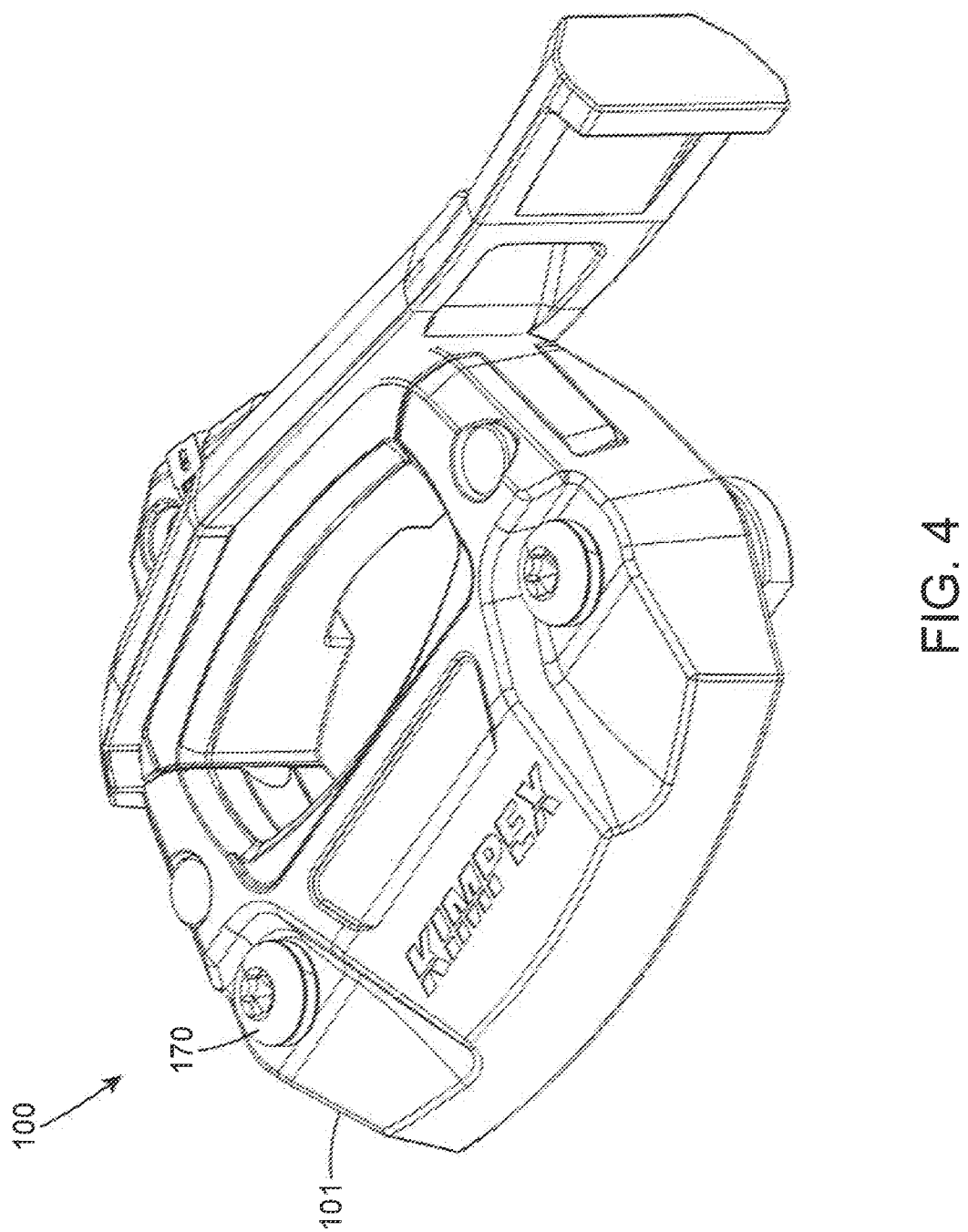
FIG. 4 is a rear perspective view of a first mounting fixture provided with a locking assembly shown in a closed configuration, according to an embodiment.

Referring to FIGS. 1 and 2, a mounting system 10 adapted for connecting an accessory 70 on a vehicle 60 is provided. In the embodiments described herein, the vehicle 60 typically corresponds to a snowmobile, although it should be understood that the snowmobile is exemplary, and that other vehicles can be used in combination with the mounting system 10. In this embodiment, the vehicle 60 includes a chassis 62 and a vehicle surface 63 at least indirectly connected to the chassis 62 for installing the accessory mounting system 10. As seen in FIG. 1, the vehicle surface 63 can correspond to a luggage area provided proximate the rear of the vehicle. It is appreciated that the vehicle surface 63 can be provided behind the driver, below the driver, beside the driver, or at any other suitable location or combination thereof. Alternatively, or additionally, the mounting system 10 can be connected to the chassis 62 of the vehicle 60 via any other suitable method, such as directly to the chassis 62, for example. In some embodiments, the vehicle surface 63 can include a single substantially planar surface. However, in some embodiments, the vehicle surface 63 can include a plurality of surfaces arranged about the vehicle, with one or more of the surfaces being coplanar with respect to one another and/or with one or more of the surfaces being in separate planes, for example.

In the context of the present technology, the term "axis" or "axes" may be used to indicate an axis of rotation, or refer to a "pivot joint" that includes all the necessary structure (e.g., bearing structures, pins, axles and other components) to permit a structure to pivot about such an axis, for example. Furthermore, it should be understood that, in the present disclosure, a pivotal connection typically includes an axle or a pin for supporting the pivotally connected parts, and the components (e.g., bearings, seals, etc.) that are generally used to allow rotation of the pivotally connected parts. As such, pivotal connections will not be described in great details in the current description. Moreover, the expression "at least indirectly connected" is understood to mean that a component may be connected to another component via one or more intermediate structures or members, and that these intermediate structures are not necessarily described in the current description.

With reference to FIGS. 3A and 3B, in addition to FIGS. 1 and 2, the accessory mounting system 10 includes a first fixture 100 and a second fixture 200 connected to the vehicle surface 63. The fixtures are illustratively separated from one another by a gap 11, which can correspond to a width of the vehicle surface, for example. The first fixture 100 is generally positioned opposite the second fixture 200 (e.g., on an opposite side of the vehicle surface 63), as seen in FIGS. 3A and 3B. As will described further below, the first fixture 100 is adapted to receive a first portion of the accessory 70, and can include a locking assembly, or locking device, configured to secure the first portion of the accessory 70 to the first fixture 100. Similarly, in some embodiments, the second fixture 200 can be adapted to receive a second portion of the accessory 70, and can include a locking assembly configured to secure the second portion of the accessory 70 to the second fixture 200. As such, the accessory 70 is connected to at least two (2) different locations on the vehicle surface 63 and is secured to the vehicle 60.

Figure 5:
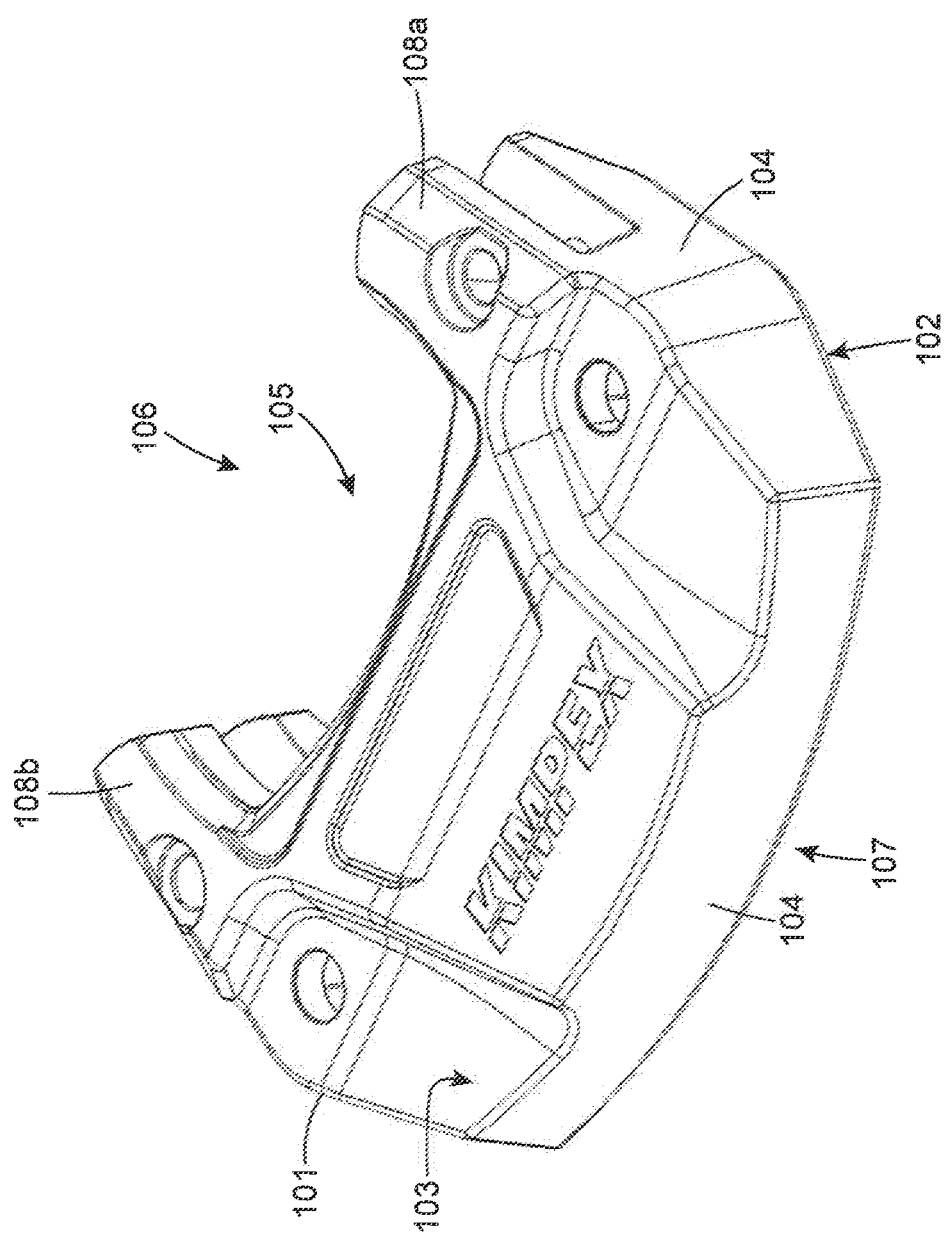
FIG. 5 is a rear perspective view of the first mounting fixture shown in FIG. 4, with the locking assembly removed therefrom, according to an embodiment.

Now referring to FIGS. 4 to 7, in addition to FIGS. 1 to 3B, the first fixture 100 includes a first fixture body 101 removably connectable to the vehicle surface 63 via any suitable manner, such as via fasteners 170, for example. In this embodiment, and as seen in FIG. 5, the first fixture body 101 can be generally U-shaped and includes lateral arms 108a, 108b extending on opposite sides of the body 101. More specifically, the first fixture body 101 can include a bottom portion (e.g., bottom surface 102) adapted to abut against the vehicle surface 63, a top portion (e.g., top surface 103) opposite the bottom portion, and sidewalls 104 extending between the bottom and top surfaces 102, 103. Furthermore, the first fixture body 101 includes a front portion 106 and a rear portion 107, with the lateral arms 108a, 108b extending from the front portion 106 of the body 101 on opposite sides thereof. The lateral arms 108a, 108b illustratively define a frontal opening 105 therebetween shaped and sized to receive a portion of the accessory therein (e.g., the first portion of the accessory 70).

In some embodiments, the first fixture 100 can be substantially planar such that the bottom surface 102 can lay flat on the vehicle surface 63. In alternative embodiments, the first fixture body 101 can be at least partially curved (e.g., along the bottom surface) to cooperate with a curved surface of the vehicle 60, for example. In addition, when the first fixture 100 is connected to the vehicle surface 63, the first fixture body 101 can be disposed in a manner where the lateral arms, 108*a*, 108*b* extend away from the vehicle 60 (e.g., away from the second fixture 200—see FIGS. 3A and 3B). Therefore, it is appreciated that the frontal opening 105 is defined in a manner such that it opens towards the exterior of the vehicle 60. However, it is appreciated that the first fixture 100 can be connected to the vehicle 60 in any suitable manner, such as the lateral arms 108*a*, 108*b* extend inwardly, i.e., towards the second fixture 200, for example.

In some embodiments, the first fixture 100 can include a locking assembly 120 operatively connected to the first fixture body 101, and operable to selectively secure an accessory portion within the frontal opening 105. More specifically, and as will be described further below, the locking assembly 120 can include one or more elongated members connected to the lateral arms of the body. The elongated members can be adapted to extend between the lateral arms 108*a*, 108*b*, thereby closing the frontal opening 105. In some embodiments, the locking assembly 120 can be operable between an open configuration, where access is provided to the frontal opening 105 for positioning the accessory portion therein, a closed configuration, where the frontal opening 105 is at least partially closed and where the accessory portion is generally confined within the frontal opening 105, and a locked configuration, where the accessory portion is secured within the frontal opening 105.

Figure 8:
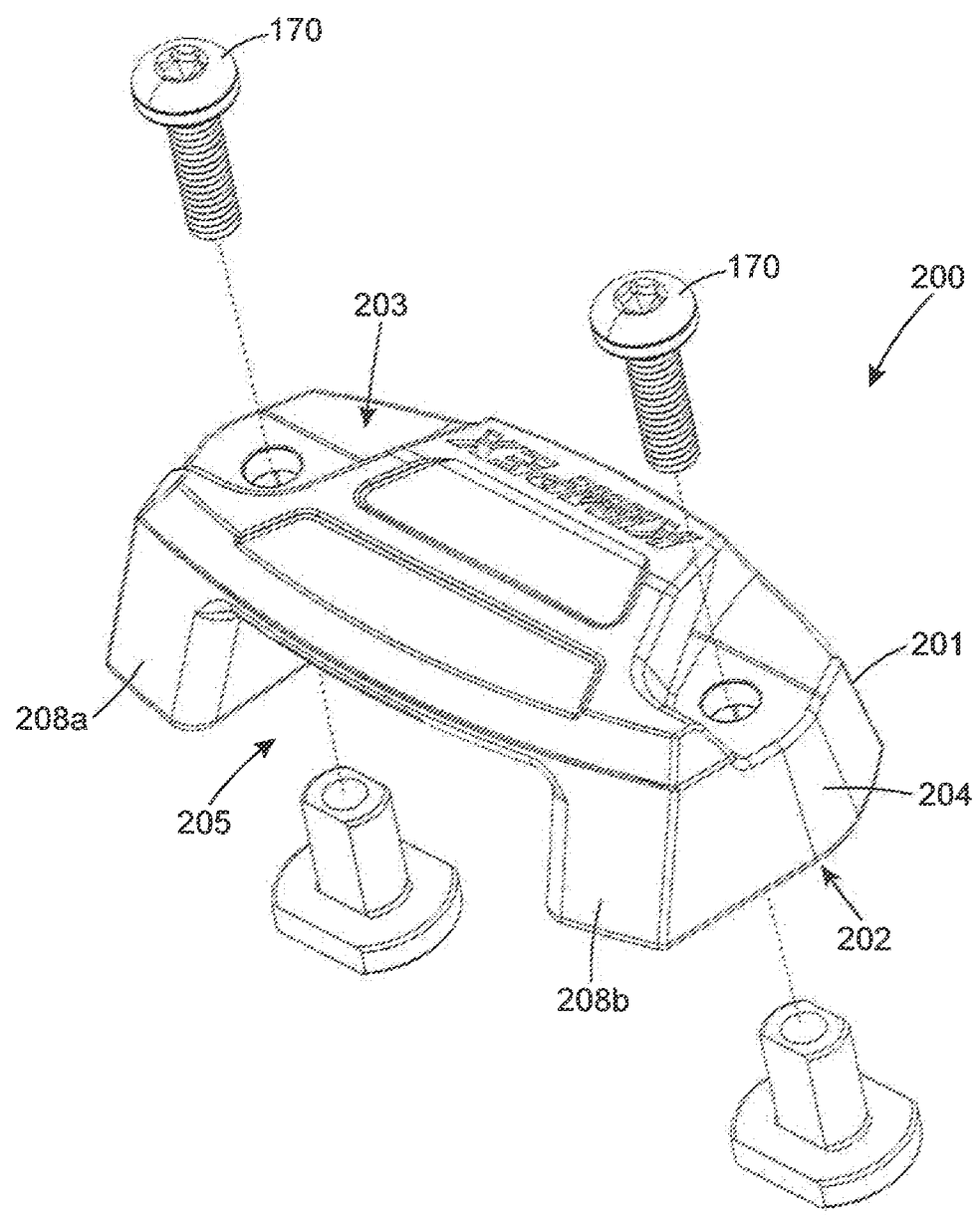
FIG. 8 is a perspective view of a second mounting fixture according to an embodiment.
Figure 9:
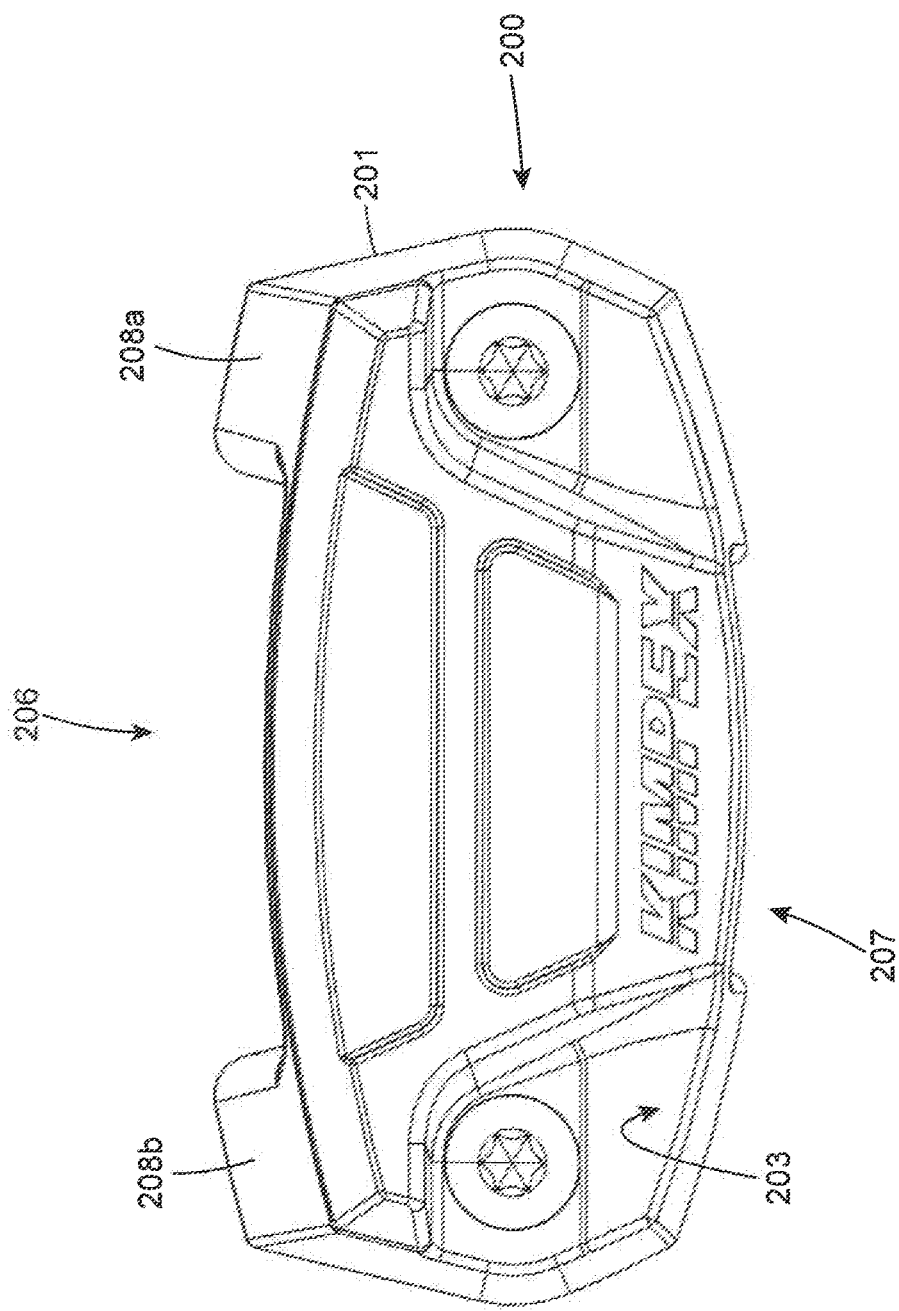
FIG. 9 is a top view of the second mounting fixture shown in FIG. 8, showing a passage extending below a top surface thereof, according to an embodiment.
Figure 10:
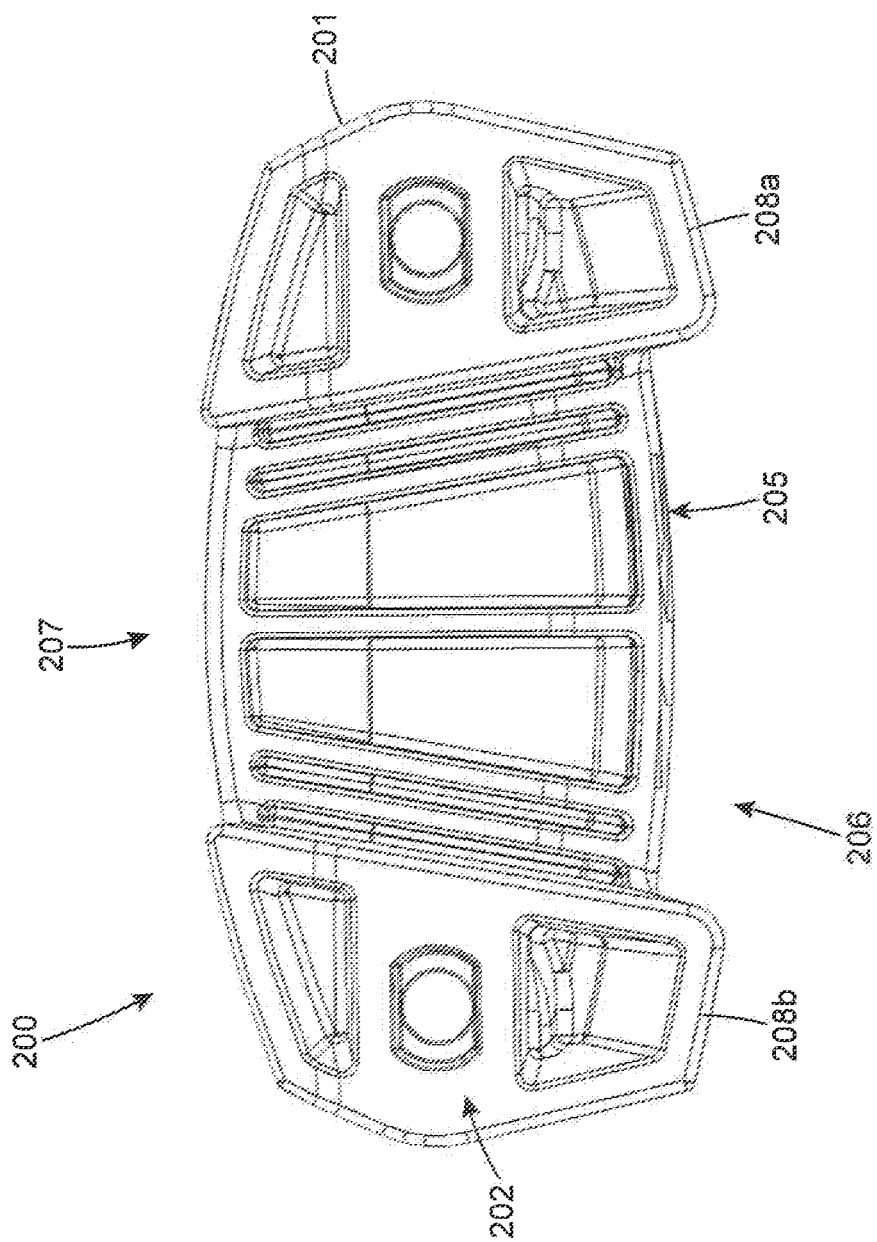
FIG. 10 is a bottom view of the second mounting fixture shown in FIGS. 8 and 9, showing the passage opening on a front side and a rear side of the second mounting fixture, according to an embodiment.

Now referring to FIGS. 8 to 10, the second fixture 200 includes a second fixture body 201 removably connectable to the vehicle surface via any suitable manner, such as via fasteners 170, for example. In this embodiment, the second fixture body 201 can be generally U-shaped and include lateral segments 208*a*, 208*b* extending on opposite sides of the body 201. More specifically, the second fixture body 201 can include a bottom portion (e.g., bottom surface 202), a top portion (e.g., top surface 203) opposite the bottom portion, and sidewalls 204 extending between the bottom and top surfaces 202, 203. Furthermore, the second fixture body 201 includes a front portion 206 and a rear portion 207, with the lateral segments 208*a*, 208*b* extending from the bottom surface 202 of the body 201 on opposite sides thereof. As such, it should be understood that the lateral segments 208*a*, 208*b* extend generally perpendicularly with respect to the second fixture body 201, and are adapted to engage the surface of the vehicle to connect the second fixture 200 to the vehicle. The lateral segments 208*a*, 208*b* illustratively define a passage 205 therebetween shaped and sized to receive a portion of the accessory therein (e.g., the second portion of the accessory 70).

As seen in FIG. 10, in some embodiments, the passage 205 extends through the second fixture body 201, i.e., extends between the front and rear portions 206, 207. In this embodiment, the passage 205 is inwardly tapered between the front and rear portions such that the distance between the lateral segments 208*a*, 208*b* proximate the front portion 206 is greater than the distance between the lateral segments 208*a*, 208*b* proximate the rear portion 207, although other configurations are possible and may be used. Furthermore, when connecting the second fixture 200 to the vehicle, the lateral segments 208*a*, 208*b* engage the vehicle surface such that the vehicle surface further defines the passage 205. In other words, the passage 205 can be defined between the lateral segments 208*a*, 208*b*, and between the bottom surface 202 and the vehicle surface. However, it is appreciated that other configurations of the second fixture 200 are possible, such as having a passage 205 which extends only partially through the second fixture body 201, for example. It is appreciated that securing the accessory to at least one of the first and second fixtures 100, 200 can secure the accessory to the vehicle, such that the accessory will remain connected thereto during use of the vehicle (e.g., while driving/travelling).

Referring back to FIGS. 1 to 3B, a possible embodiment of the accessory 70 will be described. It should be understood that the following description of the accessory 70 is intended to be illustrative only and is not intended to define the scope of the present technology, or set forth the bounds of the present technology. In this embodiment, the accessory 70 includes an accessory body 71 having a first end 72, a second end 73 spaced from the first end 72, an upper portion 74 and a lower portion 75. In some embodiments, the first portion of the accessory 70 includes a first protruding portion 77 provided proximate the first end 72, and the second portion is a second protruding portion 78 provided proximate the second end 73, although it is appreciated that other configurations are possible. In this embodiment, the accessory 70 can be connected to the accessory mounting system 10 via engagement of the first protruding portion 77 with the first fixture 100 (e.g., with the frontal opening 105), and engagement of the second protruding portion 78 with the second fixture 200 (e.g., with the passage). The accessory 70 can further be secured to the mounting system 10 via operation of the locking assembly 120 of the first fixture 100, as will be described below.

In some embodiments, the first protruding portion 77 extends in a first direction for engaging the first mounting fixture (e.g., for engaging the frontal opening 105) and the second protruding portion 78 extends in a second direction for engaging the second mounting fixture (e.g., for engaging the passage 205). For example, the first and second directions can be generally the same such that the first protruding portion 77 extends in the same direction as the second protruding portion 78. For example, the first protruding portion 77 can extend towards the second end 73, and thus towards the second protruding portion 78, and the second protruding portion 78 can extend away from the second end 73, and thus away from the first protruding portion 77. In this embodiment, and as seen in FIG. 2, the first direction 81 is generally perpendicular to the second direction 82, where the first protruding portion 77 extends downwardly from the first end 72 so as to enable engagement with the frontal opening from above, and the second protruding portion 78 extends away from the second end 73 so as to enable engagement with the passage from the front. However, and as will be described further below, the first protruding portion 77 can include transversely extending protrusions for engaging the first fixture. As such, it is appreciated that the transversely extending protrusions can be substantially parallel to the second direction 82.

In addition, the first and second protruding portions 77, 78 can be separated from one another by a gap 79 (see FIG. 1), which can be substantially equal to the gap 11 of the accessory mounting system 10 (see FIG. 3A). Therefore, it should be understood that, in this embodiment, the first and second protruding portions 77, 78 are spaced from one another by generally the same distance separating the first and second fixtures 100, 200.

In some embodiments, the first fixture 100 and second fixture 200 can be substantially aligned across the surface of the vehicle 63, as shown in FIG. 3A. In other embodiments, the first and second fixtures 100, 200 can be at least partially offset from one another, but remain parallel such that the first and second directions 81, 82 also remain parallel, as shown in FIG. 3B. In some embodiments, the protruding portions 77, 78 are integrally formed as part of the accessory 70, although it is appreciated that at least one of the protruding portions 77, 78 can be removably connectable to the accessory 70, and thus interchangeable with other designs of protruding portions, for example.

In some embodiments, the first fixture body 101 can include a slot 115 (see FIG. 11) defined in the bottom surface 102 and communicating with the frontal opening 105. The slot 115 is shaped and sized to receive therein a part of the first protruding portion 77, such as a distal end 77a (see FIG. 17C) of the first protruding portion 77, for example. In other words, the distal end 77a of the first protruding portion 77 can be adapted to extend within the slot 115 so as to be positioned below the first fixture body 101, e.g., between the vehicle surface 63 and the bottom surface 102. It is thus noted that the distal end 77a can extend substantially parallel to the second direction 82 (seen in FIG. 2). As will be further described below, positioning the first protruding portion 77 within the slot 115 can prevent vertical movement of the accessory 70 (e.g., due to the abutment of the first protruding portion 77 with the first fixture body 101). Moreover, operating the locking assembly 120 in the locked configuration can prevent horizontal movement of the accessory 70, or at least of the first protruding portion 77. Finally, it is noted that engagement of the accessory 70 with fixtures positioned at at least two (2) separate locations can prevent rotation of the accessory 70 on the vehicle surface 63, thereby blocking movement and securing the accessory 70.

In some embodiments, the accessory 70 can be adapted to fit within the gap 11, which can be different for each vehicle 60, without requiring adjustment(s). In other embodiments, the accessory 70 can be configurable between different configurations, such that the gap 79 between the protruding portions 77, 78 can be adjusted to match the gap 11 of the vehicle surface 63. For example, multiple hole patterns, slots and/or interface plate(s) can be used to adjust the size of the gap 79. Alternatively, or additionally, the accessory mounting system 10 can be configurable between different configurations such that the gap 11 can be adjusted to match the gap 79, for example.

Figure 11:
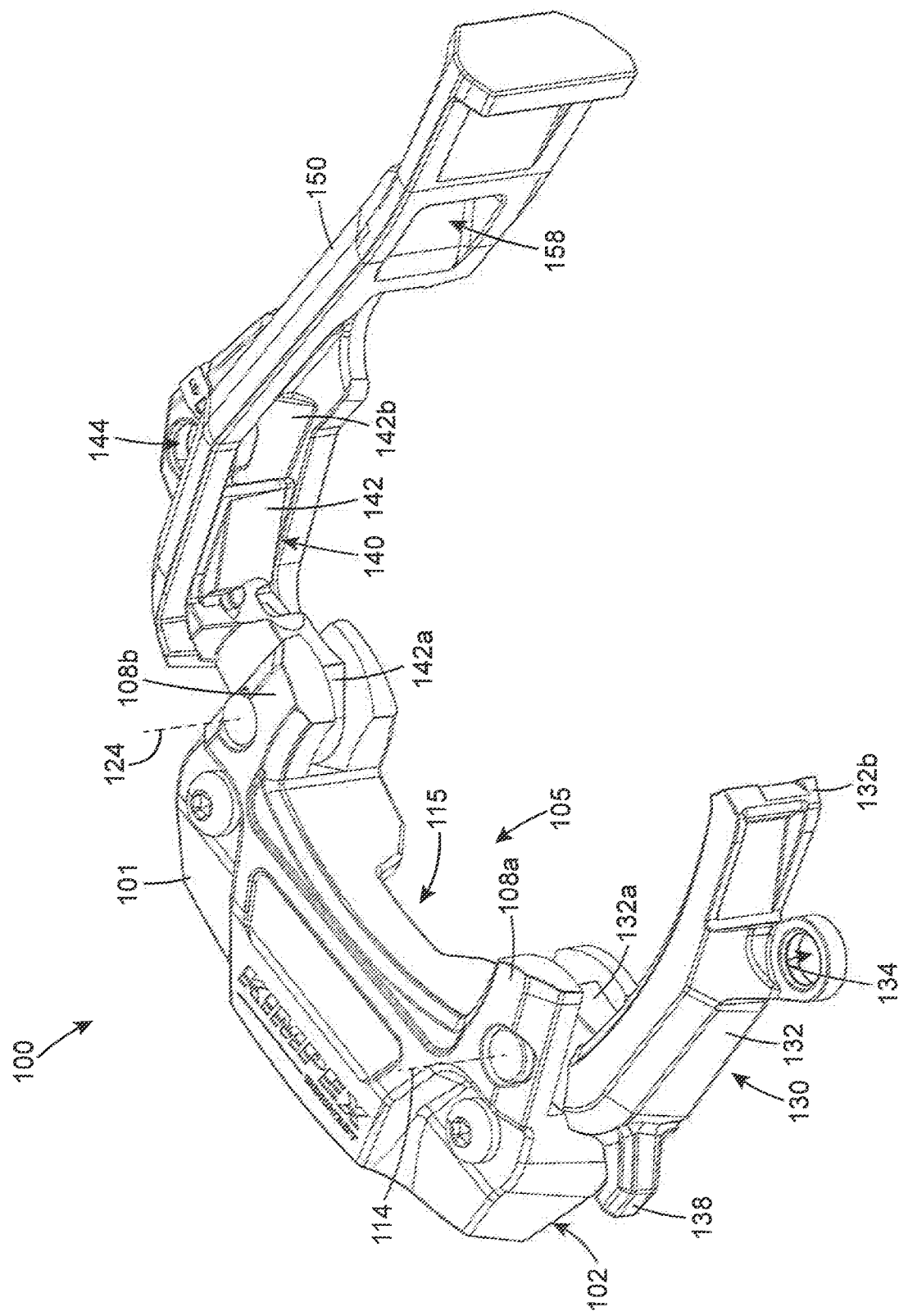
FIGS. 11 to 13 are front perspective views of the first mounting fixture shown in FIG. 4, showing the locking assembly in an open configuration (FIG. 11), showing the first lock member in the closed position and the second lock member in the open position (FIG. 12), and showing the locking assembly in the closed configuration (FIG. 13), according to possible embodiments.
Figure 12:
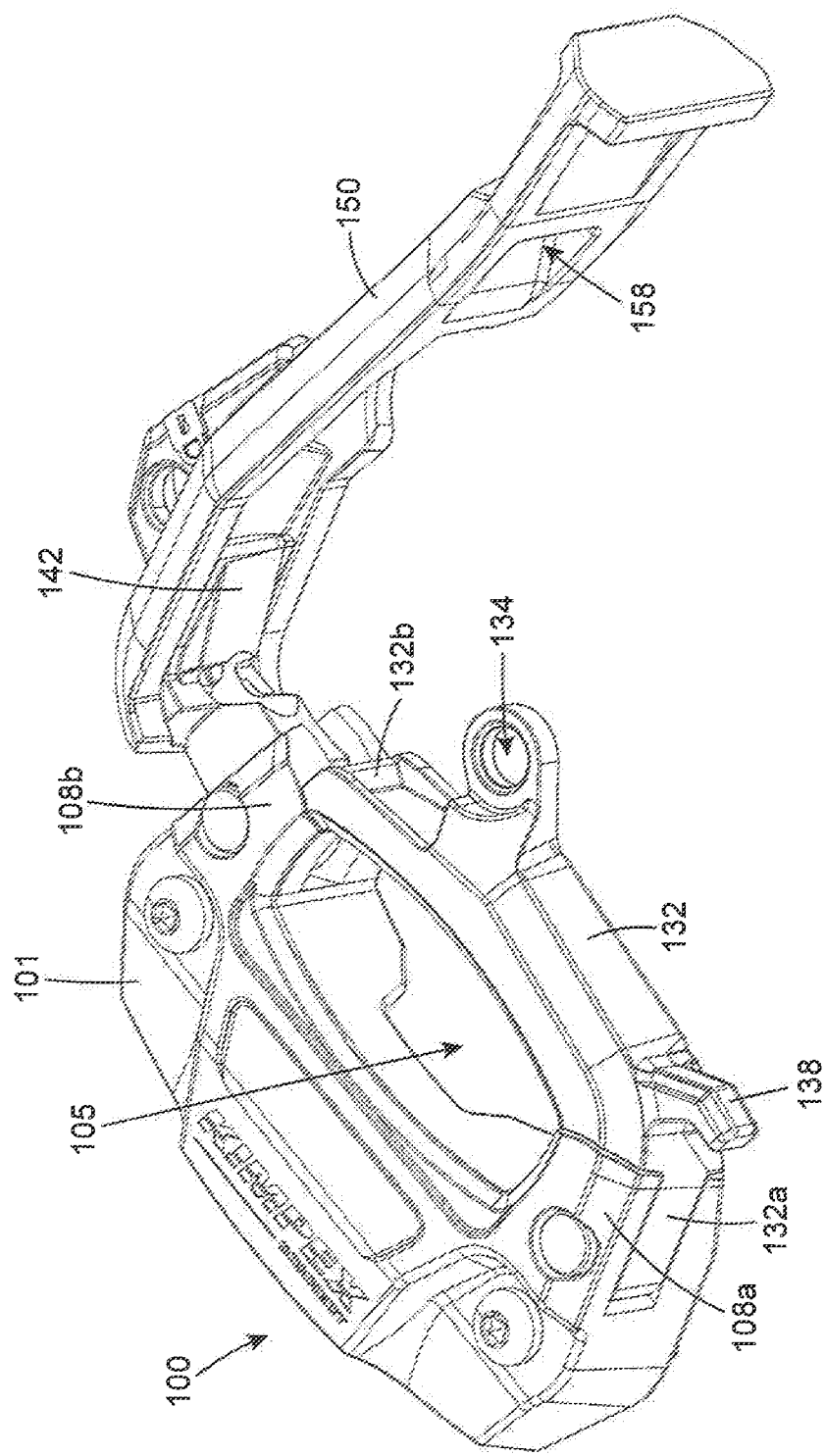
Figure 13:
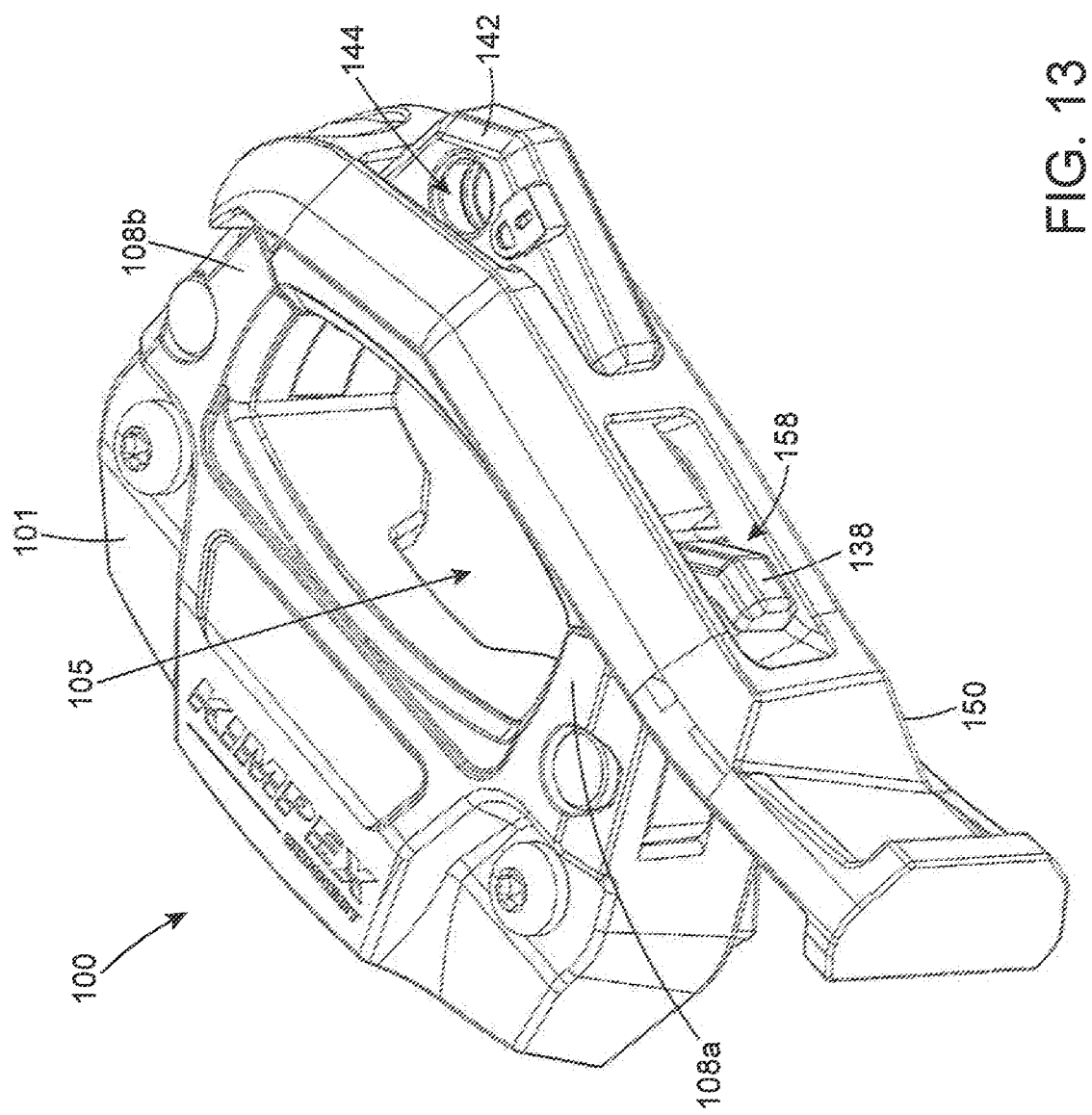

Now referring to FIGS. 11 to 13, in addition to FIGS. 4 to 7, as mentioned above, the locking assembly 120 can be selectively operated to secure the accessory 70 to at least one of the first and second fixtures 100, 200, such that the accessory 70 is secured to the vehicle 60. In this embodiment, the locking assembly 120 includes a first lock member 130 and a second lock member 140 adapted to cooperate with one another to prevent inadvertent release of the accessory 70 from within the frontal opening 105 of the first fixture body 101. In other words, in this embodiment, the first and second lock members 130, 140 cooperate together to selectively close the frontal opening 105, thereby securing the accessory portion therein.

In some embodiments, the first and second lock members 130, 140 include complementary locking features configured to engage one another when operating the lock assembly 120 in the closed configuration. More specifically, and as will be described further below, the first lock member 130 can include a first hinged member 132 pivotally connected to the body 101 and movable between a closed position (see in FIGS. 12 and 13) where the first hinged member 132 extends at least partially across the frontal opening 105, and an open position (seen in FIG. 11). Similarly, the second lock member 140 can include a second hinged member 142 pivotally connected to the body 101 and movable between a closed position (seen in FIGS. 6 and 13) where the second hinged member 142 extends at least partially across the frontal opening 105, and an open position (seen in FIGS. 11 and 12). It should be noted that positioning the hinged members 132, 142 in the closed position generally corresponds to operating the locking assembly 120 in at least one of the closed configuration and the locked configuration.

As seen in FIGS. 7 and 11 to 13, the first hinged member 130 can be pivotally connected to the first fixture body 101, and more specifically to one of the lateral arms, such as the first lateral arm 108a. In this embodiment, the first hinged member 132 is generally elongated and includes a proximal end 132a pivotally connected to the lateral arm 108a and a distal end 132b opposite the proximal end 132a. The first hinged member 132 can be operated between the open position (FIG. 11), where the distal end 132b is spaced from the fixture body 101, and the closed position (FIG. 12), where the distal end 132a is positioned proximate the fixture body 101. In the illustrated embodiment, the distal end 132b of the first hinged member 132 is adapted to engage (e.g., abut against) the second lateral arm 108b when in the closed position such that the first hinged member 132 extends across and closes the frontal opening 105, as seen in FIG. 12. It should thus be understood that, when the first protruding portion 77 of the accessory 70 is positioned within the frontal opening 105, closing the first hinged member 132 encloses the accessory portion 700 within the frontal opening 105.

In the present embodiment, the first hinged member 132 has a generally arcuate shape adapted to surround the accessory portion 77 positioned within the frontal opening 105. Moreover, in some embodiments, the first hinged member 132 can be provided with a secondary slot 135 (seen in FIG. 7) shaped and sized to receive therein a part of the first protruding portion 77, such as a proximal end 77b of the first protruding portion 77, for example. In other words, the proximal end 77b of the first protruding portion 77 can be adapted to extend within the secondary slot 135 so as to be positioned below the first fixture body 101, e.g., between the vehicle surface 63 and the first hinged member 132. It is noted that the proximal end 77b can extend substantially parallel to the second direction 82 (seen in FIG. 2) and opposite to the distal end 77a, although other embodiments are possible.

Still referring to FIGS. 7 and 11 to 13, the second hinged member 140 can be pivotally connected to the first fixture body 101, and more specifically to one of the lateral arms, such as the second lateral arm 108b. In this embodiment, the second hinged member 142 is generally elongated and includes a proximal end 142a pivotally connected to the second lateral arm 108b and a distal end 142b opposite the proximal end 142a. The second hinged member 142 can be operated between the open position (FIGS. 11 and 12), where the distal end 142b is spaced from the fixture body 101, and the closed position (FIGS. 6 and 13), where the distal end 142a is positioned proximate at least one of the fixture body 101 and the first hinged member 132. In the illustrated embodiment, the distal end 142b of the second hinged member 142 is adapted to engage (e.g., abut against) the first hinged member 132 when in the closed position such that the first and second hinged members 132, 142 at least partially overlap one another across the frontal opening 105. In the present embodiment, the second hinged member 142 has a generally arcuate shape complementary with respect to at least a portion of the first hinged member 132 so as to conform therewith and facilitate engagement of the first and second hinged members 132, 142 with one another.

Figure 6:
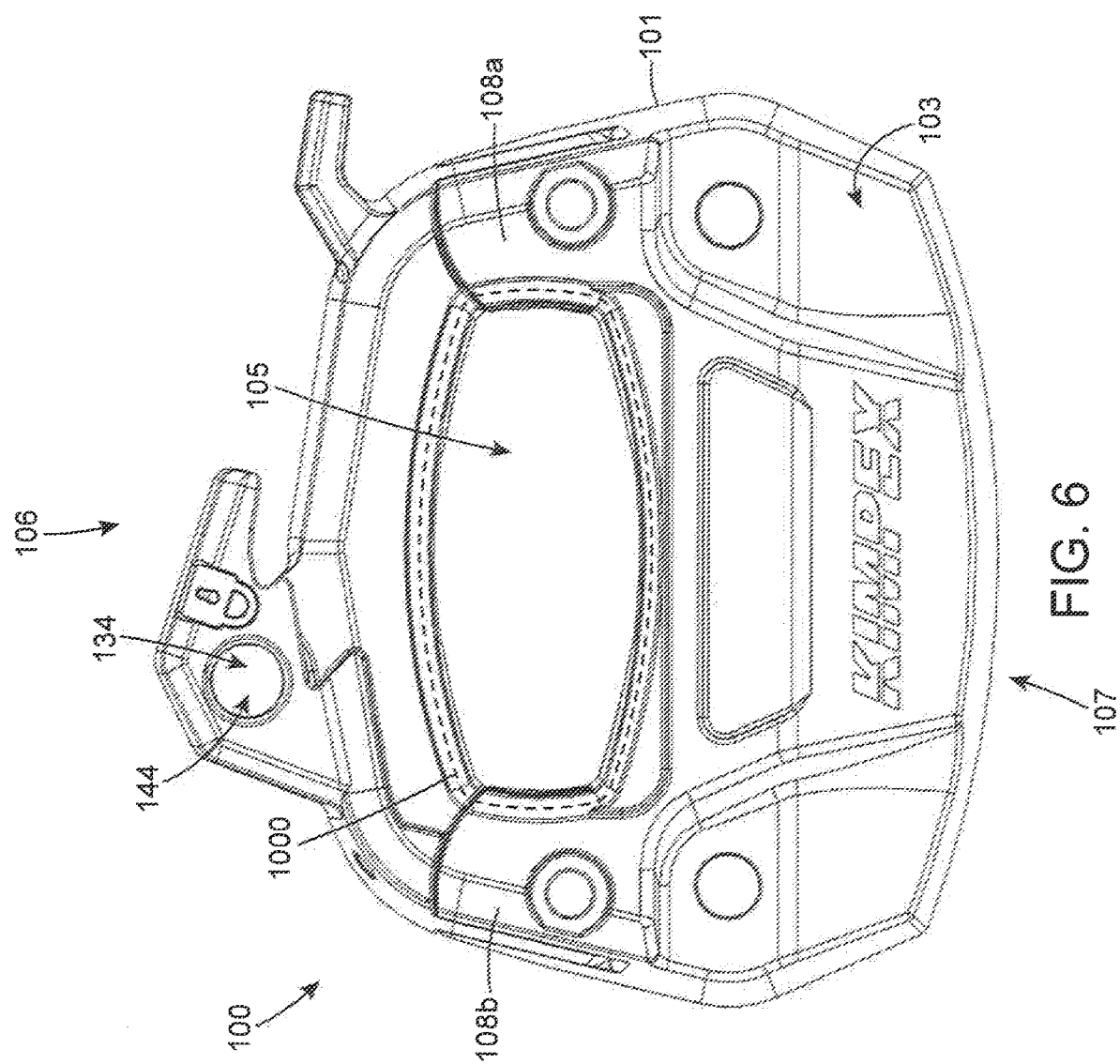
FIG. 6 is a top elevation view of the first mounting fixture, according to an embodiment, showing a closed loop formed from the closed locking assembly.

It should be noted that the locking assembly 120 is said to be in the closed configuration when the first and second hinged members 132, 142 are closed (i.e., pivoted inwardly, thereby closing the frontal opening 105 and forming a loop 1000 (see FIG. 6) surrounding at least a portion of the accessory), as seen in FIGS. 6 and 13. The locking assembly 120 is said to be in the open configuration when the first and second hinged members 132, 142 are open (i.e., pivoted outwardly, thus breaking the loop 1000 and providing access to the frontal opening 105), as seen on FIG. 11.

Figure 7:
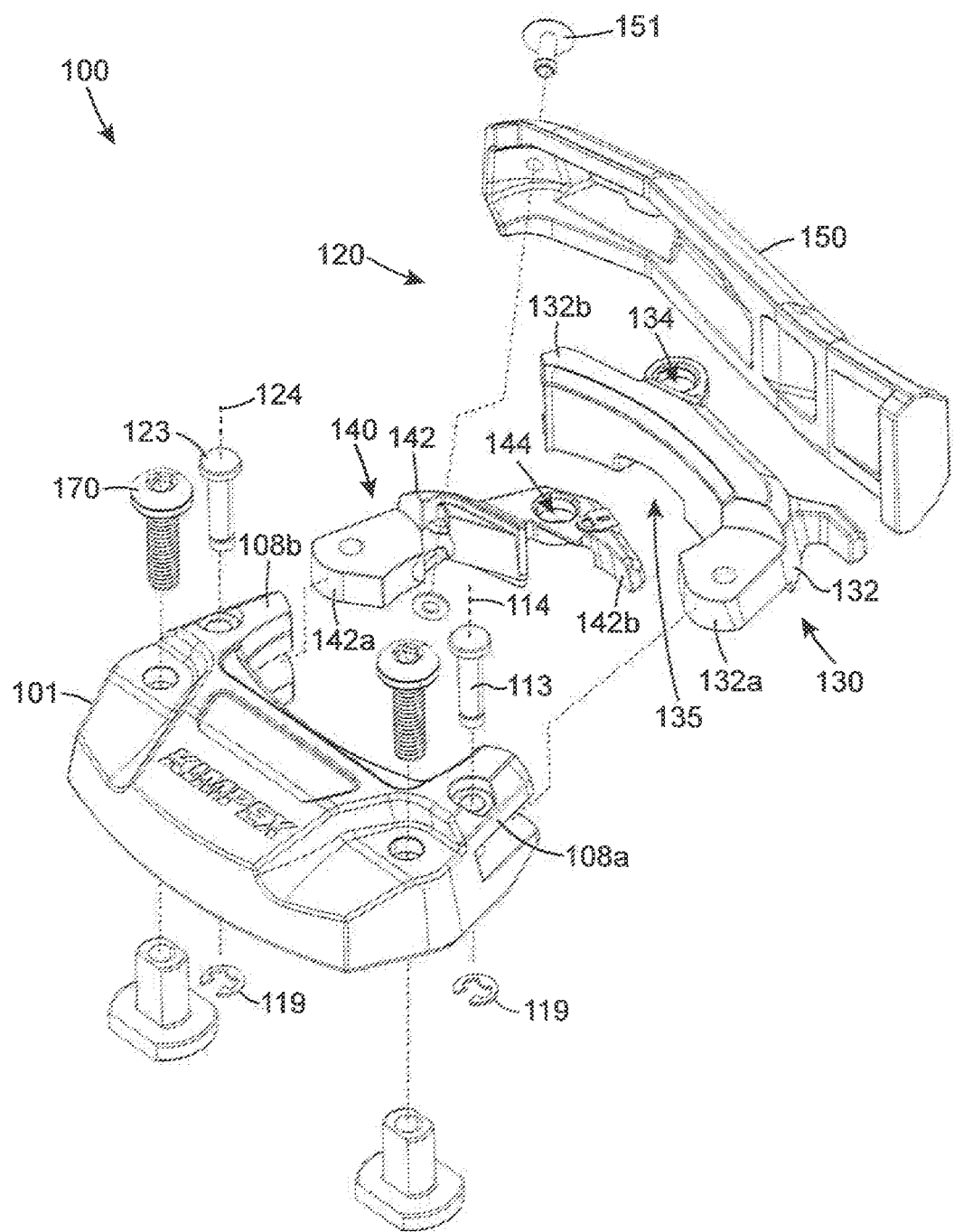
FIG. 7 is a perspective exploded view of the first mounting fixture shown in FIG. 4, showing a first lock member and a second lock member connectable to the first fixture body, according to an embodiment.

As seen in FIG. 7, the first hinged member 132 can be connected to the first lateral arm 108a via a first pivot pin 113, and the second hinged member 142 can be connected to the second lateral arm 108b via a second pivot pin 123. The first and second pivot pins 113, 123 respectively define pivot axes 114, 124 around which the first and second hinged members 132, 142 can rotate during operation of the locking assembly 120. In this embodiment, the first and second pivot pins 113, 123 are provided with respective retaining rings 119 configured to prevent the pivot pins from disengaging the first fixture body 101 and the hinged members 132, 142, thereby maintaining the hinged members 132, 142 pivotally connected to the fixture body 101, although other configurations are possible.

As previously explained, in this embodiment, the second hinged member 142 is adapted to engage an outer surface of the first hinged member 132. In other words, closing the locking assembly 120 can include initially closing the first hinged member 132 before the second hinged member, with second hinged member 142 being configured to at least partially cover the first hinged member 132. In addition, in some embodiments, the first hinged member 132 includes a first locking aperture 134, and the second hinged member 142 includes a second locking aperture 144 configured to align with the first locking aperture 134 when the locking assembly 120 is in the closed configuration. As such, a locking device, such as a padlock 180 (seen in FIG. 17H) can be inserted through the locking apertures 134, 144 and locked, thereby operating the locking assembly 120 in the locked configuration and preventing the first and second hinged members 132, 142 from being moved in the open position.

As seen in FIG. 6, the locking apertures 134, 144 can be adapted to be aligned with one another approximately halfway across the frontal opening 105 to facilitate insertion of the locking device. However, it is appreciated that the locking apertures 134, 144 can be positioned at any suitable location along the hinged members 132, 142 to align with one another and enable the use of a padlock to effectively lock the hinged members 132, 142 in the closed position. It should be appreciated that operating the locking assembly 120 in the locked configuration can prevent theft of the accessory 70 mounted to the accessory mounting system 10.

With reference to FIGS. 7 and 11 to 13, the locking assembly 120 can include a resilient member 150 removably coupled to the second hinged member 142 and configured to bias the locking assembly 120 in the closed configuration. As seen in FIG. 7, the resilient member 150 can be removably coupled to the second hinged member 142 via a resilient member fastener 151, although other methods of connections are possible, such as via a slot and key connection, snap connection, press-fit connection or any other suitable method. It is noted that moving the second hinged member 142 between the open and closed positions correspondingly moves the resilient member 150, i.e., the second hinged member 142 and the resilient member pivot 150 about the second pivot axes 124. In some embodiments, the resilient member 150 is selectively connectable to the first hinged member 132 in a manner such that at least one of the first and second hinged members 132, 142 is biased in the closed position. In the present embodiment, connecting the resilient member 150 to the first hinged member 132 biases each one of the first and second hinged members 132, 142 in the closed position, thereby further securing the accessory portion within the frontal opening 105.

In some embodiments, the first hinged member 132 can include a tab 138 extending outwardly therefrom, and the resilient member 150 can include a tab receiving opening 158 adapted to have the tab 138 extend therethrough. As seen in FIGS. 11 to 13, the tab 138 can be generally hook-shaped such that insertion of the tab 138 through the tab-receiving opening 158 can prevent the resilient member 150 from disengaging the first hinged member 132. More particularly, in this embodiment, the resilient member 150 includes a rubber strap configured to be deformed, e.g., stretched, to enable the tab-receiving opening 158 to reach the tab 138, and allow the tab 138 to extend through the opening. Once the resilient member 150 is released (e.g., no longer stretched) the tab 138 abuts a side of the tab-receiving opening 158, with the hook-shape thereof preventing the resilient member 150 from disengaging the first hinged member 132. As such, it is noted that, in order to remove the tab 138 from within the tab-receiving opening 158, it can be required to stretch the resilient member 150 once again to unhook the resilient member 150 from the first hinged member 132. In this embodiment, the tab 138 is positioned proximate the proximal end 132a of the first hinged member 132, and the tab-receiving opening 158 is positioned near the distal end of the resilient member 150. However, it is appreciated that other configurations are possible, such as having the tab 138 be positioned on the second hinged member and have the tab-receiving opening 158 positioned on the first hinged member, for example.

The resilient member 150 is typically used as an additional and/or alternative feature to prevent inadvertent opening of the hinged members 132, 142. More particularly, in some embodiments, and with reference to FIGS. 14 to 14B, the locking assembly 120 can be further provided with a complementary locking feature 160 adapted to prevent accidental (i.e., undesired) release of the accessory. In some embodiments, the complementary locking feature 160 can include complementarily-shaped components provided on the first and second hinged members 132, 142 and configured to engage one another in a manner such that opening the first hinged member 132 (from the closed configuration) is at least partially prevented. Therefore, it is noted that, if the accessory portion within the frontal opening 105 creates a force on the first hinged member 132 (i.e., from within the frontal opening 105), the complementary locking feature 160 would generally prevent the first and second hinged members 132, 142 from opening (e.g., even in the absence of the resilient member 150).

In the present embodiment, the complementarily-shaped components include a first component, such as a recess 162 provided proximate the distal end 132b of the first hinged member 132, and a second component, such as a protrusion 164 provided proximate the proximal end 142a of the second hinged member 142. In some embodiments, the recess 162 is provided on an outwardly facing side of the first hinged member 132, and the protrusion 164 is provided on an inwardly facing side of the second hinged member 142. Therefore, it is appreciated that closing the hinged members 132, 142 snugly positions the protrusion 164 within the complementarily-shaped recess 162.

Figure 14:
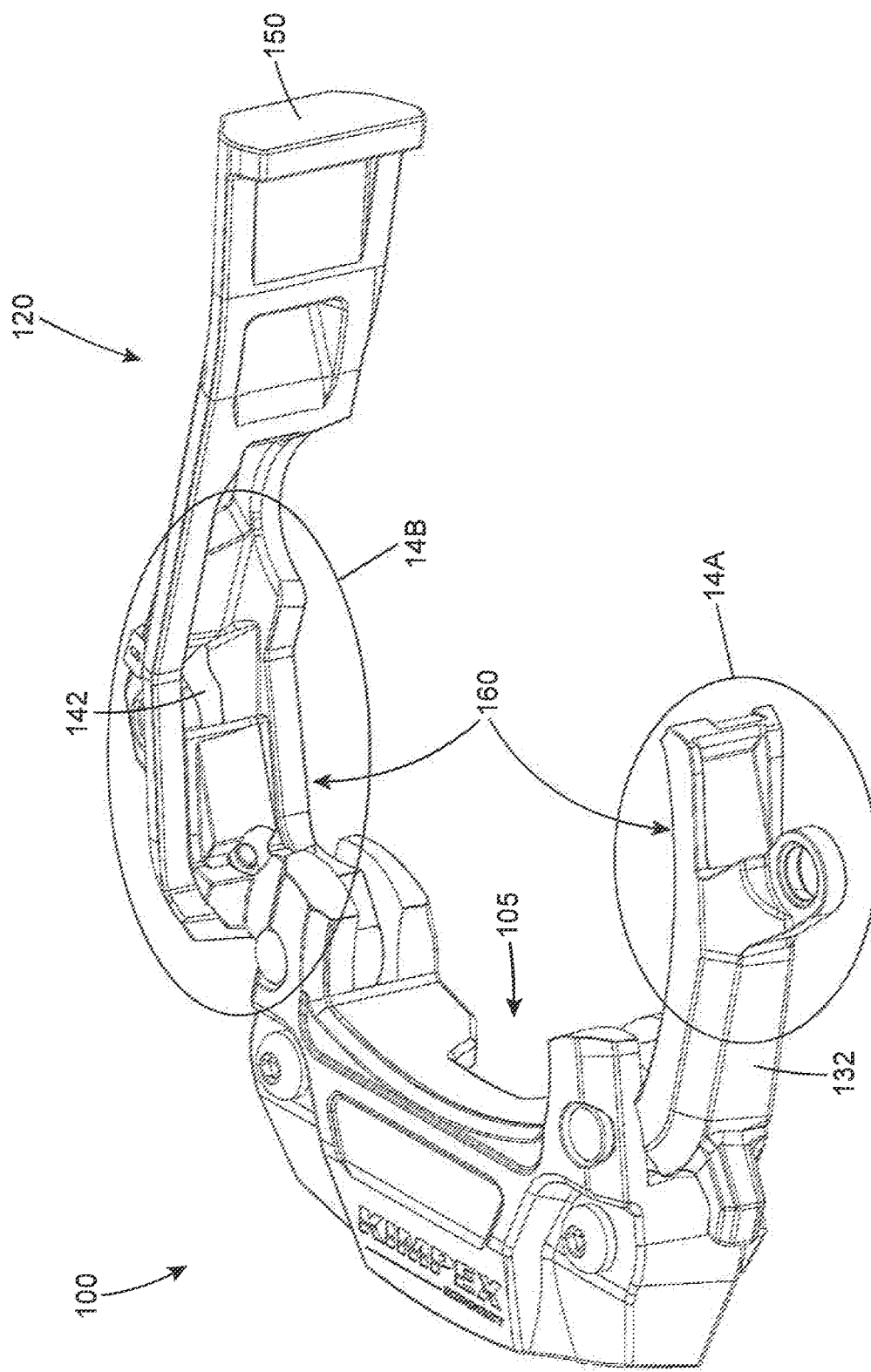
FIG. 14 is a side perspective view of the first mounting fixture shown in FIG. 11, showing complementary locking components of the locking assembly, according to an embodiment.
Figure 14A:
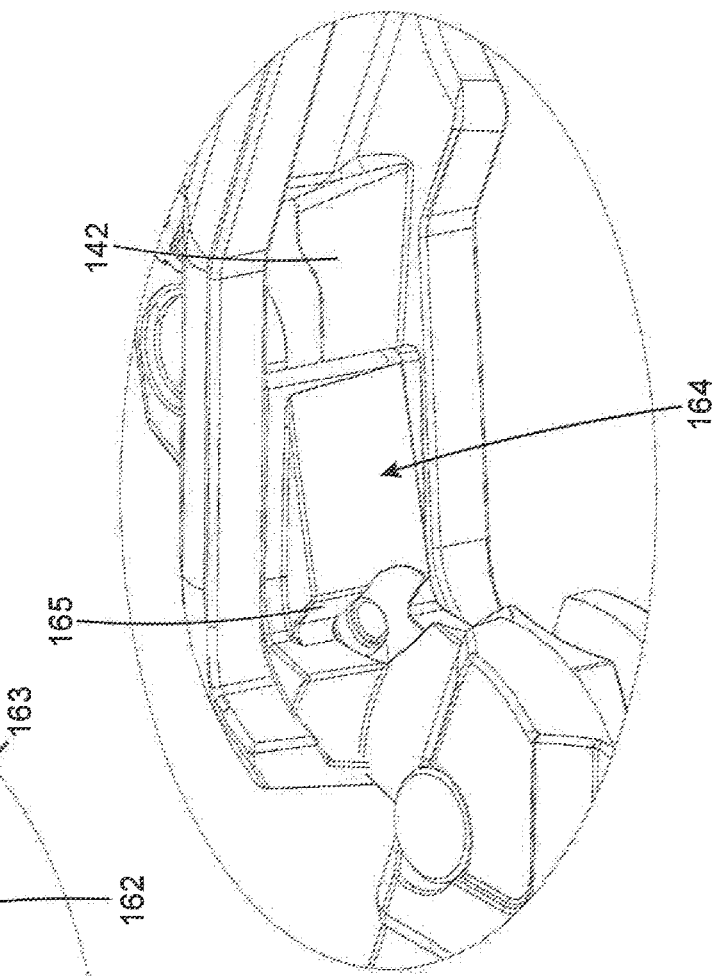
FIGS. 14A and 14B are enlarged views of the sections identified in FIG. 14, showing a locking recess (FIG. 14A) and a locking protrusion (FIG. 14B) complementarily-shaped with respect to one another, according to an embodiment.
Figure 14B:
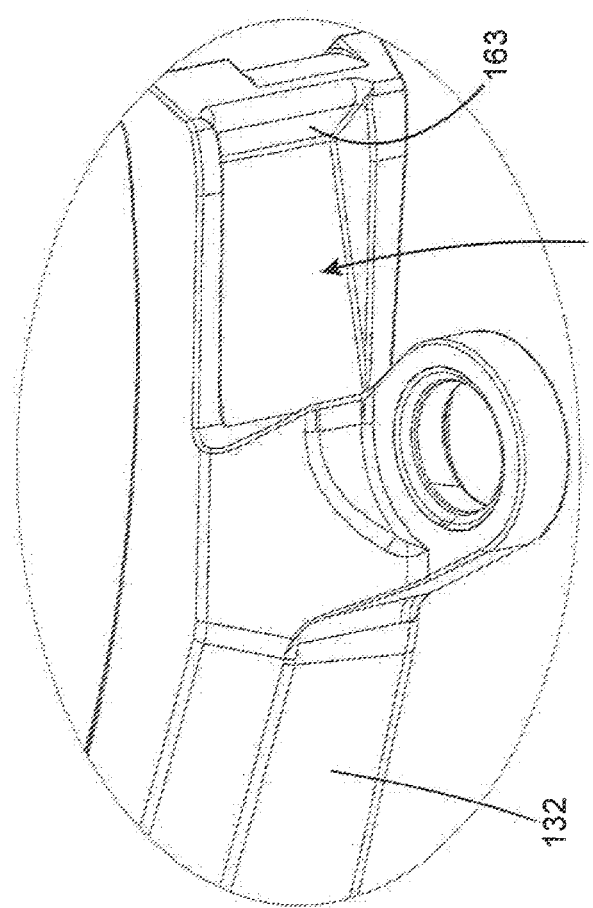
Figure 15:
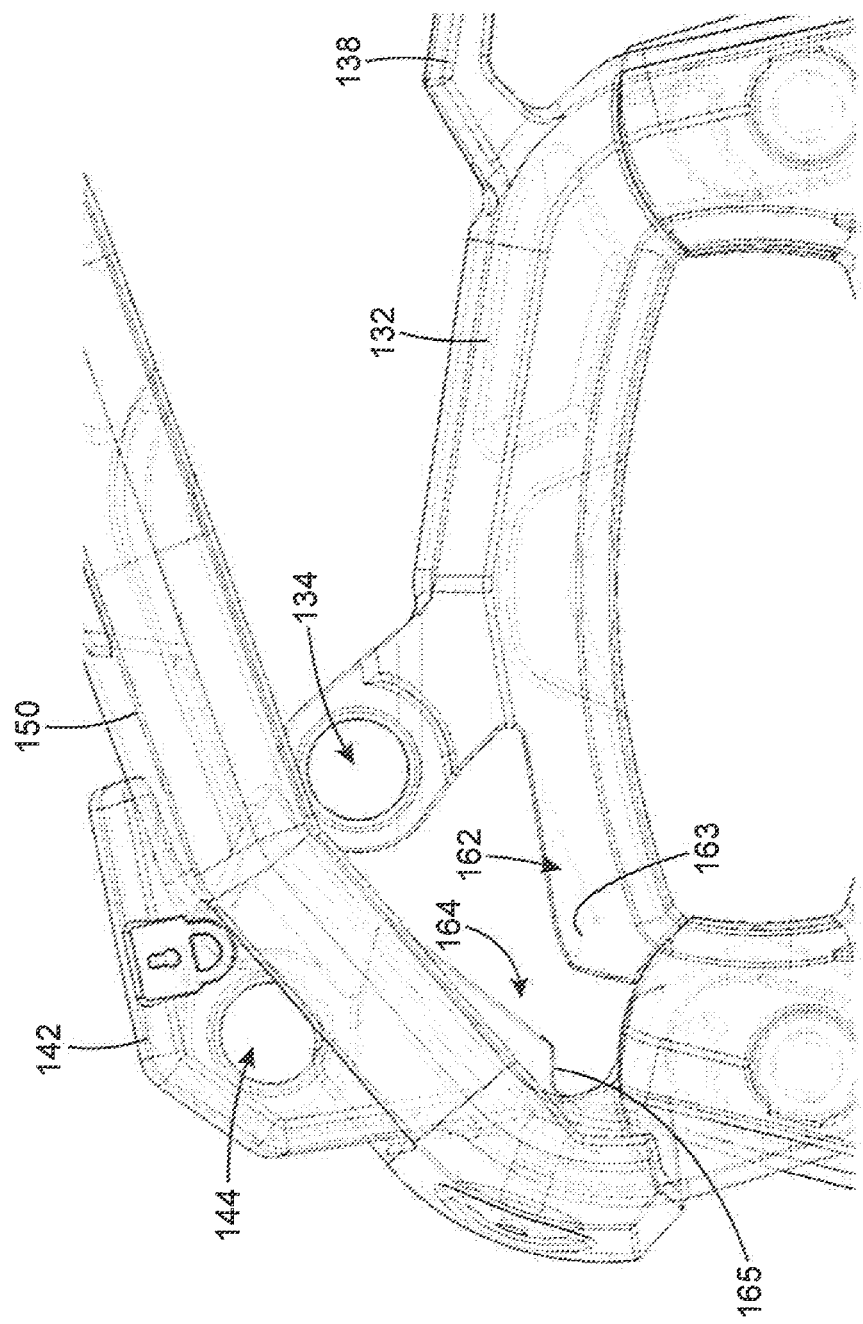
FIGS. 15 and 16 are top views of the first mounting fixture in a partially closed configuration (FIG. 15) and in the closed configuration (FIG. 16), according to possible embodiments, showing the complementary locking components engaged with one another.
Figure 16:
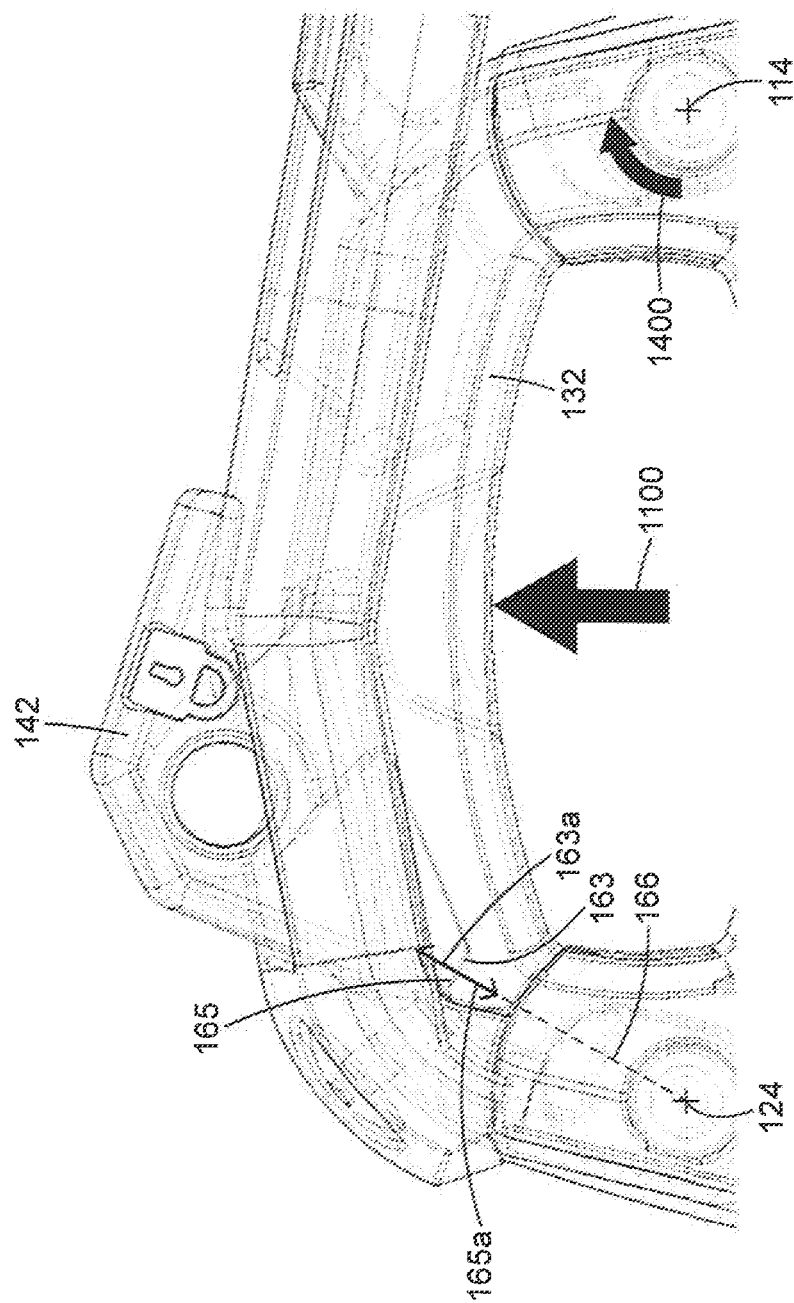

Referring to FIGS. 15 and 16, in addition to FIGS. 14 to 14B, the recess 162 and the protrusion 164 each include a corresponding locking surface 163, 165. As seen in FIG. 16, the locking surfaces 163, 165 can be tangent to an imaginary circle centered at the second pivot axis 124 such that, when the locking assembly 120 is in the closed configuration, the locking surfaces 163, 165 have their normal vectors 163a, 165a substantially aligned with a perpendicular projection 166 of the second pivot axis 124. Therefore, it is noted that attempting to open the first hinged member 132, when in the closed configuration, causes the locking surface of the recess 163 to push against the locking surface of the protrusion 165, thereby creating an outwardly oriented axial force. Moreover, due to the alignment of the normal vectors 163a, 165a with the second pivot axis projection 166, the axial force does not create a rotational force about the second pivot axis 124, and thereby does not engage the second hinged member 142 in rotation. In other words, when in the closed configuration, the complementary locking feature 160 prevents the hinged members 132, 142 from opening due to an outwardly oriented force being applied on an inner surface of the first hinged member 132. It should thus be understood that, in this embodiment, the second hinged member 142 is required to be opened to enable opening the first hinged member 132. However, it is appreciated that other configurations are possible.

As an example, and with reference to FIG. 16, when an opening force 1100 is applied to the first hinged member 132, the pivotal connection of said hinged member 132 induces a rotational force 1400 about the first pivot axis 114. The rotational force 1400 causes the locking surface of the recess 163 to push against the locking surface of the protrusion 165, and creates an axial force on the locking surface of the protrusion 165. As explained above, the protrusion locking surface 165 is configured to have its normal vector 165a substantially in line with the perpendicular projection 166 of the second pivot axis 124 (i.e., without creating a material lever arm relative to said second pivot axis 124), such that the axial force does not contribute to opening the second hinged member 142. The axial force is instead divided into shear forces applied to the first and second pivot pins 113, 123. A common example of this phenomenon can be described by trying to open a door by pushing directly on the pins of its hinges. It should thus be understood that, in the described embodiment, a rotational force (i.e. a force and a lever arm) is required in order to open the second hinged member 142, which then enables the first hinged member 132 to be freely open.

As mentioned above, the complementary locking feature 160 is configured to neutralize, or at least partially counteract, an opening force applied to the first hinged member 132 toward its opening direction (as seen in FIG. 16). However, the complementary locking feature 160 does not necessarily prevent other opening forces applied to said second hinged member 142 toward its opening direction from opening the locking assembly 120. The previously described resilient member 150 thereby also contributes to maintaining the hinged members 132, 142 closed.

Now referring to FIGS. 17A to 17H, and broadly referring to FIGS. 1 to 16, an exemplary method for mounting an accessory 70 to a vehicle surface 63 is shown and will now be described. The method 600 may be completely or partially implemented using the accessory mounting system 10 and, as such, will be described with reference to the accessory mounting system 10 described herein.

Figure 17B:
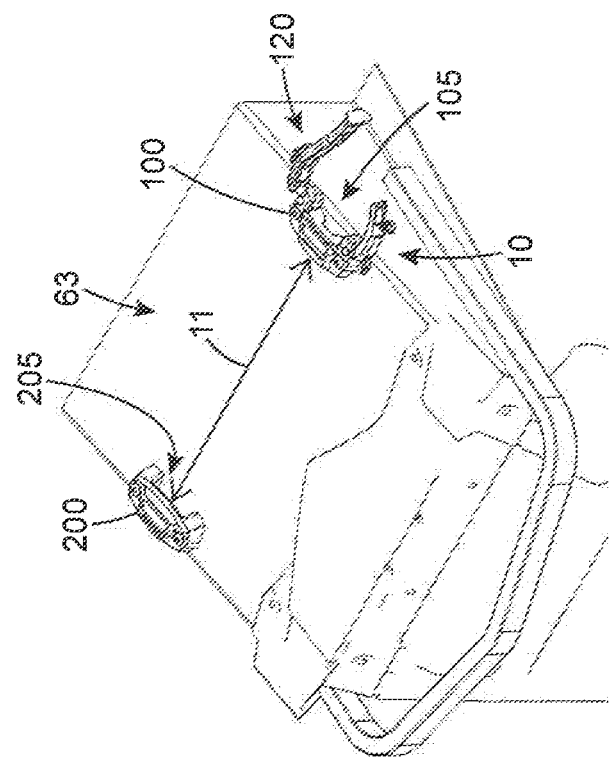
Figure 17A:
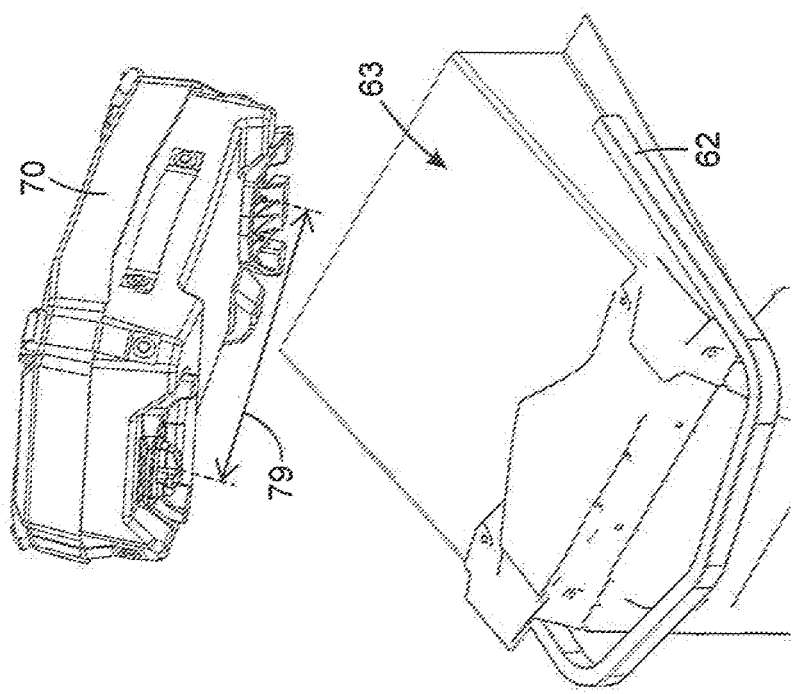

The method can start by determining which of the vehicle surface 63 and the accessory 70 will define the distance between the first and second fixtures 100, 200 (i.e. gap 11) and/or the distance between the protruding portions of the accessory (i.e. gap 79), as seen in FIGS. 17A and 17B. For example, if the width of the accessory 70 is greater than the width of the vehicle surface 63, the distance between the fixtures 100, 200 cannot be equal to the width of the accessory 70. Thereby, the distance between the protruding portions 77, 78 is adjusted to the size of the gap 11 between the first and second fixtures 100, 200.

Figure 17D:
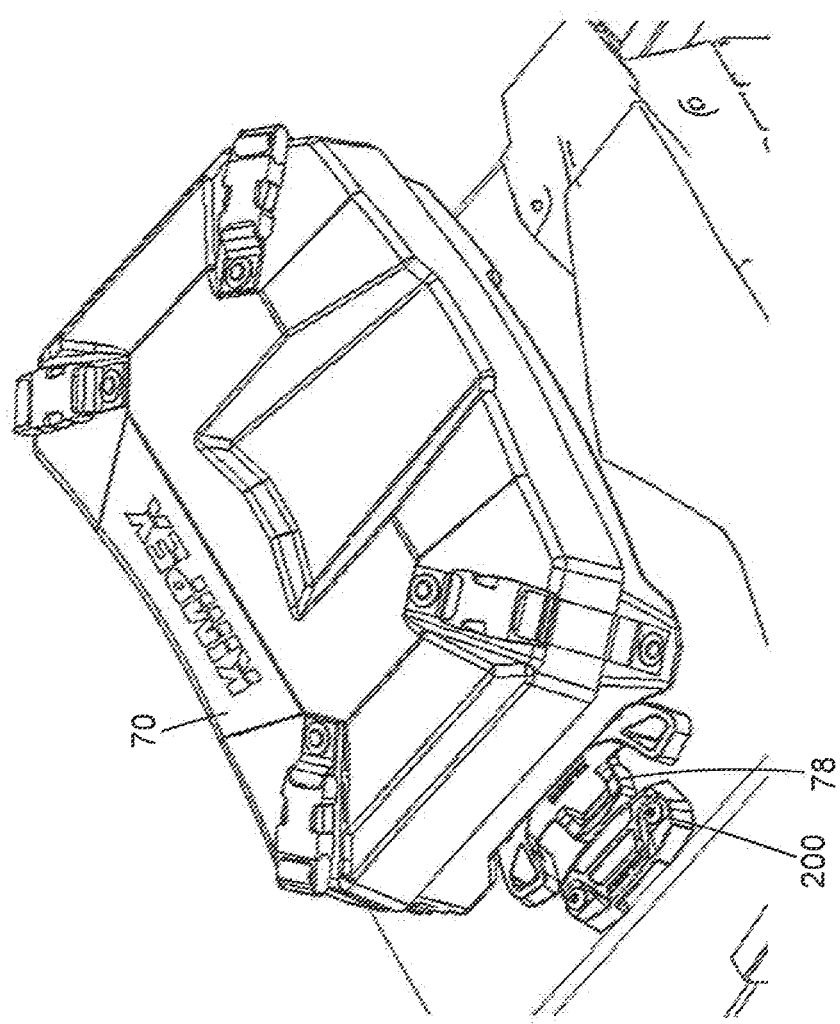

Then, at FIG. 17B, the method includes the step of installing the accessory mounting system 10 to the vehicle 60, by connecting the first fixture 100 and the second fixture 200 to the vehicle surface 63, thereby defining the gap 11 therebetween. At this step, the locking assembly 120 is preferably in the open configuration for exposing the frontal opening 105. Then, as seen in FIGS. 17C and 17D, the first protruding portion 77 is oriented towards the opened locking assembly 120 of the first fixture 100 (i.e., towards the frontal opening 105), and the second protruding portion 78 is oriented towards the passage 205 of the second fixture 200. The accessory 70 is then lowered towards the vehicle surface 63 for engaging the first protruding portion 77 in the frontal opening 105 of the first fixture 100, and engaging the second protruding portion 78 in the passage of the second fixture 200. This can be accomplished by performing a translation of the second protruding portion 78 toward the second fixture 200, and lowering the first protruding portion 77 within the frontal opening 105. However, it is appreciated that other methods or steps are possible and may be used for connecting the accessory 70 to the mounting system 10, and thus to the vehicle 60.

Figure 17E:
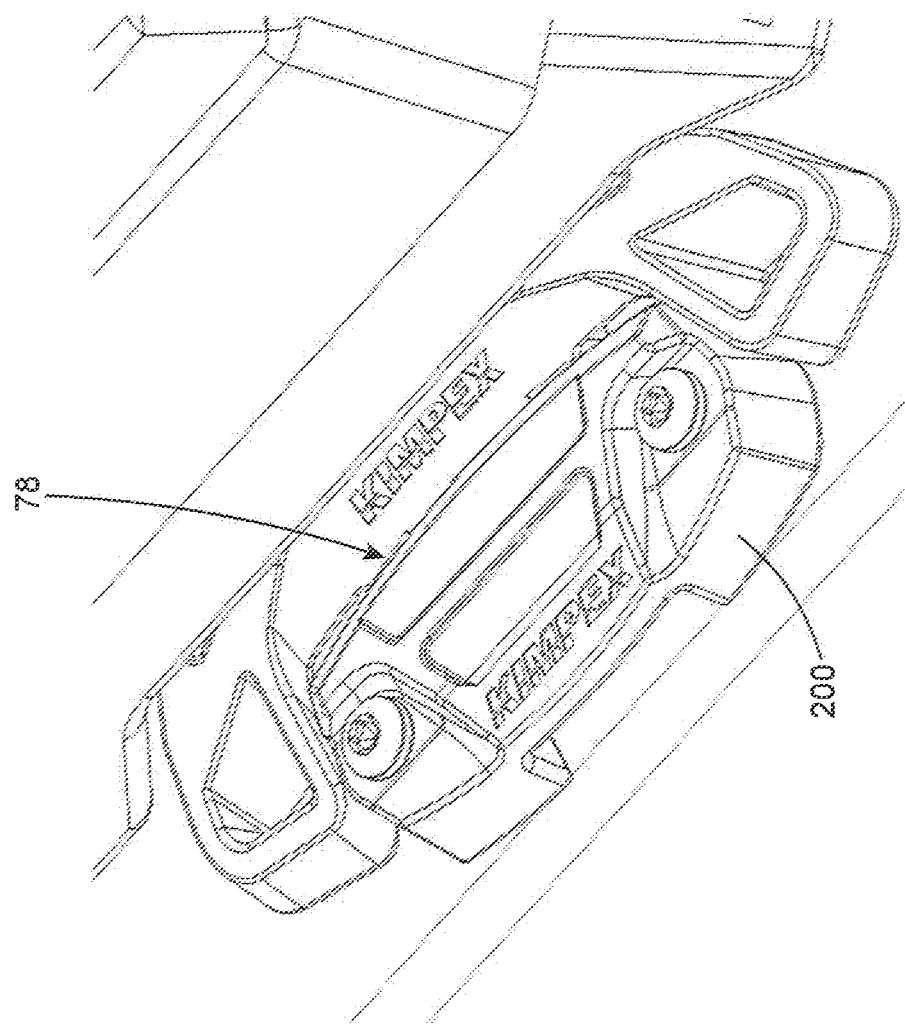
Figure 17F:
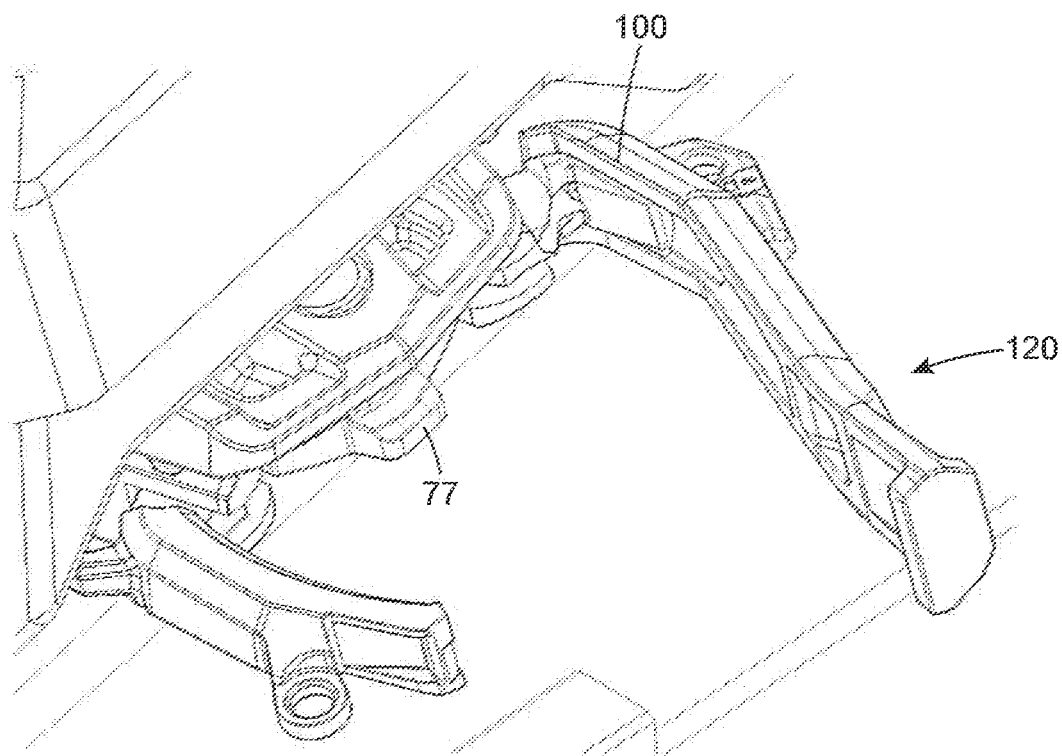

At this point, the first protruding portion 77 and the second protruding portion 78 should be engaged with corresponding fixtures 100, 200, as shown in FIGS. 17E and 17F.

Figure 17G:
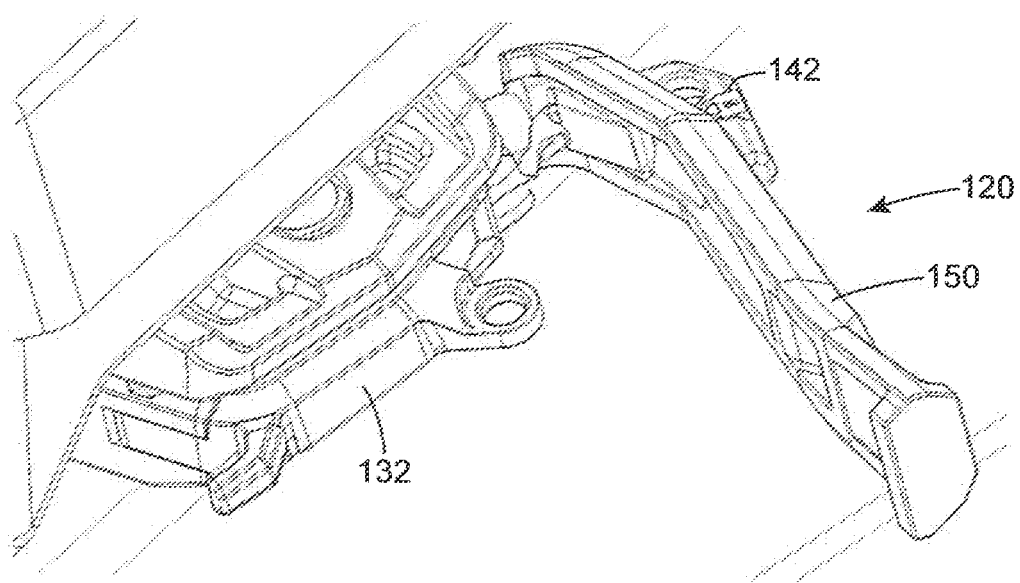
Figure 17H:
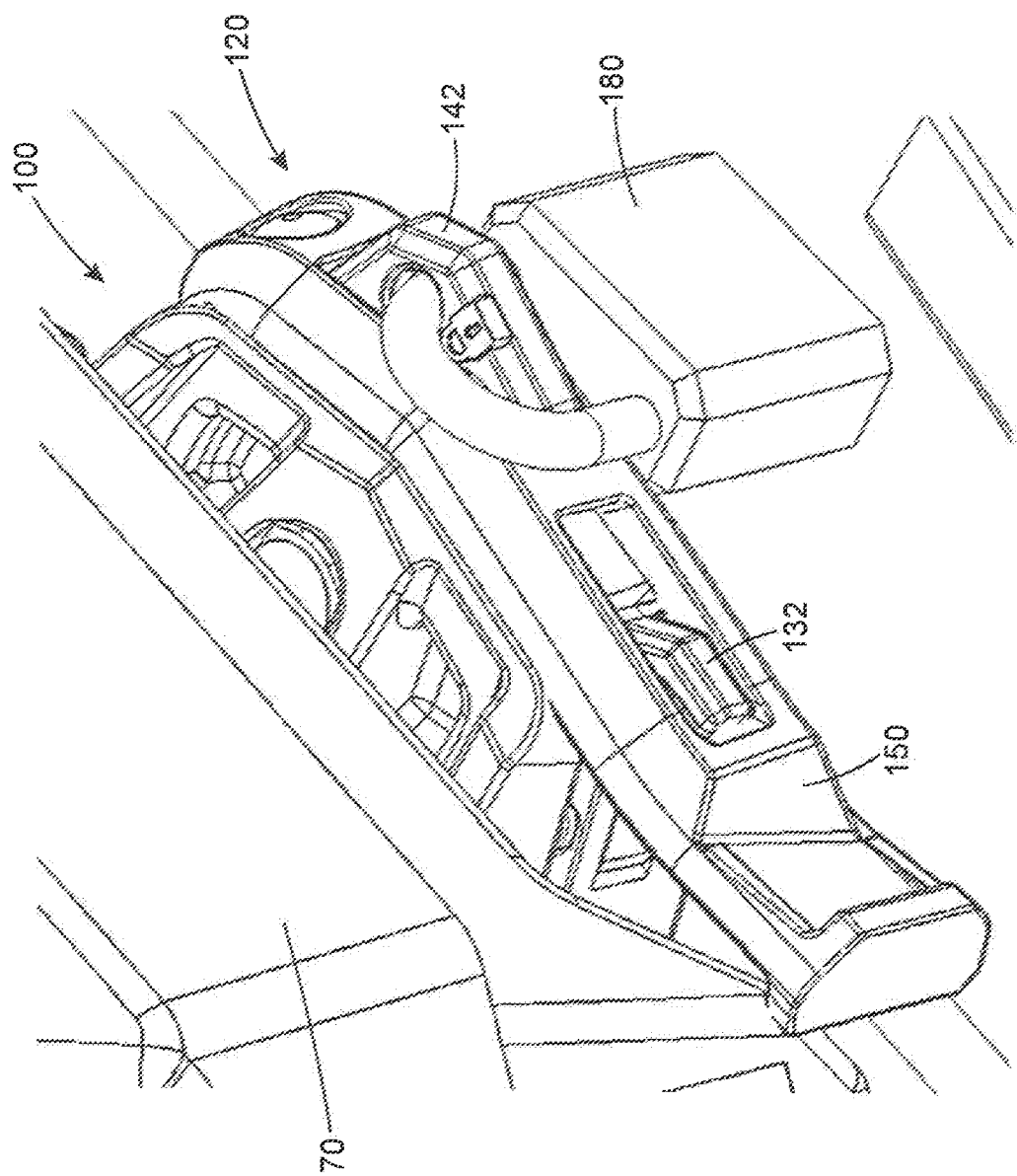

The locking assembly 120 can then be operated in the closed configuration, as seen in FIGS. 17G and 17H. In this embodiment, this step includes: 1) closing the first hinged member 132 until the distal end thereof abuts the body 101 of the first fixture 100 (FIG. 17G); 2) closing the second hinged member 142 for covering at least a portion of the first hinged member 132, and until the distal end of the second hinged member 142 abuts the first hinged member 132 (FIG. 17H), and 3) securing the resilient member 150 to the first hinged member 132 (FIG. 17H).

As seen in FIG. 17H, the method can include locking the locking assembly 120 via a locking device 180 (e.g., a padlock) installed through the corresponding apertures 134, 144 of the hinged members 132, 142, respectively.

It should be understood that a method for releasing the accessory 70 from the accessory mounting system 10 substantially includes the steps of the method described above, but performed in reverse order.

It will be understood that implementations of the accessory mounting system 10 described herein can be used in relation with various vehicles, and for various accessories, such as fuel tanks, bags, racks, etc. It is also noted that the mounting system 10 can facilitate attaching and disconnecting (i.e. detaching) accessories to and from a vehicle, thereby enabling easy and safe transport and use of these accessories at a desired location.

Figure 19:
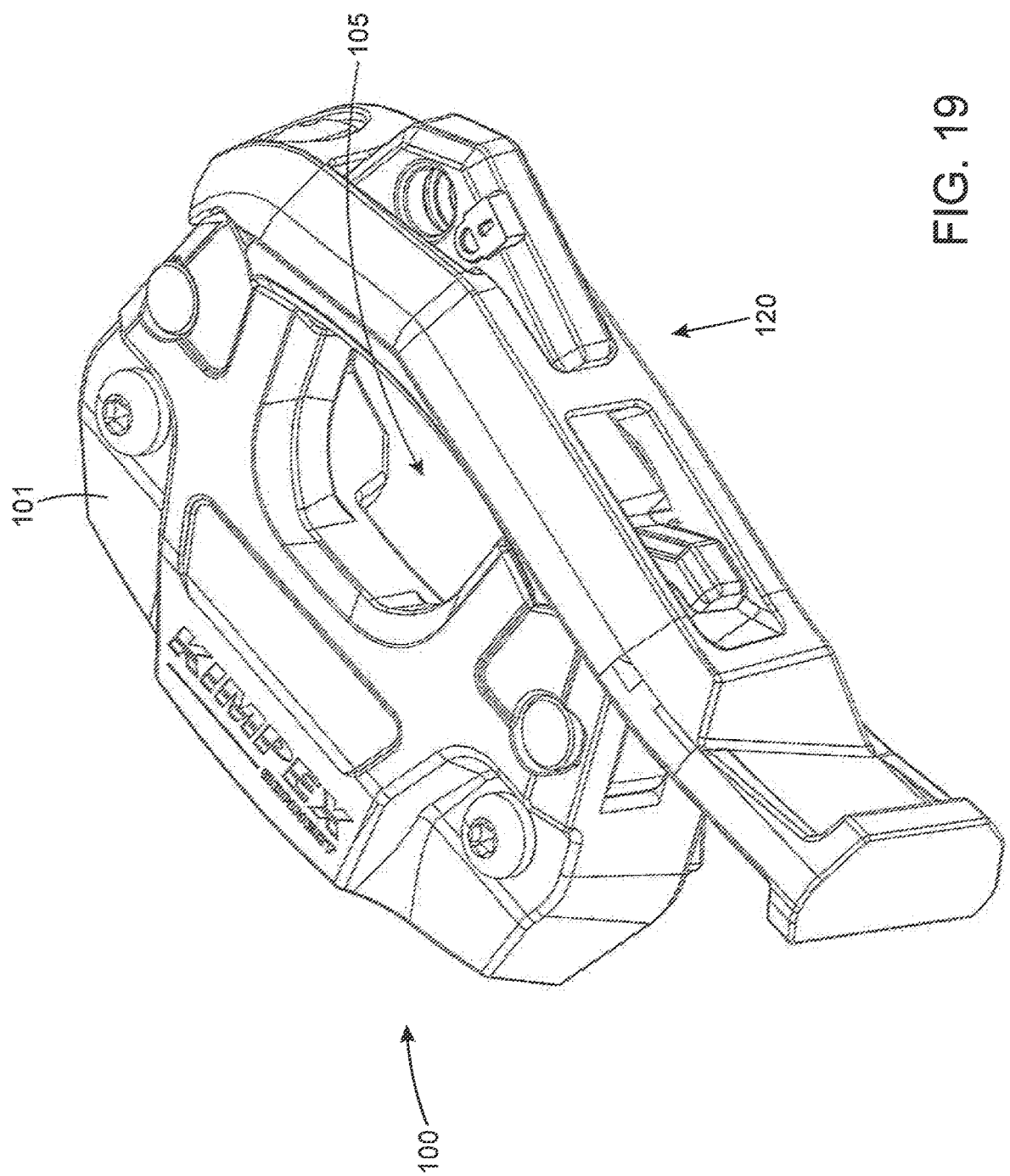
Figure 20:
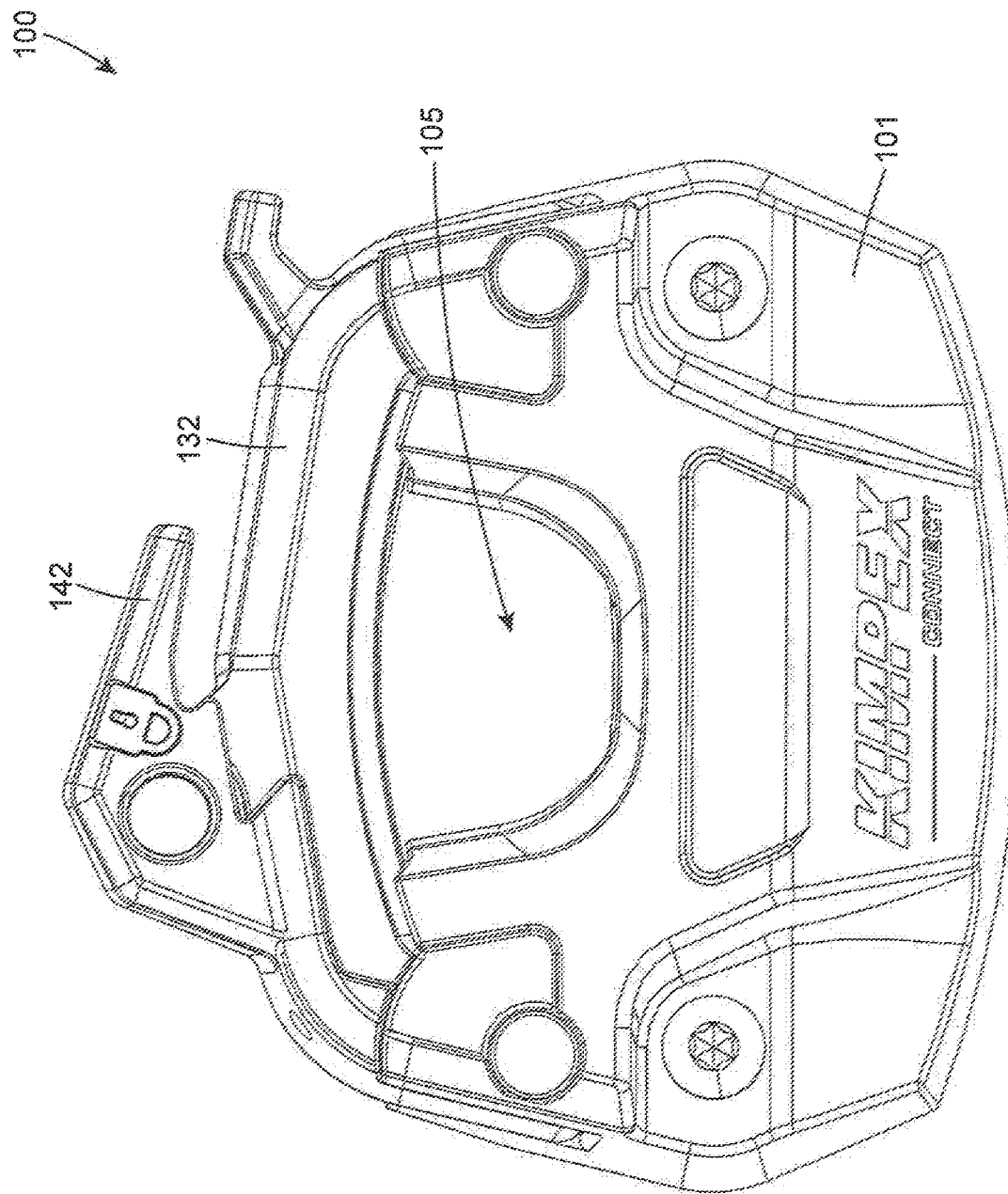

Alternate embodiments are shown in FIGS. 18 to 20, whereby the frontal opening 105 of the first fixture 100 defines a D-shaped opening when the locking assembly 120 is in the closed configuration (best seen in FIG. 20), rather than a generally hexagonal-shaped opening, such as in the previously described embodiments (e.g., seen in FIG. 6). Moreover, the mounting system 10 can include a mounting plate 190 adapted to be connected between the vehicle surface and the first fixture body 101. The mounting plate 190 can be configured to prevent, or at least reduce, wearing down of the mounting system and related components. For example, the mounting plate 190 can reduce wear on the accessory (e.g., the first end and/or the first protruding portion), the mounting system (e.g., the first fixture body) and/or the vehicle surface. As such, in this embodiment, the mounting plate 190 is configured to allow secure installation of the fixture body 101 and reduce the risks of plastic deformations, creeping, cracking, shrinking, etc.

In addition, the mounting plate 190 can be adapted to provide a secure connection for the fixture body in embodiments where the bearing surface of the fixture (e.g., the vehicle surface) is covered by a film or layer of protective material, for example. In some embodiments, the mounting plate 190 can be made of a softer material relative to the material of the fixture body 101. For example, the material of the mounting plate 190 can be a plastic.

The mounting plate 190 can be connected to the vehicle surface and/or the mounting fixture (i.e., on the bottom surface thereof) via any suitable method, such as via adhesion (e.g., using a glue), via fasteners or via a combination thereof. In some embodiments, the mounting plate 190 can be a sticker positioned between the fixture body and the vehicle surface. As seen in FIG. 18, the mounting plate 190 can have a generally M-shape, with a central portion thereof adapted to generally conform to the shape of the first fixture 100 (e.g., the U-shaped first fixture 100). However, it is appreciated that the mounting plate 190 can have any other suitable shape and configuration.

It should be noted that the mounting plate 190 described above in relation with the first fixture 100 can alternatively, or additionally, be provided for the second mounting fixture, such as the second fixture shown in FIG. 8, for example. In other words, each of the first and second fixtures can be provided with their respective mounting plates for providing substantially the same advantages for both fixtures (e.g., reduced wear, increase lifespan, reduce the risks of plastic deformations, creeping, cracking, shrinking, etc).

It should be noted that the above-described mounting system may be embodied in other specific forms. The described example implementations are to be considered in all respects as being only illustrative and not restrictive. For example, in the embodiments described herein, the mounting system includes a pair of fixtures, and includes a first fixture and a second fixture installed opposite one another. However, it is noted that, in some embodiments, the mounting system can include a pair of fixtures which includes two (2) of the same type of fixtures, such as a pair of first fixtures, for example, or a single fixture, whereby the first fixture is the only fixture holding the accessory connected to the vehicle. In other alternative embodiments, the first and second fixtures can be provided with the protruding portions, and the accessory itself is provided with openings, passages and/or locking assemblies configured for securing the accessory to the fixtures. In some embodiments, the first and/or second fixtures are typically made of a polymeric material (e.g. plastic), which can be moulded and/or 3D printed, for example. However, it is appreciated that the first fixture can be made of any other suitable material, such as a metallic material or a composite material, for example.

Additionally, and as previously described, it is noted that the mounting fixtures are adapted to be connected to the vehicle using fasteners, such as screws. The vehicle can be provided with pre-drilled holes configured to have components similar to the mounting fixtures be connected thereto at predetermined locations. It is possible to create (e.g., drill) additional holes in the vehicle surface to enable connection of the mounting fixture at different locations on the vehicle, or enable connection of more mounting fixtures. In some embodiments, the mounting fixtures can be movably connected to the vehicle, and selectively secured in the desired location. As such, the position of the accessory on the vehicle can be adjusted. For example, the mounting system includes a rail assembly comprising a pair of rails connected to the vehicle surface, with one or more of the mounting fixtures connected to the rails. The mounting fixtures are slidably mounted to the rails to adjust their position therealong, and thus upon the vehicle. The mounting fixtures can further be selectively secured to the rails, thereby securing the accessory at a desired location and/or configuration on the vehicle. It is thus noted that the accessory can be mounted to a desired portion of the vehicle located along the rails and/or that multiple accessories can be mounted to the vehicle along the pair of rails. As will be described further below, the rail assembly can be connected to the vehicle in a spaced apart relation such that a pair of mounting fixtures can be mounted to respective rails opposite one another.

Figure 21:
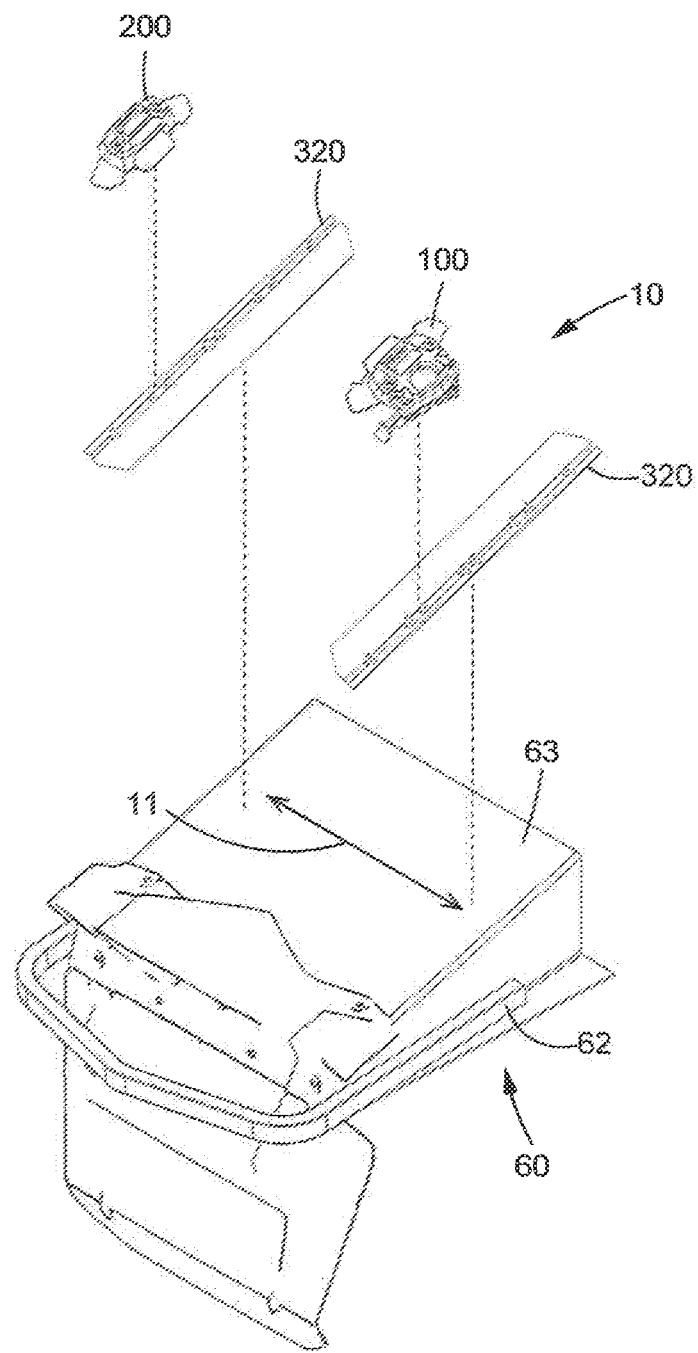
FIG. 21 is a perspective view of another embodiment of the accessory mounting system, showing a pair of mounting assemblies mounted opposite one another on a vehicle surface.

Referring to FIGS. 21 to 22*b*, the mounting system 10 can include a pair of mounting assemblies 300 removably connectable to the vehicle surface 63. In the illustrated embodiment, the mounting system 10 includes a first mounting assembly 302 and a second mounting assembly 304 adapted to be removably connected to the vehicle surface opposite one another along the vehicle surface 63. Each mounting assembly 300 can include an elongated rail 320 and one or more mounting fixtures, such as the previously described first and second mounting fixtures 100, 200, adapted to be slidably connected to the rail 320. The rails 320 are illustratively mounted parallel to one another and separated by the gap 11, which can correspond to a width of the vehicle surface 63, for example. Therefore, the first mounting fixture 100 can be generally positioned opposite the second mounting fixture 200 (e.g., on an opposite side of the vehicle surface 63 and across the gap 11), as seen in FIG. 21. However, it is appreciated that the rails 320 can be mounted to the vehicle in any suitable manner, such as at an angle relative to one another, perpendicular to one another, axially aligned with one another, etc.

In some embodiments, each rail 320 can be provided with a plurality of mounting fixtures positioned at any suitable location along the rail 320, thereby allowing the accessory to be further secured to the vehicle and/or allowing for additional accessories to be connected to the vehicle.

Now referring to FIGS. 23 to 27, in addition to FIGS. 21 to 22*b*, the rail 320 of a given mounting assembly 300 is generally elongated and has a thickness extending between a top surface 322 and a bottom surface 324. In this embodiment, the bottom surface 324 is adapted to engage (e.g., contact) the vehicle surface 63 to enable connection of the rail 320 to the vehicle. In addition, the elongated rail 320 includes an inner section 325 defining an inner edge 326, and an outer section 327 defining an outer edge 328. It is noted that, in this embodiment, the inner edge 326 corresponds to the edge of the rail 320 facing the mounting assembly 300 installed on the other side of the vehicle surface 63, and that the outer edge 328 of the rail 320 corresponds to the edge facing away from the vehicle.

Figure 23:
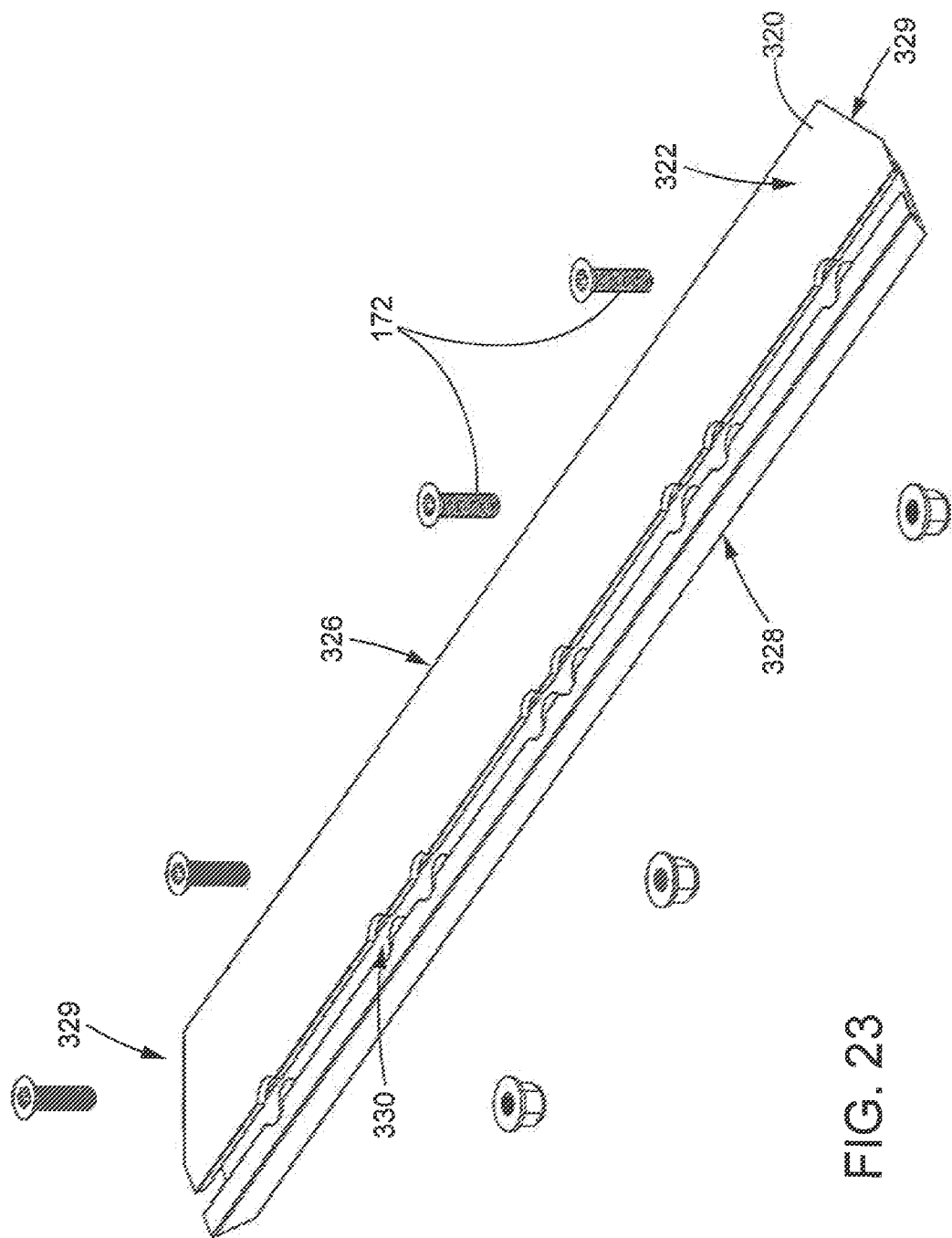
FIG. 23 is a partially exploded view of the elongated rail shown in FIG. 22a, showing a slot extending along a length of the rail, according to an embodiment.
Figure 24:
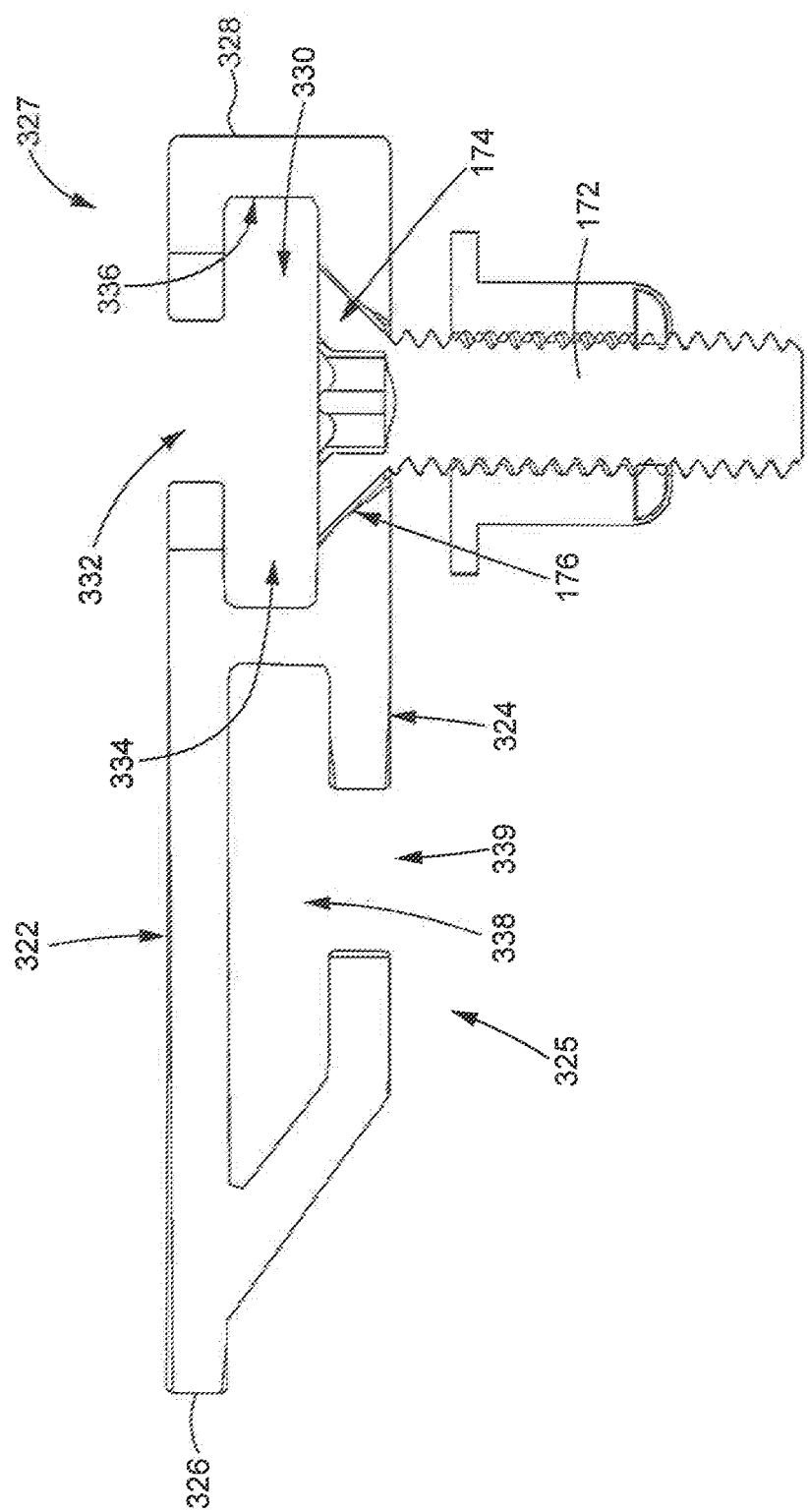
FIG. 24 is a sectional view of the elongated rail shown in FIG. 22b, showing a cross-sectional shape of the rail, the slot, and a fastener extending through a bottom surface thereof, according to an embodiment.

In the present embodiment, the rail 320 includes a slot 330 extending along a length of the rail 320. In this embodiment, the slot 330 extends longitudinally along the rail, and more particularly along an entire length thereof. As seen in FIGS. 22*a*, 22*b* and 23, the slot 330 opens at both ends of the rail 320, although it is appreciated that other configurations are possible, such as having the slot 330 open at a single end of the rail 320, or having the slot 330 extend perpendicularly relative to the length of the rail 320 at one or more locations, for example. Moreover, the slot 330 illustratively includes an opening 332 defined on the top surface 322 of the rail 320 to enable components positioned within the slot 330 to be accessible and/or to extend out of the slot 330 through the opening 332 in the top surface 322. As seen in FIGS. 23 and 24, the rail 320 can be connected to the vehicle via fasteners 172 (e.g., nut and screw assemblies) extending through a thickness of the rail 320 and into the vehicle. In this embodiment, the fasteners 172 are positioned along the slot 330 and are provided with generally flat heads 174 so as to be generally coplanar with the slot 330, although other configurations and/or positions of the fasteners 172 are possible and may be used to connect the rail 320 to the vehicle.

In some embodiments, the rail 320 can be provided with a plurality of fastener apertures 176 spaced along the length of the rail 320 (e.g., along the slot 330). As such, the rail 320 can be connected to any given vehicle surface provided with predrilled holes configured to have components fastened thereto. It is thus appreciated that the rail 320 can be adapted to be connected to any type of vehicle provided with any standard fastening holes, for example. In some embodiments, additional holes can be drilled into the vehicle surface to enable the use of additional fasteners 172 and provide a more secure connection of the rail 320 to the vehicle. It should be noted that, in some embodiments, the rail 320 can be secured via one, two, three or any other suitable number of fasteners (e.g., nut and screw assemblies).

Figure 25:
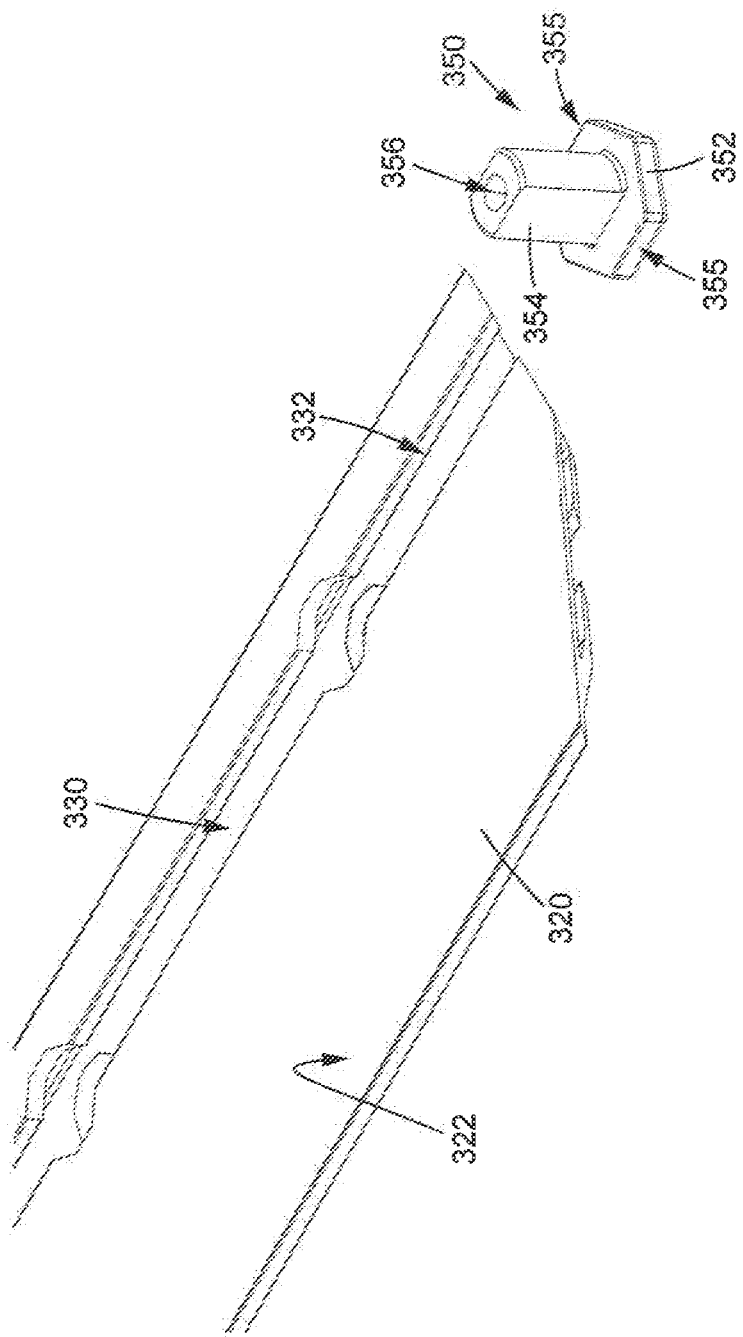
FIG. 25 is a perspective view of an end of an elongated rail, with a connector adapted to engage the slot of the rail, according to an embodiment.
Figure 26:
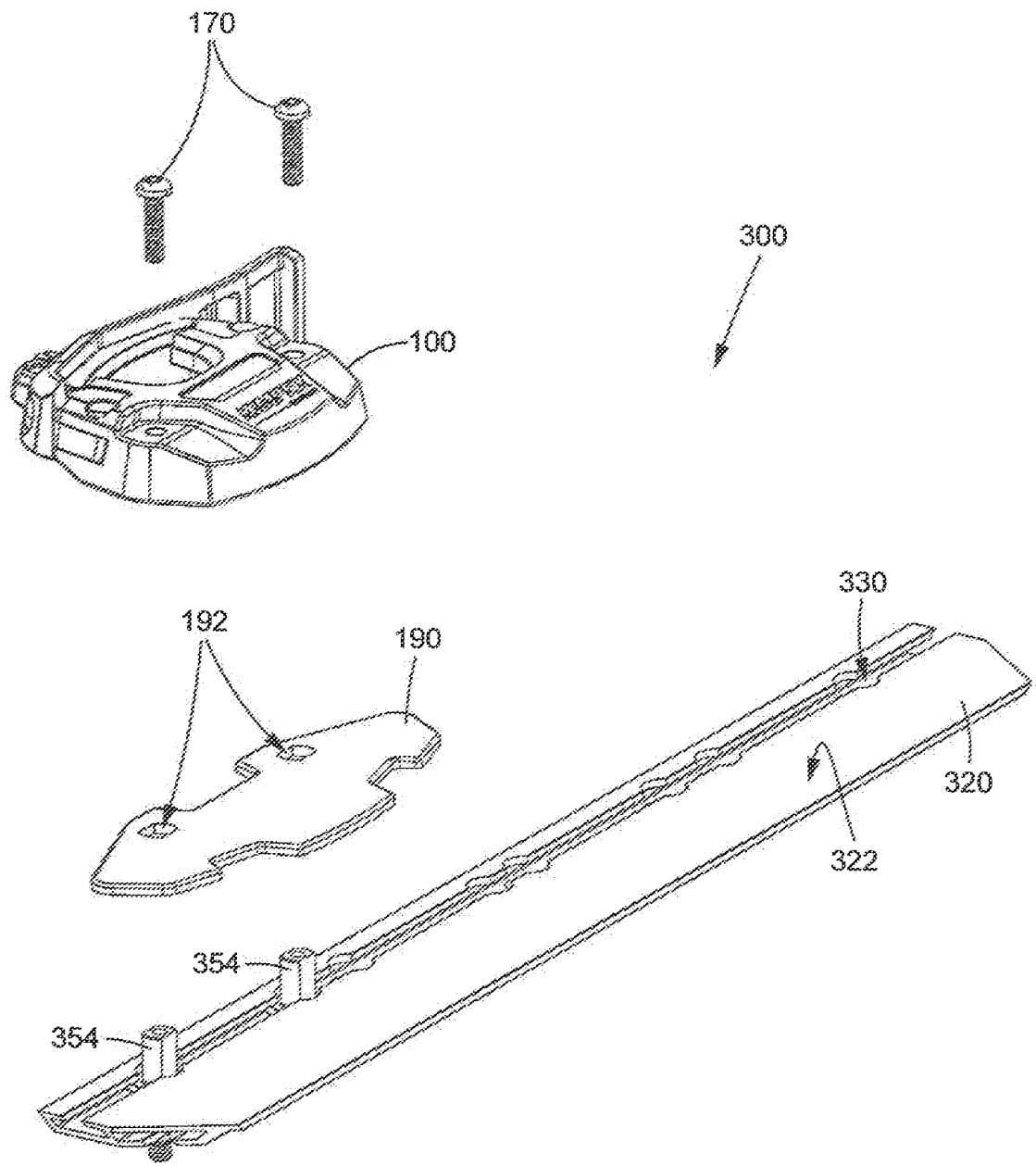
FIG. 26 is an exploded perspective view of a mounting assembly, showing a mounting fixture connectable to a mounting plate, which is in turn connectable to the connectors within the slot, according to an embodiment.
Figure 27:
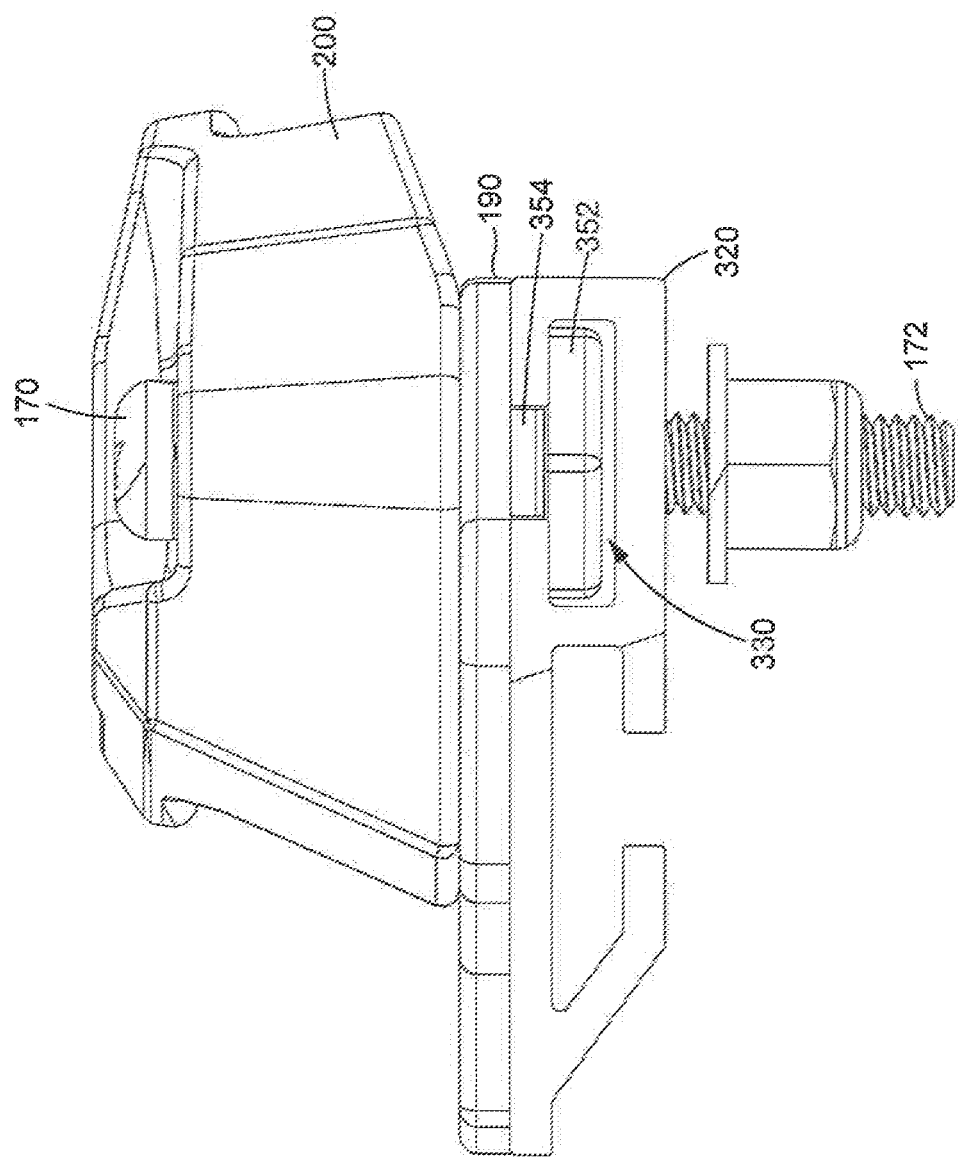
FIG. 27 is a side view of the mounting assembly shown in FIG. 22b, showing a connector within the slot, and showing a second slot defined along the elongated rail, according to an embodiment.

Referring more specifically to FIGS. 25 to 27, the mounting assembly 300 further includes a connector 350 configured to engage the slot 320 and be displaced along its length. The connector 350 can be further adapted to have the mounting fixture (e.g., the first or second mounting fixture 100, 200) be connected thereto in order to couple the mounting fixture to the rail 320. The connector 350 can be shaped and sized to be slidably mounted within the slot 330, and can be inserted within the slot 330 via one of the openings at either end of the rail 320. It is noted that having the connector 350 slidably mounted within the slot 330 enables the connected mounting fixture to slide along the rail 320 (i.e., due to its connection to the connector 350). In the present embodiment, the connector 350 includes a head portion 352 shaped and configured to fit within the slot 330, and a shank portion 354 extending from the head portion 352 and adapted to extend through the opening 332 of the slot 330. As will be further described, the shank portion 354 extends upwardly from the rail 320 to enable connection with the mounting fixture.

In this embodiment, the slot 330 and the connector 350 can be at least partially complementarily shaped so as to enable movement of the connector 350 along the slot 330 (i.e., along the length of the rail 320) while preventing other types of movements. For example, in some embodiments, the slot 330 can have a generally inverted T-shape, where the top surface 322 overhangs a portion of the slot 330 on either sides thereof for defining the opening 332. In other words, the opening 332 of the slot 330 is narrower than a main portion 334 thereof. The head portion 352 of the connector 350 can be complementarily shaped with respect to the main portion 334 of the slot 330, and the shank portion 354 can be shaped and adapted to extend through the opening 332. Moreover, and as seen in FIGS. 25 and 26, the head portion 352 is adapted to prevent removal of the connector 350 from the slot 330 through the opening 332 by abutting against the top surface 322 which overhangs the slot 330. In some embodiments, the connector 350 and the slot 330 form a dovetail connection, or any other similar connection, which enables axial movement of the connector along the slot 330, while preventing radial movement.

Still referring to FIGS. 23 to 27, the main portion 334 of the slot 330 can include sidewalls 336 extending parallel to one another on opposite sides of the slot 330. As previously described, the head portion 352 of the connector 350 is adapted to fit into the main portion 334 and is slidably mounted therein. Moreover, the head portion 352 can include one or more lateral edges 355 configured to prevent rotation of the head portion 352 when positioned within the slot 330. For example, in this embodiment, the head portion 352 has a hexagonal shape, and thereby includes three (3) pairs of parallel edges 355. It should thus be understood that engaging the head portion 352 within the slot 330 correspondingly positions at least one pair of edges 355 in a face-to-face configuration with the sidewalls 336. It is noted that the pair of lateral edges 355 engaging the sidewalls 336 of the slot 330 prevents rotation of the connector 350 within the slot 330.

In this embodiment, and as seen in FIGS. 25 and 26, the shank portion 354 is adapted to extend through the opening 332 to enable the mounting fixture 100 to be coupled to the shank portion 354. In some embodiments, the mounting fixture 100 can be provided with one of a female connection and a male connection, and the shank portion 354 can be provided with the other one of the female connection and the male connection configured to engage one another. More specifically, in this embodiment, the shank portion 354 is provided with the female connection, such as a borehole 356, and the mounting fixture 100 includes the male connection, such as mounting fasteners 170 adapted to extend through the first mounting fixture 100 (seen in FIG. 26), through the second mounting fixture 200 (seen in FIG. 27) and into the corresponding borehole 356. It is noted that fastening the mounting fixtures 100, 200 onto the shank portion 354 (via the mounting fasteners 170) secures the connector 350 in place within the slot 330, thereby securing the mounting fixtures along the rail 320 and on the vehicle surface. In some embodiments, the borehole 356 of the shank portion 354 and the mounting fastener 170 are threaded. Therefore, it is noted that fastening the mounting fastener 170 in the borehole 356 causes the head portion 352 to abut against the top surface 322 of the rail 320 (i.e., from within the slot 330), thereby squeezing the top surface 322 between the head portion 352 and the mounting fixture, and securing the connector 350 and the mounting fixture along the rail 320.

It should be understood that the first and/or second mounting fixtures 100, 200 can be slidably coupled to the rail 320 via the connector 350 when the mounting fastener 170 is not fully fastened. As such, the mounting fixtures can be displaced up and down the slot 330 to a desired location, and the mounting fasteners 170 can be fastened until the connection with the connector 350 tightens, thereby blocking movement and securing the mounting fixtures in place. It should thus be understood that the accessory, which is connected to the mounting fixture, can therefore be connected to the vehicle at any desired location along the rail 320.

In some embodiments, each mounting fixture is coupled to the rail 320 via at least two (2) mounting fasteners 170 coupled to respective connectors 350. In other words, the mounting assembly 300 can include two (2) connectors 350 for each mounting fixture, although it is appreciated that other configurations are possible. Furthermore, and with reference to FIGS. 26 and 27, the mounting assembly 300 can include the mounting plate 190 adapted to be connected between the rail 320 and the corresponding mounting fixture. The mounting plate 190 can be configured to prevent, or at least reduce, wearing down of the mounting assembly and related components. For example, the mounting plate 190 can reduce wear of the accessory coupled to the mounting fixtures, of the mounting fixture itself, of the rail 320 and/or of the vehicle surface.

In this embodiment, the mounting plate 190 is further adapted to facilitate connecting any given mounting fixture with the corresponding connectors 350. For example, the mounting plate 190 can be provided with apertures 192 shaped and sized to receive the shank portion 354 of one of the connectors 350. As seen in FIG. 26, the mounting plate 190 can include a pair of apertures 192 adapted to have the shank portions 354 of adjacent connectors 350 extend therethrough. As such, movement of the connectors 350 relative to one another is blocked (i.e., movement of one connector 350 causes displacement of the mounting plate 190, and thus of the other one of the connectors 350), and the mounting fixture can be aligned with both connectors 350.

In addition, the mounting plate 190 can be adapted to provide a secure connection for the fixture body in embodiments where the bearing surface of the fixture (e.g., the top surface of the rail 322) is covered by a film or layer of protective material, for example. In some embodiments, the mounting plate 190 can be made of a softer material relative to the material of the mounting fixture so as to reduce the risks of plastic deformations, creeping, cracking, shrinking, etc. For example, the material of the mounting plate 190 can be a plastic. The mounting plate 190 can be connected to the top surface 322 of the rail 320 and/or to the mounting fixture (i.e., on the bottom surface thereof) via any suitable method, such as via adhesion (e.g., using a glue), via fasteners or via a combination thereof. In some embodiments, the mounting plate 190 can be a sticker positioned between the fixture body and the rail 320.

Referring back to FIGS. 21 to 22b, the first and second mounting assemblies 302, 304 are illustratively installed opposite one another across the surface 63 of the vehicle 60. Each mounting assembly 300 being provided with respective mounting fixtures, such as one or more first and/or second mounting fixtures 100, 200, so as to connect different portions of an accessory to the vehicle such that the accessory extends between the mounting assemblies 302, 304. In this embodiment, the mounting system 10 enables an accessory to be connected to a pair of mounting fixtures provided on separate rails 320 (e.g., the first mounting fixture 100 and the second mounting fixture 200). However, it should be noted that a single rail 320 can be provided with one or more mounting fixtures, and that an accessory can be coupled to the single rail 320, thereby connecting the accessory to the vehicle using a single mounting assembly 300. It is also appreciated that providing multiple mounting fixtures to one or more mounting assemblies 300 can enable to connection of multiple accessories to the vehicle, using one or more rails 320.

In some embodiments, the rails 320 are made of a metallic material, such as aluminium, although other materials, or combination thereof can be used, such as a plastic, for example. The rails 320 can further be provided with a surface treatment, such as an anodizing process, to reduce wear and increase lifespan. The rails 320 can be manufactured via an extrusion process, which can provide a generally constant cross-section to the rail 320 along its length (e.g., the cross section shown in FIG. 24). However, it is noted that other manufacturing processes are possible, such as moulding (e.g., in the case of plastic rails) or a 3D-printing process, for example.

As seen in FIG. 24, the rail 320 can include additional features, such as a second slot 338 defined in the inner section 325 of the rail 320, whereas the slot 330 is defined in the outer section 327. The second slot 338 can extend along a portion of the rail 320, or alternatively along the entire length thereof. The second slot 338 can be adapted to provide a balance to the rail 320 such that the inner section 325 is not overly weighted compared to the outer section 327. It is noted that connecting the rail 320 to the vehicle surface can block access to the second slot 338. As such, the second slot 338 can have any suitable shape and/or size. However, in this embodiment, the second slot 338 has a similar shape as the slot 330, although inverted. In other words, the second slot 338 has a T-shape, with an opening 339 defined through the bottom surface 324 of the rail 320, which can enable connection of the rail 320 to the vehicle upside down. In some embodiments, the rail 320 can be connected to a vehicle in a manner providing access to either one of the slot 330 and the second slot 338, or both, such that additional connectors and mounting fixtures can be installed, and additional accessories can be connected to the vehicle.

Referring to FIGS. 22 to 24, the inner and/or outer edges 326, 328 of the rail 320 can be shaped and adapted to conform to the shape of the vehicle to which the rail 320 is connected. For example, in this embodiment, the inner edge 326 is tapered inwardly such that the top surface 322 extends further than the bottom surface 324. This configuration can facilitate connection of the rail 320 onto a snowmobile tunnel having an embossed pattern, for example. Additionally, in this embodiment, the rail 320 can be at least partially bevelled at each end thereof, thus defining bevelled ends 329. The bevels can be made at any suitable angle, and along across a portion of the end, or across an entire length thereof. It is noted that the rail 320 can be tapered, bevelled or otherwise shaped and configured in any suitable, desired and/or required manner to facilitate positioning of the rail 320 onto the vehicle surface. In some embodiments, the rails 320 can be shaped to conform to various components of the vehicle, such as lights, seats, etc. It should also be noted that shaping the rails 320 to conform to the vehicle (e.g., via tapers, bevels, chamfers, etc.) can reduce the materials used to manufacture the rails 320, which can reduce the weight of the rails 320 and thereby reduce manufacturing and handling costs.

Alternatively, it is appreciated that the rail 320 can have a generally rectangular shape, with parallel sides and edges, and a sufficient thickness enabling the accessories connected to the rails to extend over any pattern or obstacles on the vehicle surface.

Referring broadly to FIGS. 21 to 27, it is appreciated that a method for connecting an accessory to a vehicle using the mounting system 10 described herein can include the steps of; connecting at least one rail 320 provided with a slot 330 to a vehicle surface 63, slidably mounting a connector 350 within the slot 330, coupling a mounting fixture (100 or 200) to the connector 350 and fastening the mounting fixture 630 to the connector 350 to secure the mounting fixture along the rail 320, and connecting the accessory to the mounting fixture (e.g., via the locking assembly 200). The above-listed steps can be performed in any suitable order, for example, the accessory can be coupled to the mounting fixture prior to connecting the fixture to the connector. It is noted that, in some embodiments, in order to connect the rail 320 to the vehicle surface 63, additional holes may need to be drilled into the vehicle surface 63 to enable connection of the rail 320. In the illustrated embodiments, connecting the rail 320 to the vehicle surface 63 includes connecting a pair of rails 320 in space apart relation, and coupling one or more mounting fixtures to each rail 320.

The described example implementations are to be considered in all respects as being only illustrative and not restrictive. For example, in the embodiments described herein, the mounting system includes a pair of mounting assemblies, and includes a first rail and a second rail installed opposite one another. However, it is noted that, in some embodiments, the mounting system can include a pair of rails adapted to be mounted in an end-to-end manner, with the rails being configured to clip, or otherwise connect, to one another to define a longer rail, for example. The rails used in the mounting assemblies can be of the same length, or of varying lengths. Alternatively, the mounting assembly can include rails configured to adjust their respective lengths to a desired length, such as via a telescopic portion installed along the rail.

In other alternative embodiments, the accessory can be coupled directly to the connectors 350. For example, the accessory can be provided with a connection portion complementarily shaped relative to the shank portion of the connector such that the accessory can be connected to the connector without an intermediary component (e.g., the mounting fixture). In yet other embodiments, the shank portion of the connector can be adapted to form a quick release coupling with the component it is connected to (e.g., the mounting fixture or the accessory), thereby facilitating connection and disconnection of the accessory to and from the vehicle.

It should be noted that the mounting assemblies described above provide flexibility to a user, where the accessories can be connected at the desired locations on along the rails. However, the length of the rails 320 (or the width of the vehicle surface) can limit the number of possible locations where an accessory can be connected and/or limit the number of accessories connectable to the vehicle via the mounting system. In some embodiments, the mounting system can include a stacking assembly adapted to cooperate with one of the mounting assembly (e.g., the rails and the mounting fixtures), the accessory and the vehicle to enable accessories to be mounted to the vehicle in a stacked configuration. As such, additional accessories can be mounted on the vehicle, for example, when there is no space left to connect an accessory to the rails and/or the mounting fixtures connected to the vehicle surface.

In some embodiments, the stacking assembly of the mounting system includes a support structure configured to be coupled to the vehicle in a manner such that the support structure is generally elevated (i.e., above the vehicle surface) to allow a first accessory to be connected to the mounting system below the support structure (e.g., via a first set of mounting fixtures). The stacking assembly can further include one or more mounting fixtures secured to the support structure such that a second accessory can be secured to the support structure (e.g., via a second set of mounting fixtures), and therefore stacked on the first accessory.

Referring to FIGS. 28 to 32, a stacking assembly 400 according to an embodiment is shown. The stacking assembly 400 can include a support structure 410 adapted to be coupled to the vehicle 60 and enable accessories to be stacked on top of each other. The support structure 410 can be provided with one or more mounting fixtures, such as a first mounting fixture 100 and a second mounting fixture 200, mounted at opposite ends of the support structure 410. More particularly, one of the first and second mounting fixtures 100, 200 can be mounted at a first end 410*a*, and the other one of the first and second mounting fixtures 100, 200 can be mounted at a second end 410*b*, although other configurations are possible.

Figure 30:
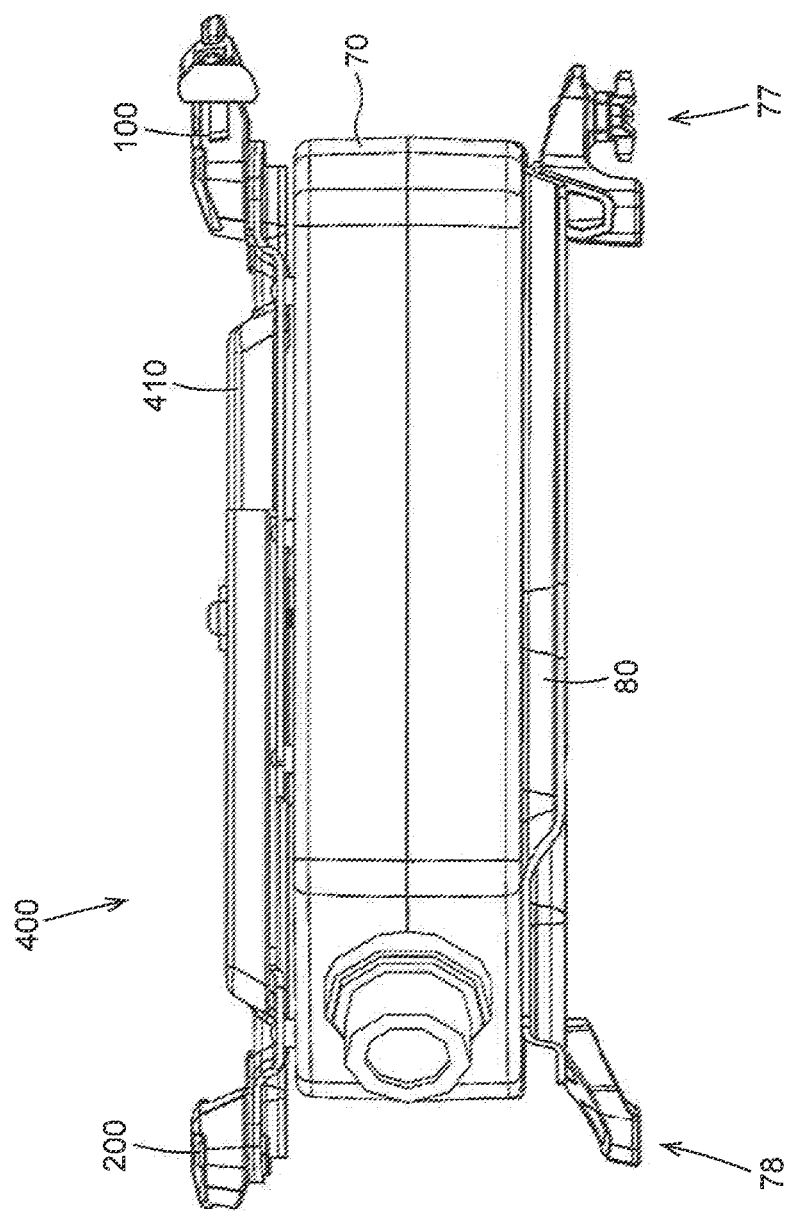
FIG. 30 is a side view of an alternative embodiment of the accessory mounting system, showing an accessory mounted in the stacking assembly.
Figure 31:
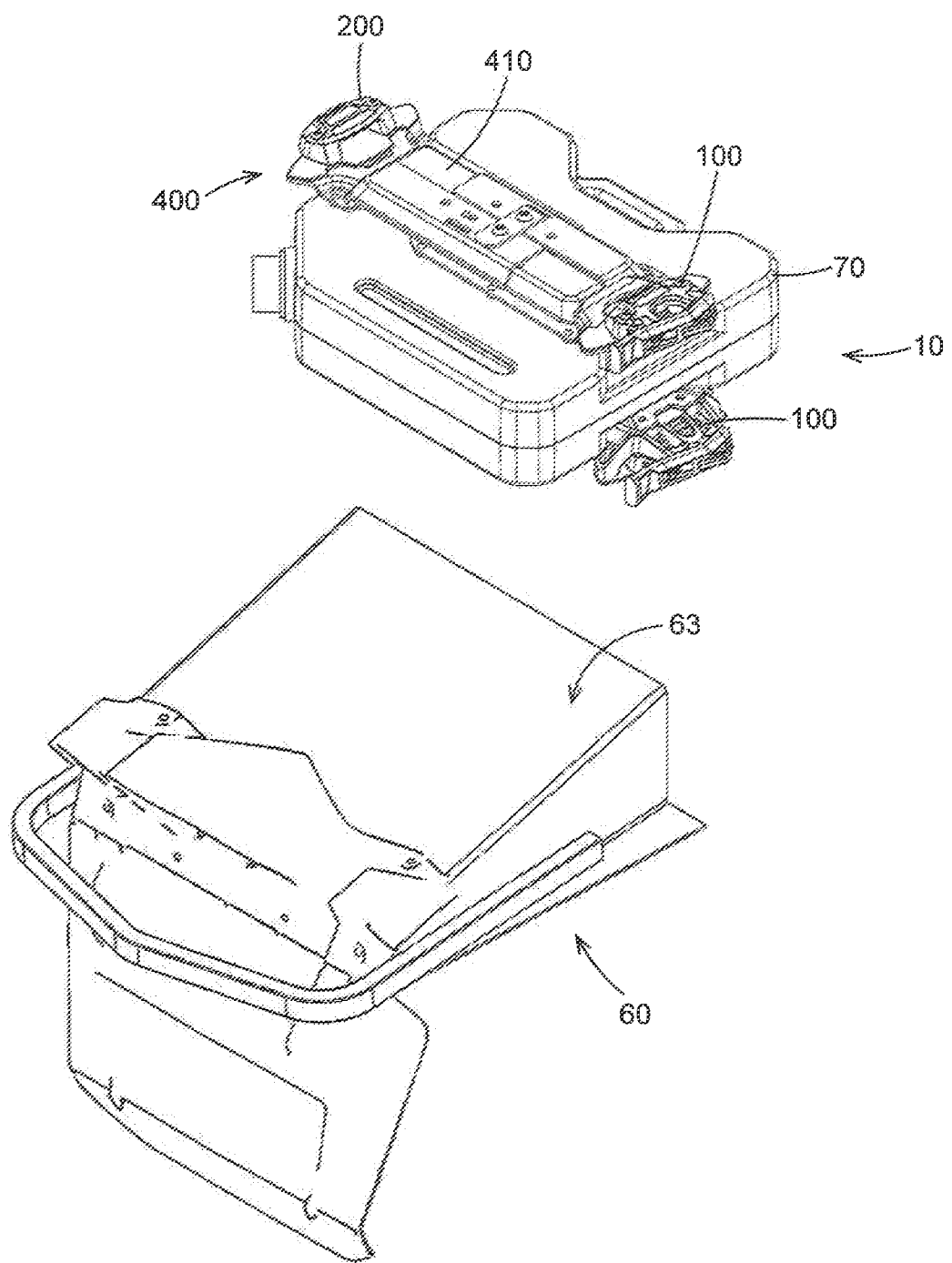
FIG. 31 is a perspective view of the accessory mounting system shown in FIG. 30, showing the stacking assembly connectable to a vehicle surface, according to an embodiment.
Figure 32:
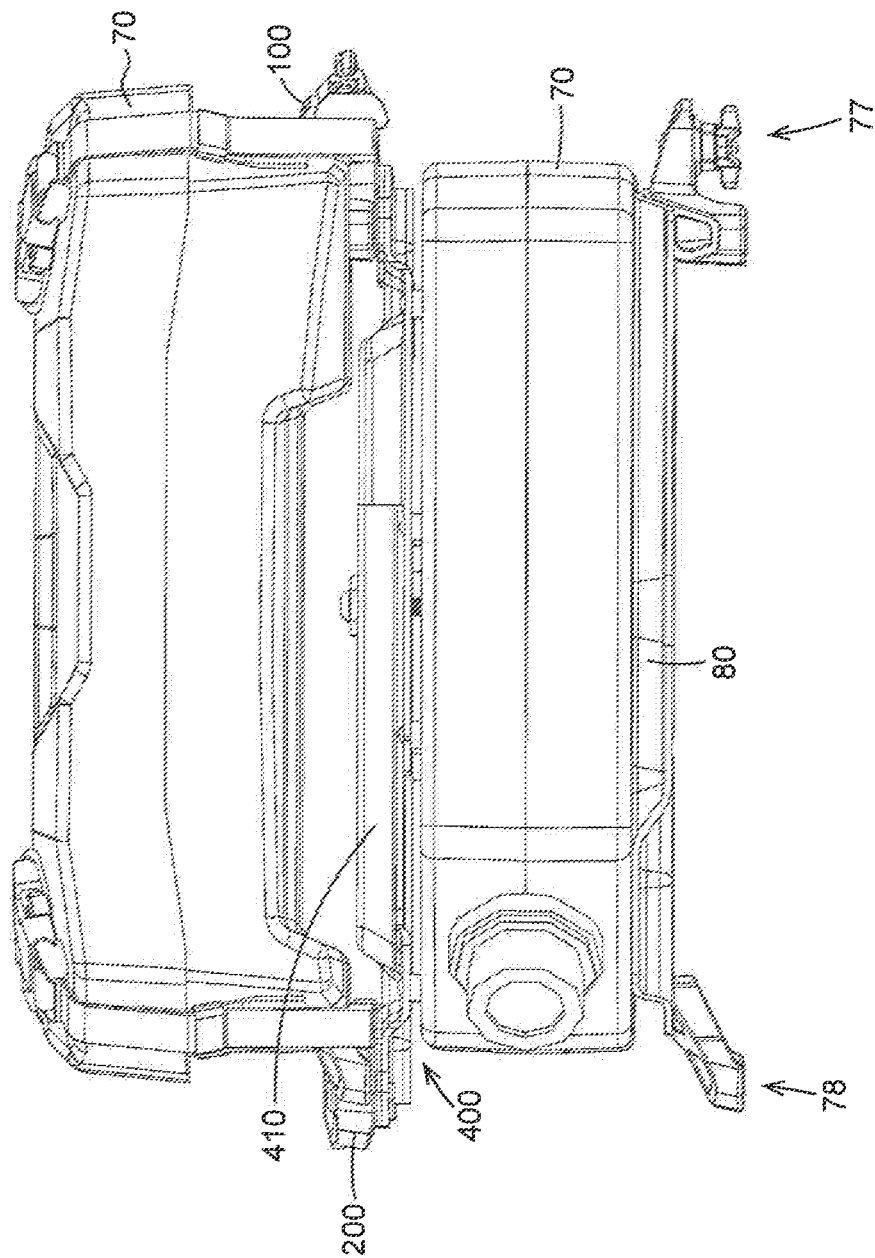
FIG. 32 is a side view of the accessory mounting system, showing a pair of accessories connected together in a stacked configuration.

As such, it is appreciate that an accessory 70 (seen in FIGS. 30 and 31) provided with first and second protruding portions 77, 78, for example, can be coupled to the support structure 410 (i.e., the first and second protruding portions 77, 78 are connectable to the first and second mounting fixtures 100, 200, respectively). In this embodiment, and as shown in FIGS. 30 and 31, the support structure 410 can be positioned atop the accessory 70, which is adapted to be connected to the vehicle 60 via any apparatus or system. For example, the accessory 70 can be mounted to the vehicle via a pair of mounting fixtures 100, 200, via a pair of rails 320 (see FIG. 21) or a combination thereof. In some embodiments, and as will be further described below, the support structure 410 is connectable to the first accessory 70 (i.e., the accessory positioned below the support structure 410). In other embodiments, the support structure 410 can be adapted to be connected to the vehicle surface 63, or a separate component connected to the vehicle surface (e.g., another mounting fixture and/or a rail assembly).

In the present embodiment, the support structure 410 includes a first support segment 412 and a second support segment 414 coupled to each other to define a length of the support structure 410. The first and second support segments 412, 414 are generally elongated and adapted to interlock with one another along their longitudinal axis. In addition, the first and second support segments 412, 414 are adapted to be selectively secured to one another such that the support structure 410 has a desired length. It is thus noted that the support structure 410 can be at least partially telescopic, whereby the first and second support segments 412, 414 cooperate with each other to define the desired length of the support structure 410. It is appreciated that selecting a desired length of the support structure 410 correspondingly defines the distance between the mounting fixtures 100, 200 connected to each end of the support structure 410. A such, the distance between the mounting fixtures can be adjusted, for example, based on the accessory being connected thereto.

Figure 29:
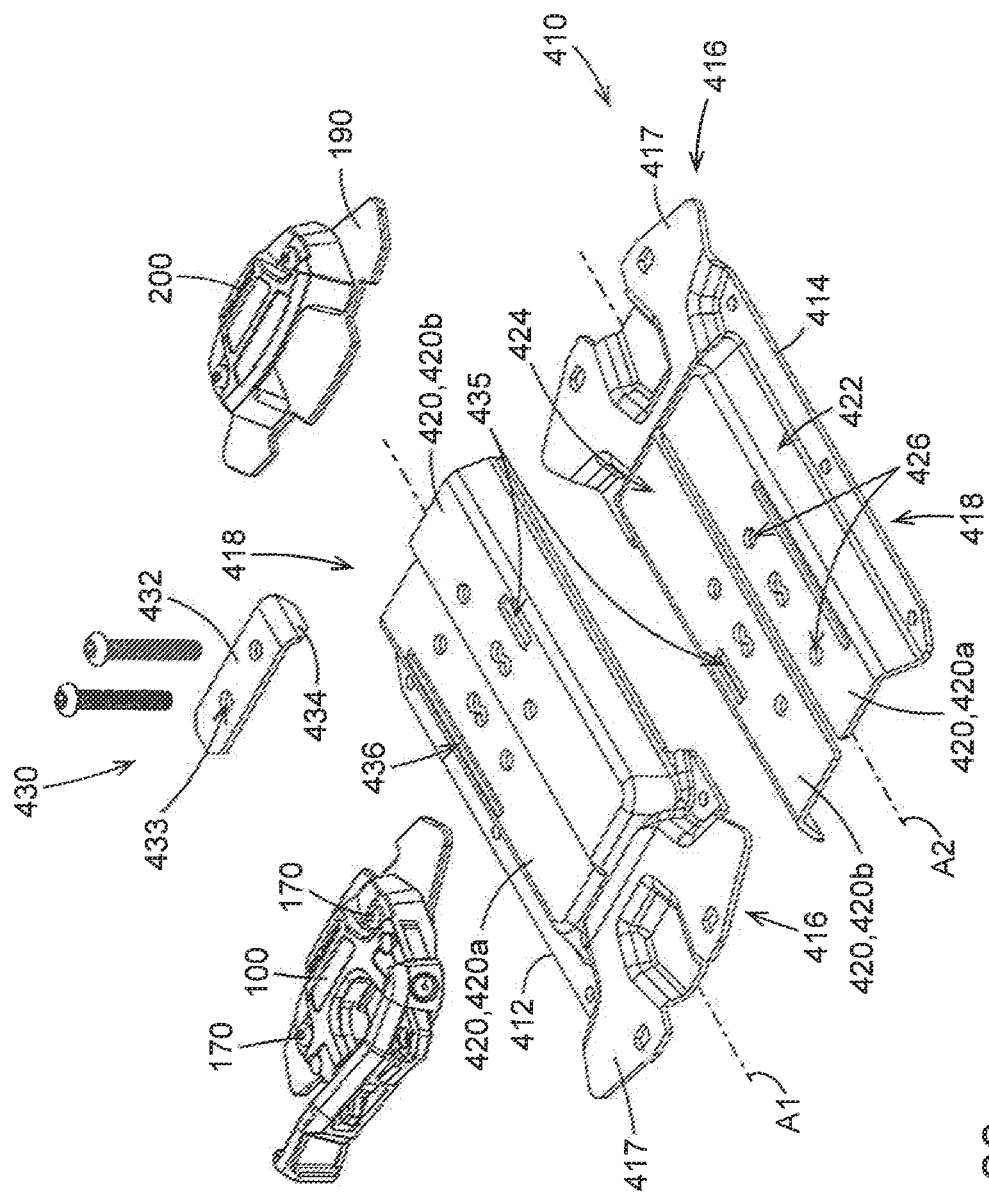
FIG. 29 is an exploded perspective view of the support structure shown in FIG. 28, showing a pair of support segments shaped and adapted to slidably engage one another, according to an embodiment.

Referring more specifically to FIG. 29, the first support segment 412 include a fixture end 416 adapted to have one of the first and second mounting fixtures 100, 200 be connected thereto. The fixture end 416 can include a generally flat platform 417 configured to receive thereon the mounting fixture and/or the mounting plate 190. The platform 417 includes one or more apertures to enable connection of the mounting fixtures via corresponding mounting fasteners 170. However, in alternative embodiments, the mounting fixtures can form an integral part of the support structure 410. Furthermore, the first support segment 412 includes an interlocking portion 418 extending from the fixture end 416 along the longitudinal axis (A1) of the first support segment 412. The interlocking portion 418 is adapted to engage the second support segment 414 in a manner enabling telescopic connection of the first and second support segments 412, 414 together.

In some embodiments, the second support segment 414 can have generally the same structure as the first support segment 412. In the present embodiment, the second support segment 414 is exactly the same as the first support segment 412. More specifically, the second support segment 414 includes a fixture end 416 adapted to have one of the first and second mounting fixtures 100, 200 be connected thereto, and an interlocking portion 418 extending from the fixture end 416 along the longitudinal axis (A2) of the second support segment 414. It is noted that the interlocking portions 418 are configured to interlock one another in a manner enabling a telescopic connection therebetween. In this embodiment, each interlocking portion 418 includes a pair of interlocking members 420 shaped and sized to engage the interlocking members 420 of the other one of the interlocking portions 418 when the first and second support segments 412, 414 are aligned and positioned "face-to-face" (e.g., with the fixture ends 416 opposite one another at either ends of the formed support structure 410).

Figure 28:
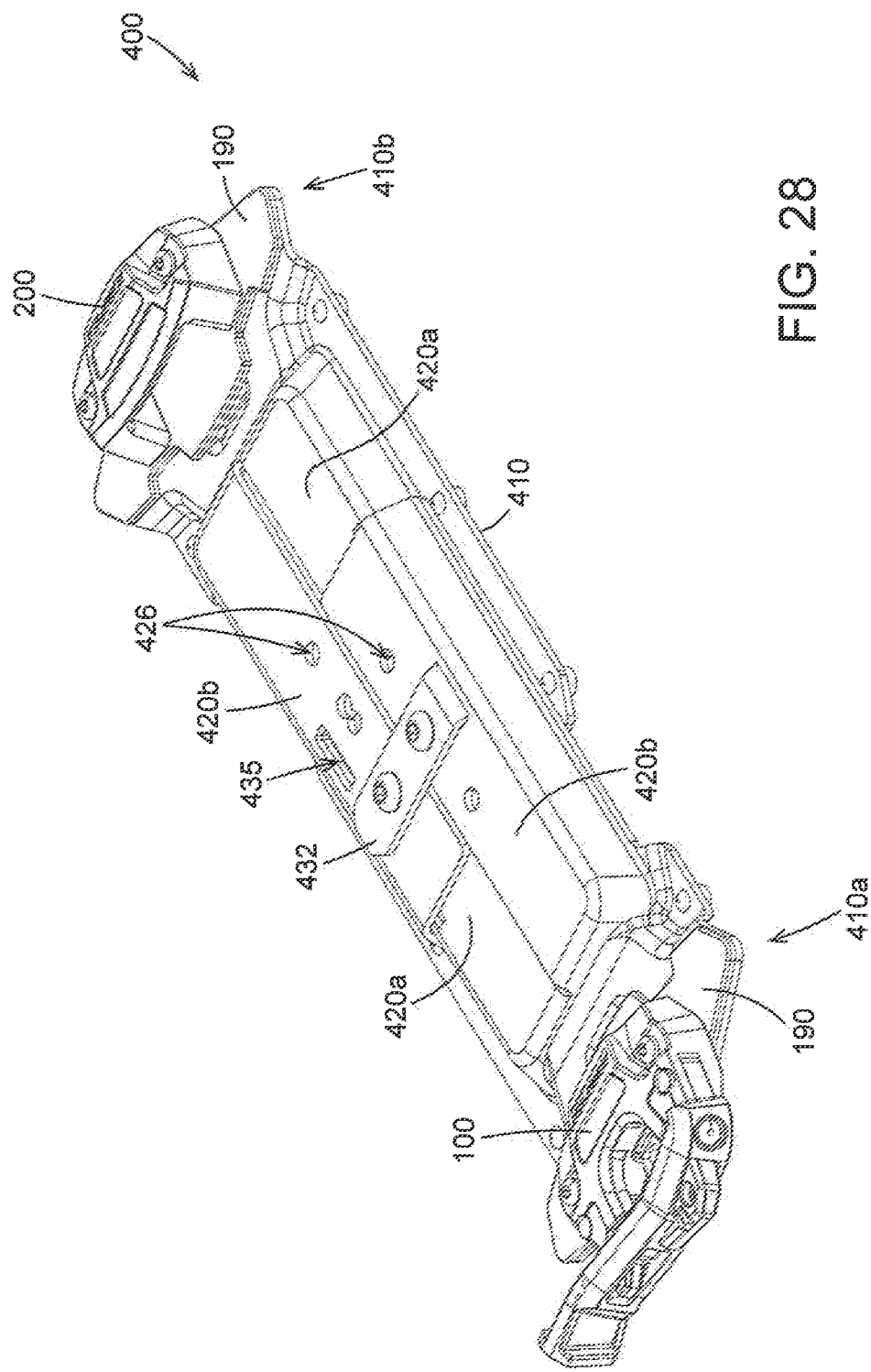
FIG. 28 is a perspective view of a support structure of a stacking assembly according to an embodiment.

As seen in FIG. 29, each interlocking portion 418 includes a pair of interlocking members 420 positioned side-by-side, with one of the interlocking members 420 being vertically higher (or lower) than the other one of the interlocking members 420. In the illustrated embodiment, the interlocking member positioned on a left side of the first support segment 412 (i.e., interlocking member 420a) is vertically lower than the interlocking member positioned on a right side of the first support segment 412 (i.e., interlocking member 420b). It should thus be understood that the interlocking members 420 of the second support segment 414 correspondingly include a vertically lower interlocking member 420a, and a vertically higher interlocking member 420b. As such, when the first and second support segments 412, 414 engage each other in a "face-to-face" configuration, the higher interlocking member 420b of one interlocking portion 418 extends over the lower interlocking member 420a of the other interlocking portion 418, and vice-versa, and as seen in FIG. 28. In other words, the interlocking members 420 of a given interlocking portion 418 are offset relative to one another and configured to engage another offset pair of interlocking members 420.

Figure 33:
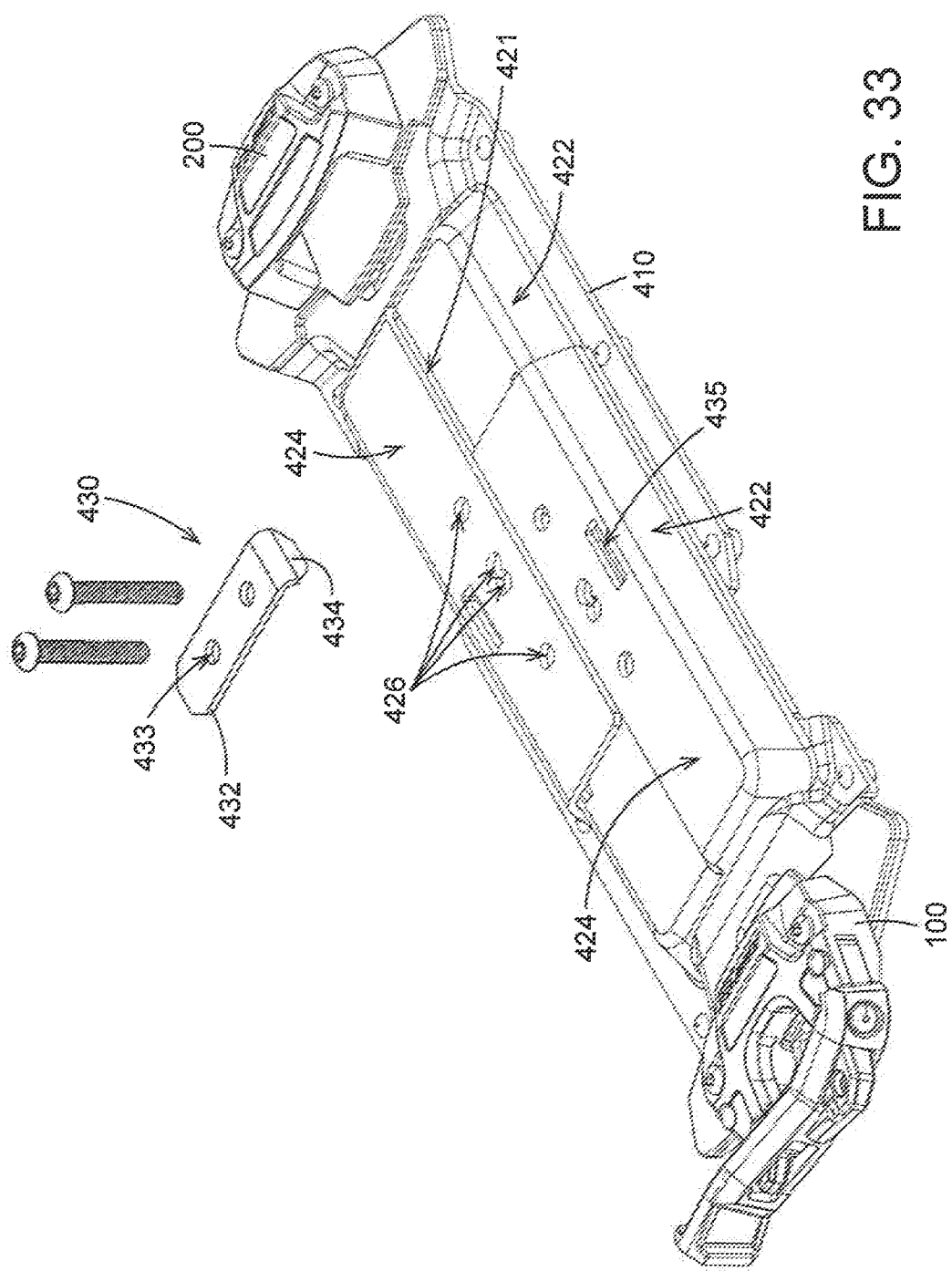
FIG. 33 is a perspective view of the support structure shown in FIG. 28, showing a support segment latch adapted to facilitate connection between the support segments, according to an embodiment.

It is noted that the interlocking members 420 are shaped and sized to conform to one another to facilitate engagement of the first and second support segments 412, 414 with one another. In this embodiment, and as illustrated in FIGS. 29 and 33, each interlocking member 420 comprises a sidewall 422 and a generally flat top surface 424 respectively configured to engage the corresponding sidewall 422 and top surface 424 of the opposing interlocking member 420. The sidewalls 422 can be adapted to prevent, or at least reduce, lateral movement and/or rotational movement of the support segments 412, 414 relative to one another, while the top surfaces 424 can be adapted to limit vertical movement and/or rotational movement of the support segments 412, 414 relative to one another. It is noted that the shape and configuration of the interlocking members do not hinder axial movement of the support segments 412, 414 (e.g., along their longitudinal axes) such that the length of the support structure 410 can be adjusted. It is also noted that the offset between the interlocking members 420 (i.e., the distance between the lower and higher interlocking members 420a, 420b) can define a slit 421 extending along the interlocking members 420. The slit 421 can be adapted to facilitate engagement of the interlocking portions 418 to form the support structure 410, although it is appreciated that other configurations are possible.

Still referring to FIGS. 28, 29 and 33, in this embodiment, each interlocking member 420 is provided with member apertures 426 adapted to be aligned with the member apertures 426 of the interlocking member 420 positioned above (or below), thereby enabling a fastener (e.g., a nut and screw) to extend through the interlocking members and secure the support segments 412, 414 together. In the present embodiment, the stacking assembly 400 includes a support segment latch 430 having a latch body 432 shaped and sized to extend perpendicularly relative to the support segments 412, 414, and engage the higher interlocking members 420b. The latch body 432 can be secured to the higher interlocking members 420b to secure the support segments 412, 414 together. In some embodiments, the latch body 432 includes a pair of latch apertures 433 configured to align with a corresponding pair of member apertures 426, thereby enabling a fastener (e.g., a nut and screw) to extend through the latch body 432 and the interlocking portions 418 to secure the support segments 412, 414 together. It is noted that a plurality of member apertures 426 can be positioned so as to align with one another at any given configuration of the support structure 410. Therefore, the stacking assembly 400 can include a plurality of support segment latches 430 connectable to the interlocking portions 418 to further secure the support structure 410 in the desired configuration (e.g., at the desired length).

In some embodiments, the support segment latch 430 includes a key portion 434 extending from the latch body 432 and configured to engage the support structure 410 in a predetermined configuration to facilitate positioning the latch body 432 perpendicularly across the support segments 412, 414. For example, in the illustrated embodiment of FIGS. 29 and 33, the higher interlocking members 420b are provided with respective key slots 435, and the key portion 434 extends downwardly from the latch body 432 and is adapted to engage the key slot 435. The key portion 434 and the key slot 435 are complementarily shaped so as to enable the key portion 434 to engage the key slot 435 in a predetermined configuration, which positions the latch body 432 perpendicular across the interlocking portions 418.

In some embodiments, the support segment latch 430 can be further adapted to guide the support segments 412, 414 during adjustments of the length of the support structure 410. More particularly, the support segment latch 430 can facilitate axial movement of the support segments 412, 414 relative to each other (i.e., facilitate the telescopic movement). In this embodiment, and as seen in FIG. 29, the lower interlocking members 420a can be provided with a guiding slot 436 extending axially along the length of the corresponding interlocking member. The guiding slot 436 is adapted to align with the key slot 435 of the higher interlocking member 420b (i.e., when the first and second support segments are interconnected). Furthermore, the key portion 434 of the support segment latch 430 can be adapted to extend through the key slot 435, and into the guiding slot 436 of the lower interlocking member 420a. It is thus noted that movement of the key portion 434 is restricted to the length of the guiding slot 436, and that therefore, movement of the support segments 412, 414 relative to one another is restricted to the axial direction (i.e., along the longitudinal axis of the support segments).

Figure 34A:
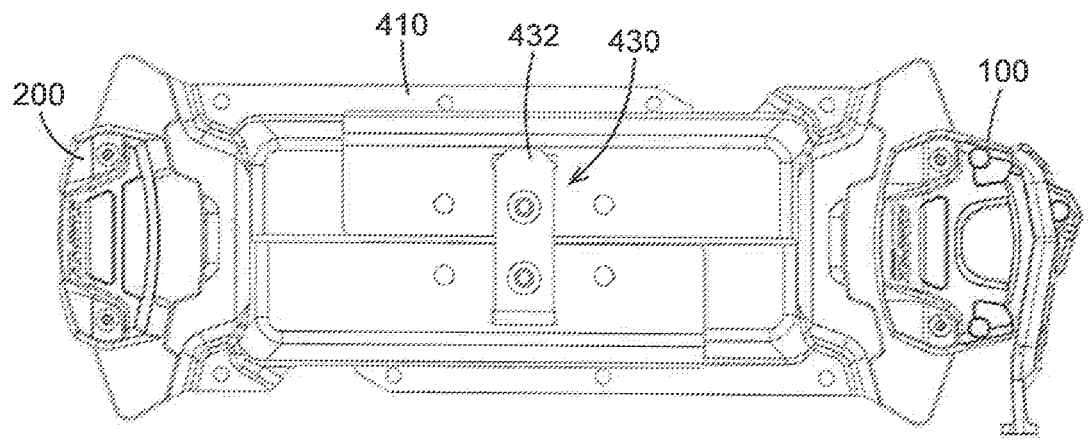
FIGS. 34a to 34c are top views of the support structure, showing possible configurations of the support structure defining respective lengths thereof, according to an embodiment.
Figure 34B:
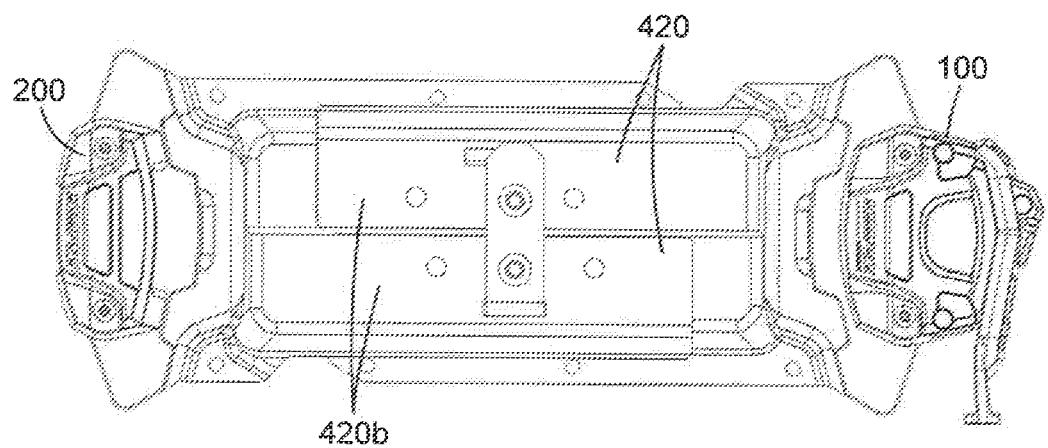
Figure 34C:
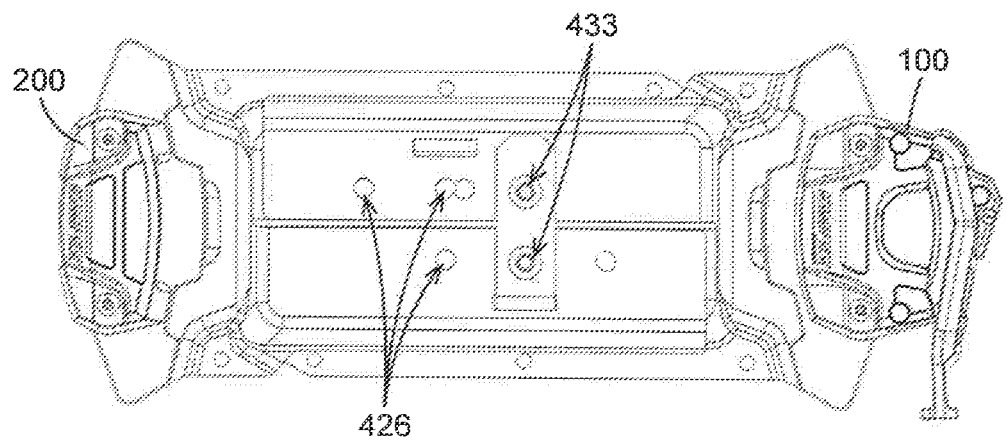

With reference to FIGS. 34a to 34c, it is noted that the support segment latch 430 remains perpendicular to the support structure 410 during movement of the support segments 412, 414. Furthermore, positioning the key portion 434 within the key slot 435 position the latch body 432 across the interlocking members 420 (e.g., across the higher interlocking members 420b) such that the latch apertures 433 overlay the interlocking members 420. The support segment latch 430 can thus provide visual indication of the alignment between a given pair of member apertures 426, where the member apertures 426 will align with the latch apertures 433 and enable fasteners to be introduced through the latch body 432 and interlocking members 420 via the appropriate apertures. As such, the support structure 410 can be operated in various configurations adapted to cooperate with accessories of various sizes. For example, the support structure 410 can be in a central configuration (FIG. 34a), a lower midsize configuration (FIG. 34b), a short configuration (FIG. 34c), and although not illustrated, it is noted that the support structure 410 can be in an upper midsize configuration, a long configuration, and any other suitable configuration adapted for adjusting the length of the support structure.

Figure 35:
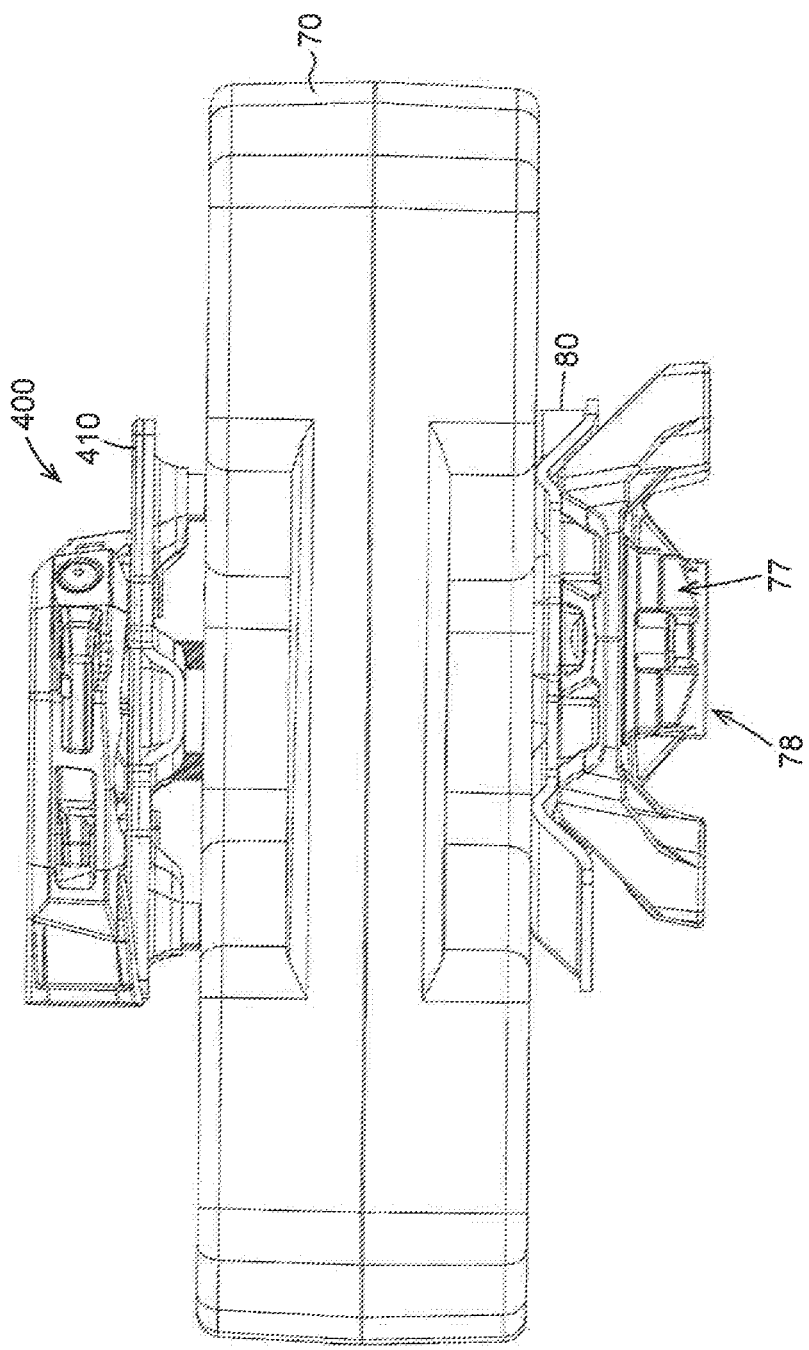
FIG. 35 is a front view of the accessory mounting system, showing an accessory mounted within the stacking assembly, according to an embodiment.
Figure 36:
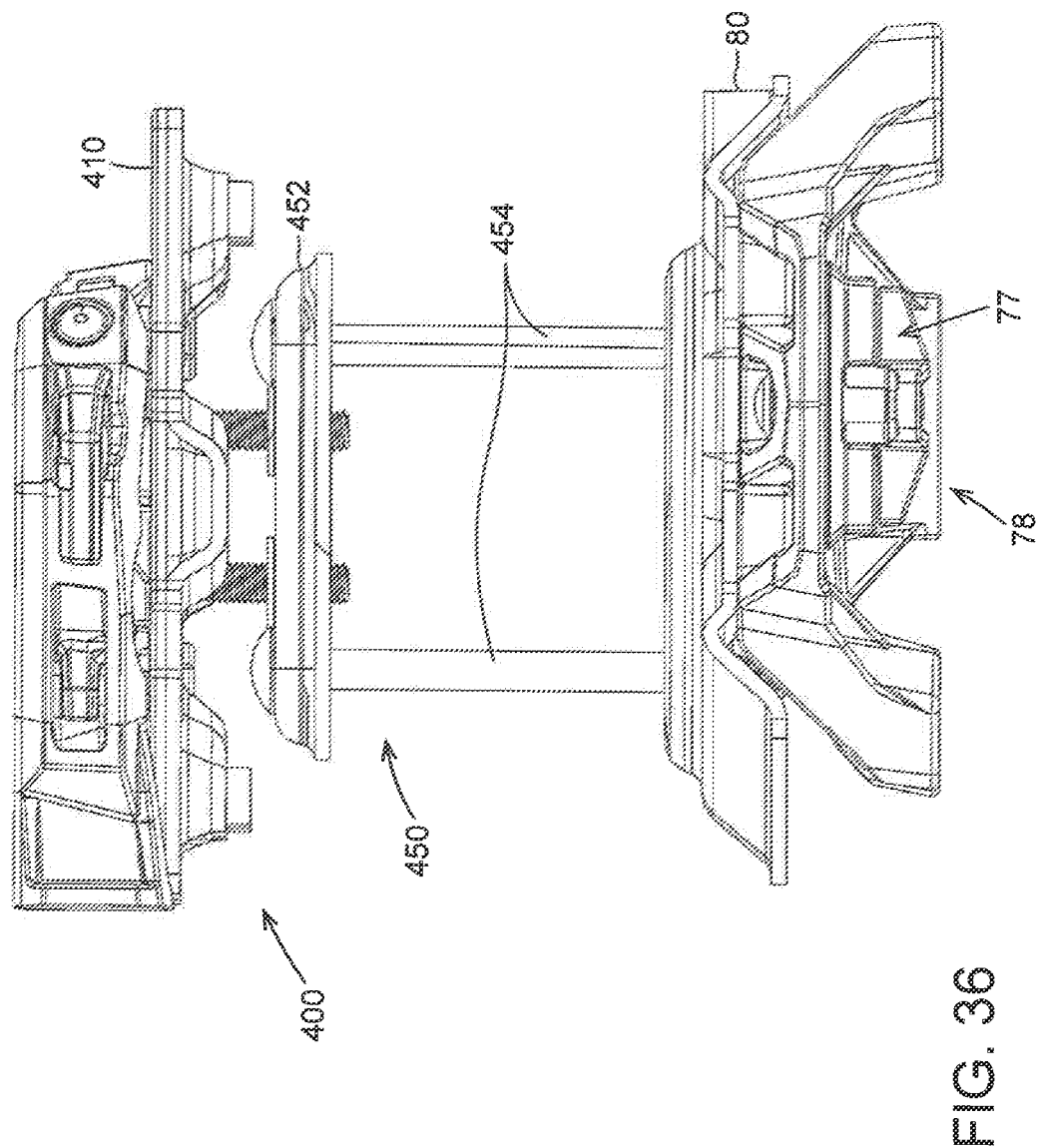
FIG. 36 is a front view of the accessory mounting system shown in FIG. 35, showing a support connector extending between the components of the stacking assembly, according to an embodiment.
Figure 37:
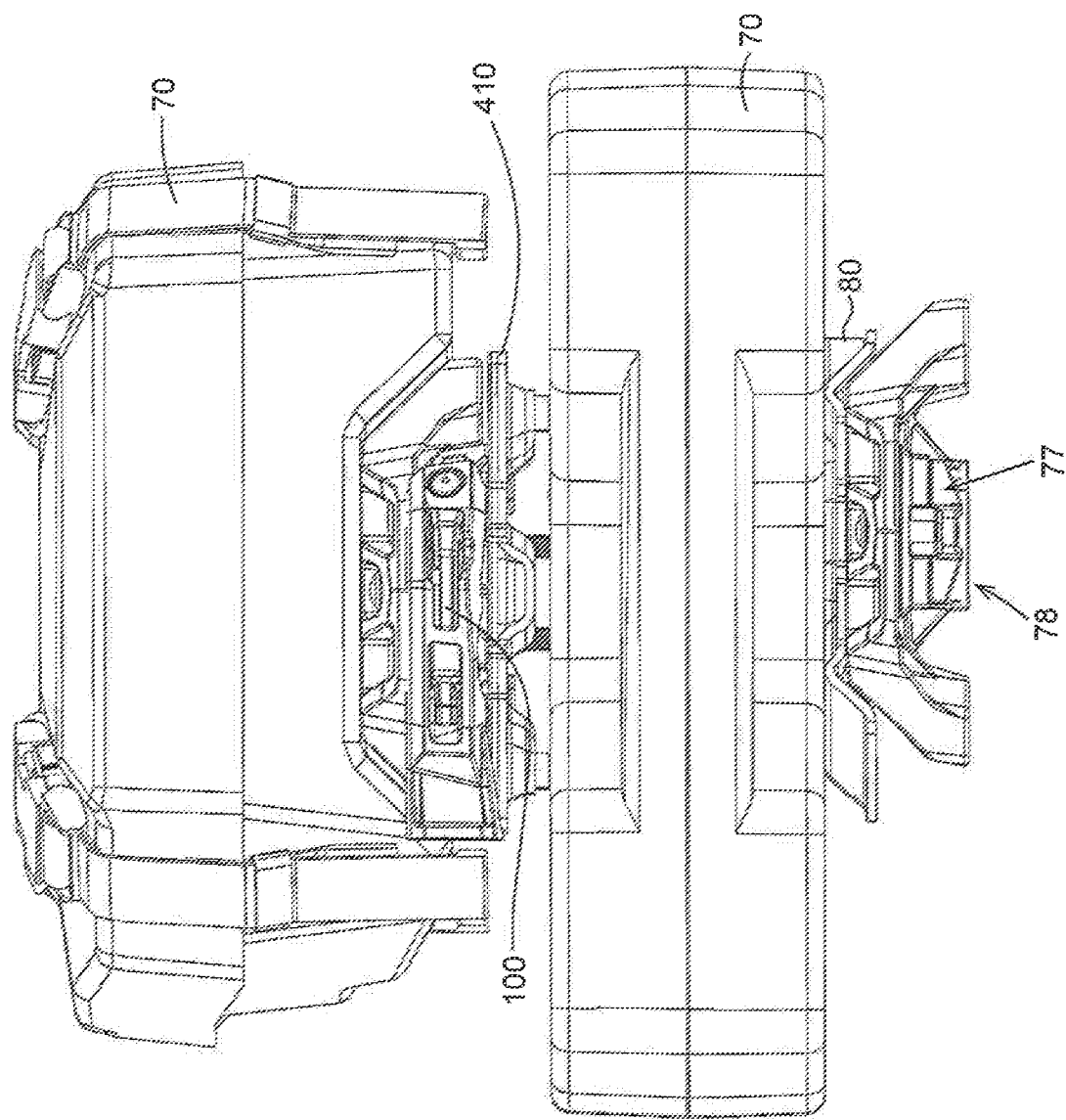
FIG. 37 is a front view of the accessory mounting system shown in FIG. 35, showing a second accessory stacked on the first accessory using the stacking assembly, according to an embodiment.
Figure 38:
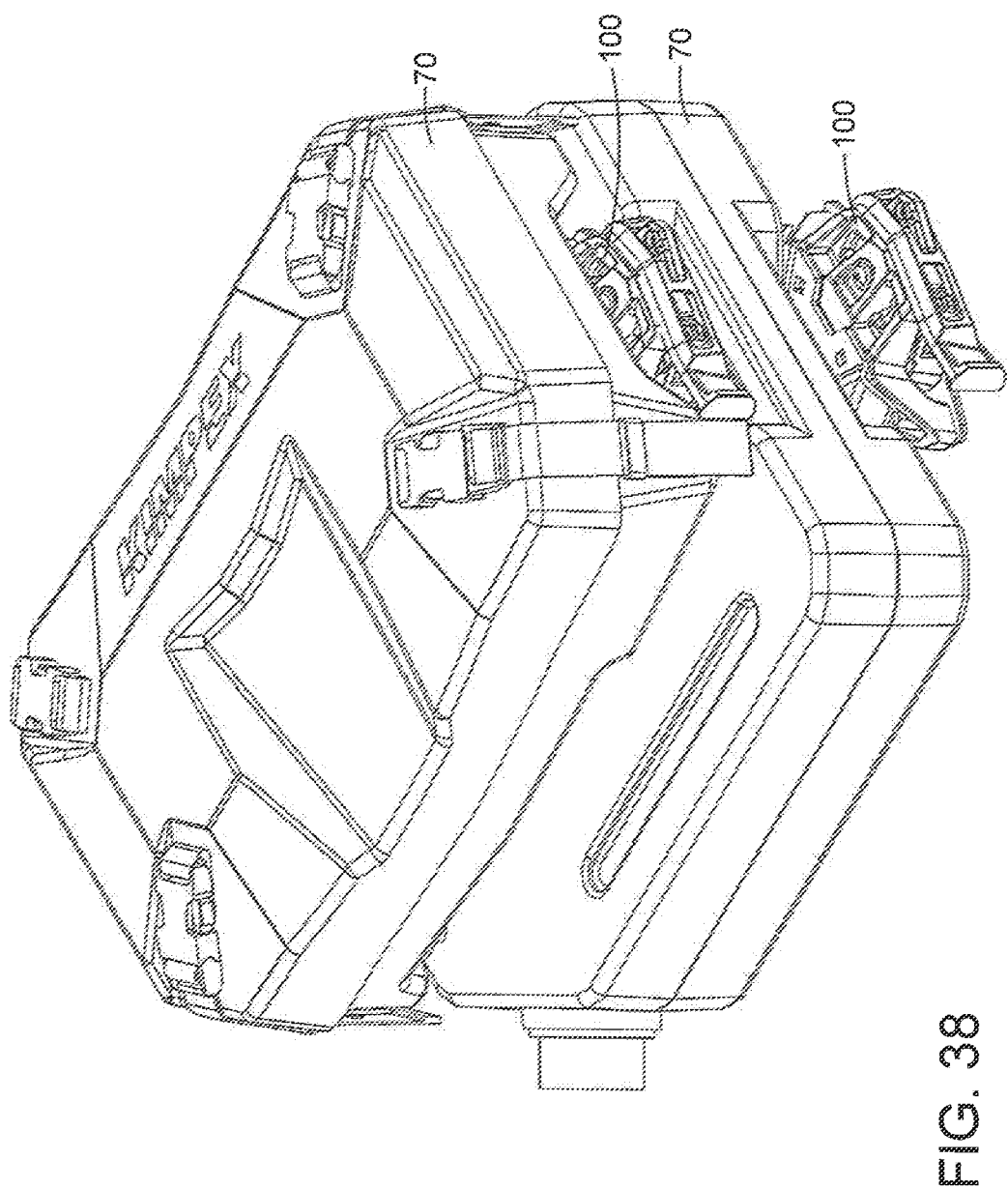
FIGS. 38 and 39 are perspective views of accessories connected in a stacked configuration using the stacking assembly, according to possible embodiments.
Figure 39:
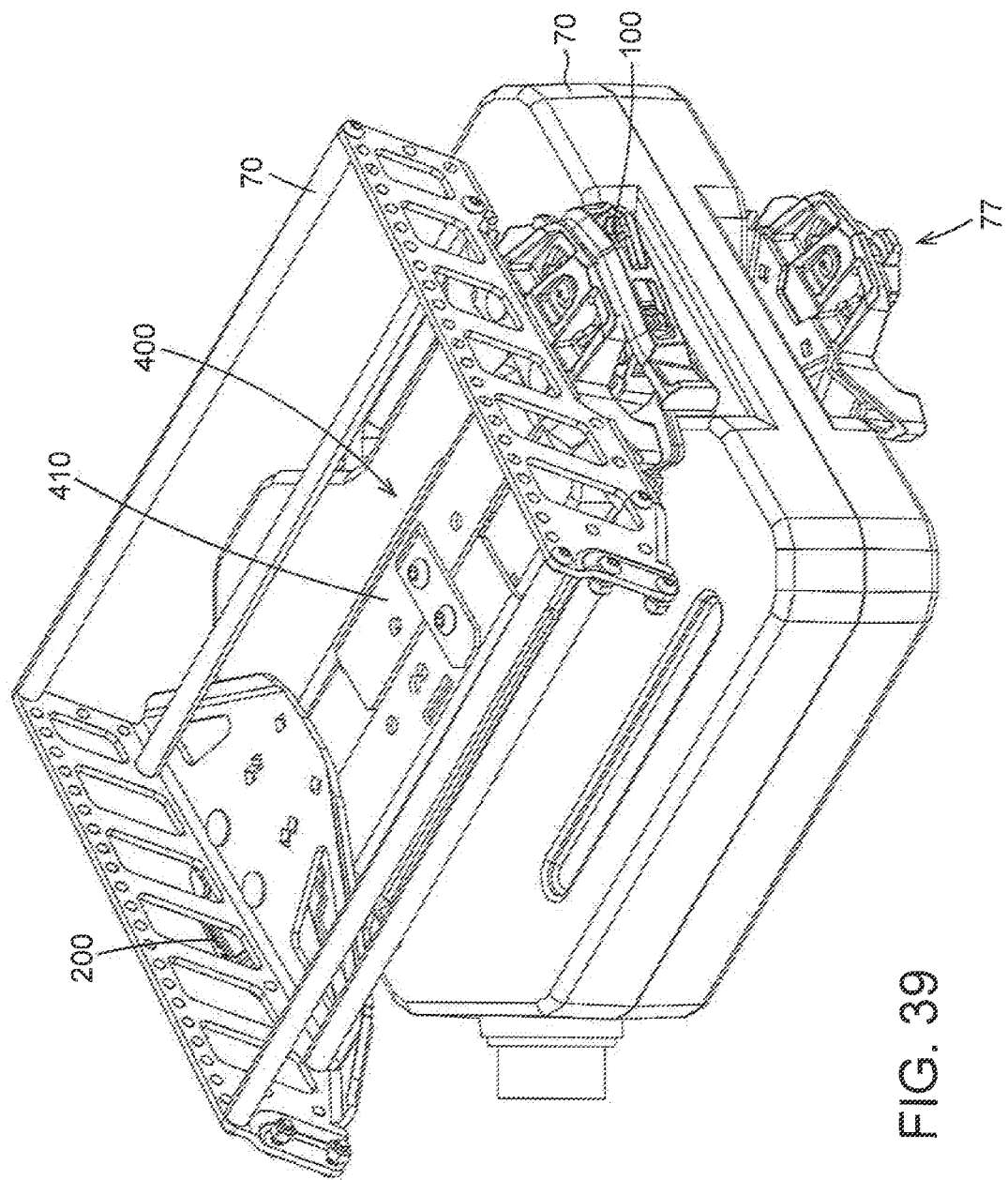

Now referring to FIGS. 35 to 39, the support structure 410 is adapted to be connected to at least one of the first accessory 70 (i.e., the accessory positioned below the support structure 410), the vehicle surface and a separate component connected to the vehicle surface (e.g., another mounting fixture and/or a rail assembly). In some embodiments, the accessories 70 can be provided with the first and second protruding portions 77, 78, or can be adapted to be mounted on an accessory base 80 comprising the first and second protruding portions 77, 78. As seen in FIGS. 35 to 39, the accessory base 80 is illustratively provided below the accessory 70 to facilitate connection of the first and second protruding portions 77, 78 with the first and second mounting fixtures. In some embodiments, the support structure 410 is adapted to be connected to the accessory base 80. For example, and with reference to FIG. 36, the stacking assembly 400 can include a support connector 450 coupled between the support structure 410 and the accessory base 80, and configured to maintain the support structure 410 elevated above the accessory base 80. It is appreciated that maintaining the support structure 410 elevated creates the required space for an accessory 70 to be installed, as seen in FIGS. 35 and 37.

In this embodiment, the support connector 450 includes a connector plate 452 and one or more connector struts 454 extending downwardly from the connector plate 452 for engaging the accessory base 80. The connector plate 452 can be connected to the support structure 410 via any suitable means, such as via the fasteners extending through the support segments 412, 414 forming the support structure 410. The one or more connector struts 454 can be connected to the connector plate 452 via similar means, e.g., via fasteners, or can be integrally formed with the connector plate 452, for example. Furthermore, the connector struts 454 can be secured to the accessory base 80 (or to the vehicle surface) to secure the support structure on the vehicle. It is thus noted that a second accessory 70 can be mounted to the vehicle via the first and second mounting fixtures provided on the support structure 410.

In the illustrated embodiments, the support connector 450 is positioned in the center of the accessory base 80, and thereby generally in the center of the accessory 70 connected to the accessory base 80. As such, in some embodiments, the accessories mounted to the vehicle using the mounting system 10 can be provided with a central opening (not shown) to enable the connector struts 454 to extend through the accessory and engage the accessory base 80. However, in other embodiments, the connector struts 454 can be positioned proximate the ends of the support structure (e.g., proximate the mounting fixtures connected thereto) such that the connector struts 454 can be adapted to extend between the connector plate 452 and accessory base 80 on either side of the accessory (i.e., without going through the accessory). In such embodiments, it is appreciated that the support connector 450 can include a pair of support plates 452 mounted to either ends of the support structure 410, each provided with one or more connector struts 454, although other configurations are possible.

It is noted that various accessories can be stacked using the mounting system 10 provided with the stacking assembly 400 described herein. For example, gas canisters, storage bins, toolboxes, bags, sporting equipment and any other suitable item can be mounted to the vehicle in a stacked configuration. It is appreciated that the stacking assembly 400 can include a plurality of support structures 410 and support connectors 450 such that two, three, four, or any suitable number of accessories can be stacked on the vehicle.

Referring broadly to FIGS. 28 to 39, once a first accessory is mounted to the vehicle (e.g., via the mounting fixtures, via the rails or via a combination thereof), a second accessory can be stacked thereon using the stacking assembly 400. The support structure 410 can first be adjusted based on the size of the second accessory. For example, for large accessories, the support structure 410 can be operated to maximize the distance between the mounting fixtures connected to the support structure. In other words, the length of the support structure 410 is adjusted to the size of the second accessory (or accessory base 80 provided therewith).

Once the length of the support structure 410 is determined, the support segments 412, 414 can be fastened to one another using the support segment latch 430, thereby locking the support structure 410 at the desired length. The support structure can then be placed on top of the first accessory, for example, by placing the connector plate 452 on the first accessory 70, and engaging the connector struts 454 with at least one of the accessory base of the first accessory and the vehicle surface. A second accessory, preferably provided with first and second protruding portions, can then be mounted to the vehicle via the mounting fixtures provided on the support structure. It is appreciated that additional accessories can be stacked on the second accessory using another stacking assembly 400 (e.g., another support structure and support connector 450). It should also be appreciated that two or more stacks of accessories can be created on the vehicle, either via mounting fixtures connected to different locations on the vehicle surface, or via mounting fixtures connected to different locations along a rail assembly mounted on the vehicle.

The present disclosure intends to cover and embrace all suitable changes in technology. The scope of the claims should not be limited by the implementations set forth in the examples, but should be given the broadest interpretation consistent with the description as a whole.

As used herein, the terms "coupled", "coupling", "attached", "connected" or variants thereof as used herein can have several different meanings depending in the context in which these terms are used. For example, the terms coupled, coupling, connected or attached can have a mechanical connotation. For example, as used herein, the terms coupled, coupling or attached can indicate that two elements or devices are directly connected to one another or connected to one another through one or more intermediate elements or devices via a mechanical element depending on the particular context.

In the above description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The implementations, geometrical configurations, materials mentioned and/or dimensions shown in the figures are optional, and are given for exemplification purposes only.

In addition, although the optional configurations as illustrated in the accompanying drawings comprises various components and although the optional configurations of the mounting system as shown may consist of certain geometrical configurations as explained and illustrated herein, not all of these components and geometries are essential and thus should not be taken in their restrictive sense, i.e. should not be taken as to limit the scope of the present disclosure. It is to be understood that other suitable components and cooperations thereinbetween, as well as other suitable geometrical configurations may be used for the implementation and use of the mounting system, and corresponding parts, as briefly explained and as can be easily inferred herefrom, without departing from the scope of the disclosure.

The invention claimed is:

1. An accessory mounting system for mounting an accessory on a vehicle, the accessory mounting system comprising:
    a stacking assembly comprising:
        a support structure adapted to be coupled to the vehicle, the support structure having a length extending along a longitudinal axis and comprising:
            a first support segment having a first fixture end and a first interlocking section extending from the first fixture end; and
            a second support segment having a second fixture end and a second interlocking section extending from the second fixture end, the first and second interlocking sections being adapted to slidably engage one another to selectively define the length of the support structure and position the first fixture end opposite the second fixture end;
        a support segment latch adapted to selectively secure the first support segment and the second support segment together and block movement of the first support segment and of the second support segment along the longitudinal axis;
        a first mounting fixture connectable to the first fixture end;
        a second mounting fixture connectable to the second fixture end, the accessory being selectively connectable to the first and second mounting fixtures for connecting the accessory to the support structure, wherein adjusting the length of the support structure correspondingly adjusts the distance between the first and second mounting fixtures.

2. The accessory mounting system of claim 1, wherein the first and second interlocking sections are adapted to block a rotational movement of the first and second support segments about the longidutinal axis when slidably engaged with one another.

3. The accessory mounting system of claim 1, wherein the first and second interlocking sections are adapted to block a rotational movement of the first and second support segments about a transversal axis extending perpendicularly relative to the longidutinal axis when slidably engaged with one another.

4. The accessory mounting system of claim 1, wherein the first and second interlocking sections are adapted to restrict movement of the first and second support segments to an axial movement along the longidutinal axis when slidably engaged with one another.

5. The accessory mounting system of claim 1, wherein the accessory is a second accessory, and wherein the support structure is adapted to be mounted on a first accessory coupled to the vehicle to position the first and second accessories in a stacked configuration.

6. The accessory mounting system of claim 1, wherein the first interlocking section comprises a first interlocking member and a second interlocking member, the second interlocking section comprises a third interlocking member and a fourth interlocking member, and wherein engaging the first and second interlocking sections together comprises positioning the first interlocking member below the fourth interlocking member and positioning the second interlocking member over the third interlocking member.

7. The accessory mounting system of claim 6, wherein the first and third interlocking members are adapted to be positioned in a first plane when the first and second interlocking sections are slidably engaged with one another, and wherein the second and fourth interlocking members are adapted to be positioned in a second plane when the first and second interlocking sections are slidably engaged with one another.

8. The accessory mounting system of claim 7, wherein the first and second planes are parallel to one another.

9. The accessory mounting system of claim 7, wherein the support segment latch comprises a latch body fastenable to a pair of interlocking members positioned in one of the first and second planes.

10. The accessory mounting system of claim 9, wherein at least one of the second and fourth interlocking members comprises a key slot, and wherein the support segment latch comprises a key portion extending downwardly from the latch body, the key portion being shaped and adapted to engage the key slot in a manner positioning the latch body perpendicularly across the second and fourth interlocking members.

11. The accessory mounting system of claim 10, wherein at least one of the first and third interlocking members comprises a guide slot extending longitudinally along the corresponding interlocking member and being adapted to align with the key slot, and wherein the key portion is adapted to extend through the key slot and engage the guide slot for guiding the axial movement of the first and second support segments along the longitudinal axis.

12. The accessory mounting system of claim 6, wherein the first and second interlocking members are spaced from one another and define a first slit therebetween, the third and fourth interlocking members are spaced from one another and define a second slit therebetween, and wherein the first and second slits are aligned when the first and second interlocking sections are slidably engaged with one another.

13. The accessory mounting system of claim 1, wherein the first and second mounting fixtures are integrally formed as part of the first and second support segments, respectively.

14. The accessory mounting system of claim 1, wherein the first support segment is structurally identical to the second support segment.

15. The accessory mounting system of claim 1, wherein the stacking assembly further comprises a support connector coupled between the support structure and the vehicle, the support connector being adapted to position the support structure in a raised configuration for positioning one or more accessories beneath the support structure.

16. The accessory mounting system of claim 15, wherein the support connector comprises a connector plate connectable to the support structure, and one or more connector struts extending downwardly from the connector plate, and wherein the support structure is raised by a distance corresponding to a length of the connector struts.

17. The accessory mounting system of claim 15, further comprising a plurality of stacking assemblies connectable to one another in a stacked configuration, wherein the connector struts of one stacking assembly engages the support structure of another stacking assembly positioned below.

18. A method of mounting at least a first accessory and a second accessory to a vehicle using the mounting system of claim 1, comprising:
   coupling the first accessory to a vehicle surface;
   adjusting the length of the support structure based on a width of at least one of the first and second accessories;
   coupling the support structure to at least one of the first accessory and the vehicle surface to position the support structure at least partially above the first accessory; and
   connecting the second accessory to the support structure via the first and second mounting fixtures.

19. The method of claim 18, wherein adjusting the length of the support structure comprises displacing at least one of the first and second support segments along the longitudinal axis of the support structure.

20. The method of claim 18, further comprising securing the support segment latch following the step of adjusting the length of the support structure.

* * * * *